(12) United States Patent
Hu et al.

(10) Patent No.: US 11,507,187 B2
(45) Date of Patent: Nov. 22, 2022

(54) FEEDBACK SYSTEM

(71) Applicant: TDK TAIWAN CORP., Taoyuan (TW)

(72) Inventors: Chao-Chang Hu, Taoyuan (TW);
Mao-Kuo Hsu, Taoyuan (TW);
Ching-Chieh Huang, Taoyuan (TW);
Guan-Yu Su, Taoyuan (TW);
Liang-Ting Ho, Taoyuan (TW);
Che-Wei Chang, Taoyuan (TW)

(73) Assignee: TDK Taiwan Corp., Taoyuan (TW)

( * ) Notice: Subject to any disclaimer, the term of this patent is extended or adjusted under 35 U.S.C. 154(b) by 96 days.

(21) Appl. No.: 17/006,410

(22) Filed: Aug. 28, 2020

(65) Prior Publication Data

US 2021/0064138 A1 Mar. 4, 2021

Related U.S. Application Data

(60) Provisional application No. 62/932,625, filed on Nov. 8, 2019, provisional application No. 62/894,295, filed on Aug. 30, 2019.

(51) Int. Cl.
*G06F 3/01* (2006.01)
*H04M 19/02* (2006.01)

(52) U.S. Cl.
CPC ............ *G06F 3/016* (2013.01); *H04M 19/02* (2013.01)

(58) Field of Classification Search
CPC .. G06F 3/016; G06F 2203/015; H04M 19/02; G05G 9/047; G05G 2009/04766; G05G 5/03; G05G 2009/04718; F16F 9/53
See application file for complete search history.

(56) References Cited

U.S. PATENT DOCUMENTS 10,395,489 B1 * 8/2019 Cruz-Hernandez ...... G08B 6/00
2021/0286431 A1 * 9/2021 Eck .......................... G06F 3/016

FOREIGN PATENT DOCUMENTS

WO WO-2007002775 A2 * 1/2007 ............. A63F 13/06

* cited by examiner

*Primary Examiner* — Quan Zhen Wang
*Assistant Examiner* — Mancil Littlejohn, Jr.
(74) *Attorney, Agent, or Firm* — Muncy, Geissler, Olds & Lowe, P.C.

(57) ABSTRACT

A feedback system is provided. The feedback system includes a main body, a vibration module, a sensing module, and a control module. The vibration module includes a first vibration mechanism. The first vibration mechanism is used for providing a first vibration force to the main body at a first vibration position. The sensing module is used for detecting the status of the main body and providing a sensing signal. The control module is used for receiving the sensing signal and providing a driving signal to the first vibration mechanism to generate the first vibration force.

20 Claims, 54 Drawing Sheets

FEEDBACK SYSTEM

CROSS REFERENCE TO RELATED APPLICATIONS

This application claims the benefit of U.S. Provisional Application No. 62/894,295, filed on Aug. 30, 2019, and No. 62/932,625, filed on Nov. 18, 2019, the entireties of which are incorporated by reference herein.

BACKGROUND OF THE DISCLOSURE

Field of the Disclosure

The present disclosure relates to a feedback system, and particularly it relates to a vibration feedback system.

Description of the Related Art

As technology has developed, it has become more common to include vibration functions into many types of modern electronic devices to provide specific functions to consumers. These electronic devices are used more and more often, offering more choices for consumers. However, their original setup may become not applicable to actual situations when using these electronic devices, causing vibration to occur when it is not intended. As a result, how to perform the vibration more precisely has become an important issue.

BRIEF SUMMARY OF DISCLOSURE

A feedback system is provided in some embodiments of the present disclosure. The feedback system includes a main body, a vibration module, a sensing module, and a control module. The vibration module includes a first vibration mechanism. The first vibration mechanism is used for providing a first vibration force to the main body at a first vibration position. The sensing module is used for detecting the status of the main body and providing a sensing signal. The control module is used for receiving the sensing signal and providing a driving signal to the first vibration mechanism to generate the first vibration force.

In some embodiments, the sensing module includes an inertia sensing assembly used for detecting the inertia of the main body and providing an inertia signal of the sensing signal, a depth sensing assembly used for detecting the position variation of the main body relative to the environment and providing a position signal of the sensing signal, and a light sensing assembly used for detecting the light variation of the main body relative to the environment and providing a light signal of the sensing signal. The control module includes inertia calibration data, which records calibration information of the inertia sensing assembly, depth calibration data, which records calibration information of the depth sensing assembly, and light calibration data, which records calibration information of the light sensing assembly. The inertia calibration data is not recalibrated when the feedback system is used for the first time. The depth calibration data is recalibrated when the feedback system is used for the first time. The light calibration data is not recalibrated when the feedback system is used for the first time.

In some embodiments, the feedback system further includes performing a first calibration process, a second calibration process, and a third calibration process on the feedback system. The first calibration process is used to redefine the inertia sensing calibration data. In the first calibration process, the main body is at rest for redefining the inertia sensing calibration data. In the first calibration process, the inertia sensing calibration data is redefined according to the position signal.

In some embodiments, in the first calibration process, the inertia sensing calibration data is redefined according to an acceleration sensor and an angular velocity sensor in the inertia sensing assembly. In the first calibration process, the absolute value of the acceleration detected by the acceleration sensor is between the sum of the acceleration of gravity and a margin of error of the acceleration and remains for a predetermined time for redefining the inertia sensing calibration data. In the first calibration process, the margin of error of the acceleration is measured by an external apparatus, and then the margin of error of the acceleration is recorded in the control module. In the first calibration process, the main body is at rest for a period of time to achieve the margin of error of the acceleration, and then the margin of error of the acceleration is recorded in the control module. In the first calibration process, the value of the angular velocity detected by the angular velocity sensor is less than a margin of error of the angular velocity for the predetermined time to redefine the inertia sensing calibration data.

In some embodiments, the second calibration process is used to redefine the depth sensing calibration data. In the second calibration process, the main body is positioned at different positions to redefine the depth sensing calibration data. In the second calibration process, the depth sensing calibration data is redefined according to the inertia sensing signal. The first calibration process and the second calibration process are performed at the same time.

In some embodiments, the third calibration process is used to redefine the light sensing calibration data. In the third calibration process, the light sensing assembly is illuminated by a reference light to redefine the light sensing calibration data.

In some embodiments, the vibration module further includes a second vibration mechanism and a third vibration mechanism. The second vibration mechanism is used for generating a second vibration force at a second vibration position of the main body. The shortest distance between the first vibration position and the second vibration position is not equal to zero. The third vibration mechanism is used for generating a third vibration force at a third vibration position of the main body. The shortest distance between the first vibration position and the third vibration position and the shortest distance between the second vibration position and the third vibration position are not equal to zero.

In some embodiments, the feedback system further includes a first feedback mode, a second feedback mode, and a third feedback mode. The first feedback mode is used for generating a first feedback force to the main body. The second feedback mode is used for generating a second feedback force to the main body. The third feedback mode is used for generating a third feedback force to the main body. The first feedback force is different than the second feedback force. The first feedback force is different than the third feedback force. In the first feedback mode, the dimensions of the first vibration force and the second vibration force are identical.

In some embodiments, in the first feedback mode, the dimensions of the second vibration force and the third vibration force are identical. In the first feedback mode, the values of the first vibration force and the second vibration force are identical. In the first feedback mode, the values of the first vibration force and the second vibration force are identical.

In some embodiments, in the second feedback mode, the dimensions of the first vibration force and the second vibration force are different. In the second feedback mode, the dimensions of the second vibration force and the third vibration force are different. In the second feedback mode, the dimensions of the first vibration force and the third vibration force are different. In the second feedback mode, the values of the first vibration force and the second vibration force are different. In the second feedback mode, the values of the first vibration force and the second vibration force are different. In the second feedback mode, the values of the first vibration force and the third vibration force are different.

In some embodiments, in the third feedback mode, the dimensions of the first vibration force and the second vibration force are identical. In the third feedback mode, the dimensions of the second vibration force and the third vibration force are identical. In the third feedback mode, the dimensions of the first vibration force and the third vibration force are identical. In the third feedback mode, the values of the first vibration force and the second vibration force are different. In the third feedback mode, the values of the first vibration force and the second vibration force are different. In the third feedback mode, the values of the first vibration force and the third vibration force are different.

In some embodiments, the first feedback mode, the second feedback mode, and the third feedback mode are selected by the control module according to the sensing signal. The directions of the first feedback force and the second feedback force are different. The values of the first feedback force and the second feedback force are different. The directions of the first feedback force and the third feedback force are identical. The values of the first feedback force and the third feedback force are different.

In some embodiments, the control module further includes predetermined information, including a first frequency and a second frequency. The first resonance frequency of the feedback system is recorded in the first frequency. The second resonance frequency of the feedback system is recorded in the second frequency. The values of the first frequency and the second frequency are different. The vibration frequency of the first feedback force is identical to the first resonance frequency. The vibration frequency of the second feedback force is identical to the second resonance frequency. The vibration frequency of the third feedback force is identical to the first resonance frequency.

In some embodiments, each of the first vibration mechanism, the second vibration mechanism, and the third vibration mechanism further includes a first dimension vibration mechanism used for generating a first dimension vibration. The first dimension vibration is a linear motion along a first direction, a second dimension vibration mechanism used for generating a second dimension vibration, the second dimension vibration is a linear motion along a second direction, a third dimension vibration mechanism used for generating a third dimension vibration, the third dimension vibration is a linear motion along a third direction, a fourth dimension vibration mechanism used for generating a fourth dimension vibration, the fourth dimension vibration is a rotation having a rotational axis extending in the first direction, a fifth dimension vibration mechanism used for generating a fifth dimension vibration, the fifth dimension vibration is a rotation having a rotational axis extending in the second direction, and a sixth dimension vibration mechanism used for generating a sixth dimension vibration, the sixth dimension vibration is a rotation having a rotational axis extending in the third direction.

In some embodiments, the first vibration position is not positioned at nodes of a first vibration mode and a second vibration mode of the main body. The second vibration position is not positioned at the nodes of the first vibration mode and the second vibration mode of the main body. The third vibration position is not positioned at the nodes of the first vibration mode and the second vibration mode of the main body.

In some embodiments, the first vibration position is positioned at one of the nodes of the first vibration mode. The second vibration position is positioned at one of the nodes of the first vibration mode. The third vibration position is positioned at one of the nodes of the first vibration mode.

In some embodiments, each of the first vibration mechanism, the second vibration mechanism, and the third vibration mechanism further includes a fixed portion, a movable portion movably connected to the fixed portion, a resilient element which is flexible and resilient, and a driving assembly used for driving the movable portion to move relative to the fixed portion. The movable portion is movably connected to the fixed portion through the resilient element. The difference between a resonance frequency of the main body and a resonance frequency of the movable portion plus the resilient element is less than 10% of the resonance frequency of the main body.

In some embodiments, the driving assembly includes a magnetic driving assembly to generate a driving force using the electromagnetic principle.

In some embodiments, the driving assembly includes a shape memory alloy assembly to generate a driving force based on the characteristics of the shape memory alloy.

In some embodiments, the driving assembly includes a piezoelectric driving assembly to generate a driving force using the piezoelectric principle.

BRIEF DESCRIPTION OF DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF DISCLOSURE

Figure 1:
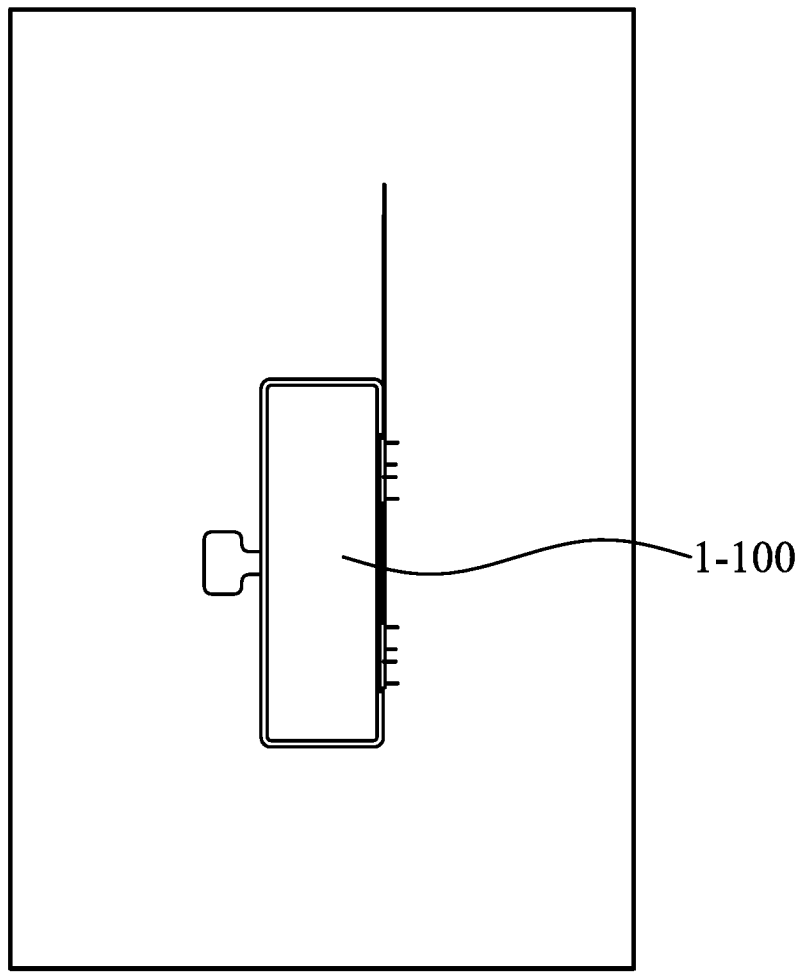
FIG. 1 shows an electronic device with a vibration module according to an embodiment of the invention.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Firstly, please refer to FIG. 1, a vibration module 1-100 of an embodiment of the present invention may be mounted into an electronic device 1-1 within for generating vibrations. The electronic device 1-1 may be, for example, a smart phone or a tablet. When generating vibrations, the vibration module 1-100 may receive a current from the outside of the vibration module 1-100 and generates an electromagnetic driving force, the electromagnetic driving force may interact with a magnetic field and makes the vibration module 1-100 to vibrate, thereby the user of the electronic device 1-1 may feel the vibration. It should be noted that the relation in position and size between the vibration module 1-100 and the electronic device 1-1 shown in FIG. 1 is only an example, but not limiting the relation in position and size between the vibration module 1-100 and the electronic device 1-1. In fact, the vibration module 1-100 may be mounted at different positions in the electronic device 1-1 according to the different needs.

Figure 2A:
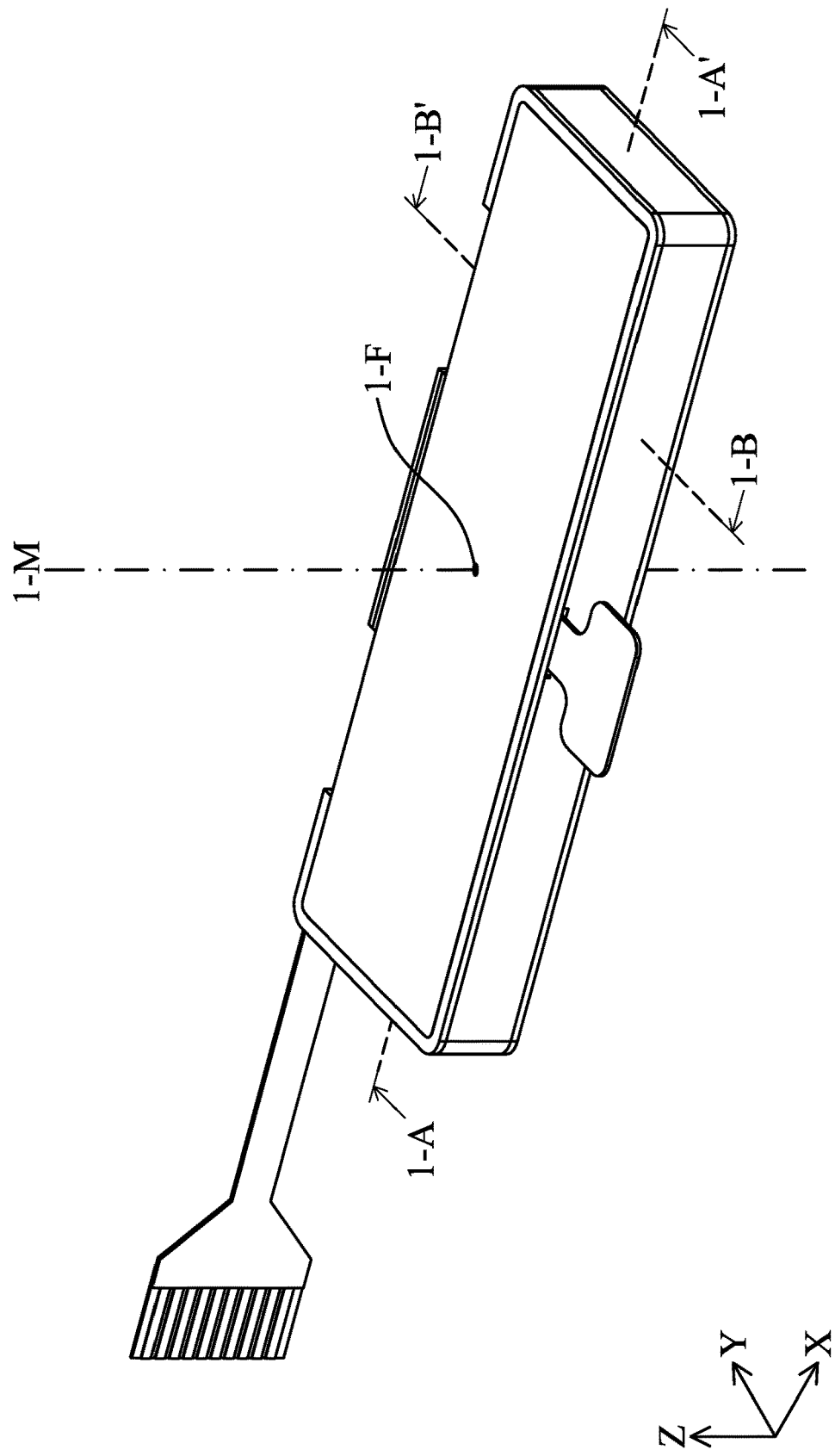
FIG. 2A shows a perspective view of the vibration module according to an embodiment of the invention.
Figure 2B:
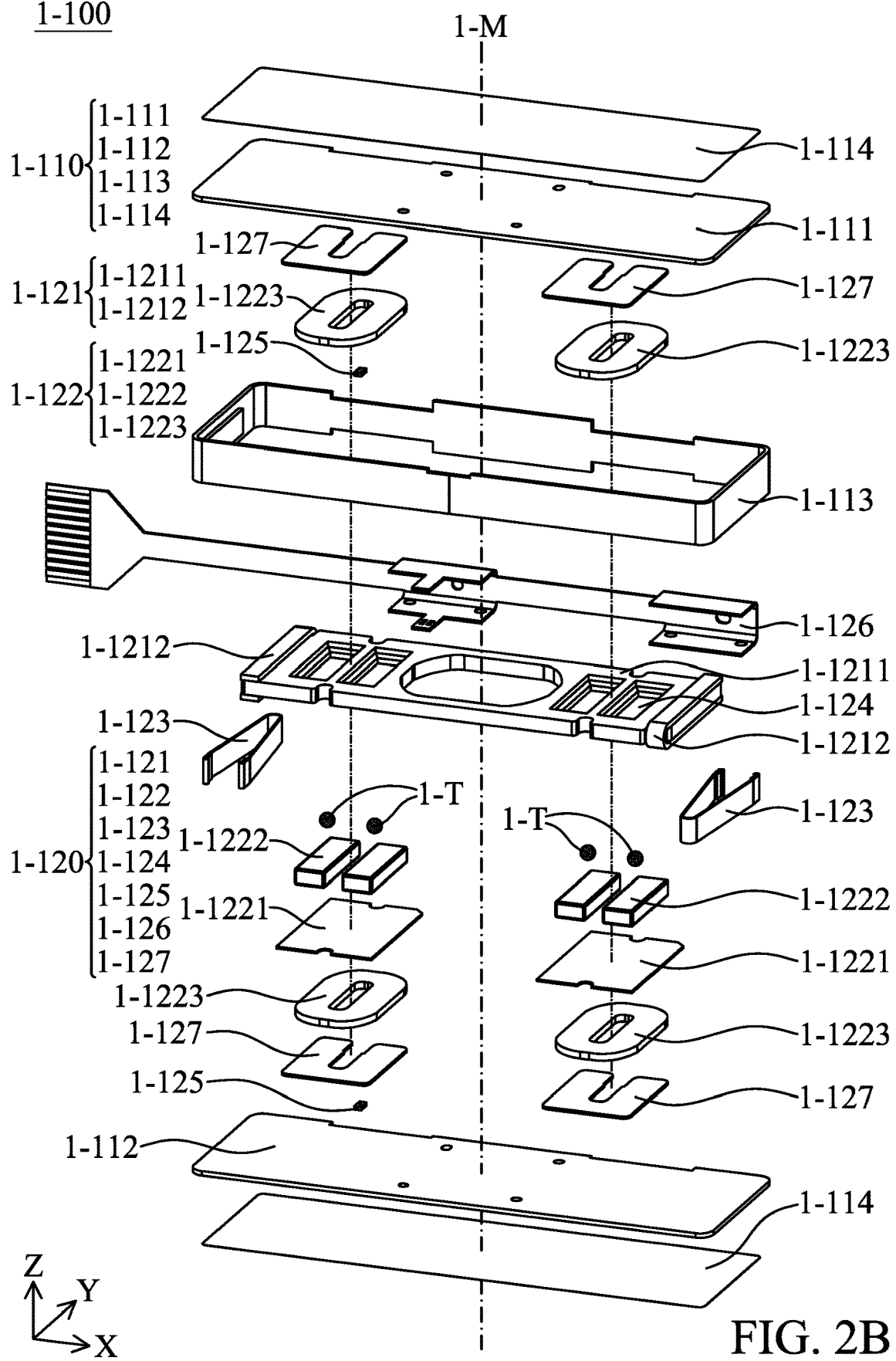
FIG. 2B shows an exploded view of the vibration module according to an embodiment of the invention.

Please refer to FIGS. 2A and 2B, FIG. 2A is a perspective view of the vibration module 1-100, and FIG. 2B is an exploded view of the vibration module 1-100. As shown in FIG. 2A, the vibration module 1-100 has a main axis 1-M, the main axis 1-M passes through a center 1-F of the vibration module 1-100. As shown in FIG. 2B, the vibration module 1-100 includes a fixed part 1-110, a first vibration part 1-120 and a connecting member 1-T. The fixed part 1-110 includes a top plate 1-111, a bottom plate 1-112, an outer frame 1-113 and two cover elements 1-114. The first vibration part 1-120 includes a first moving member 1-121, two first driving assemblies 1-122, a first elastic element 1-123, a glue recess 1-124, a position sensing assembly 1-125, a first circuit assembly 1-126 and two supporting elements 1-127. The first moving member 1-121 includes a first moving member body 1-1211 and two first moving member connecting portions 1-1212. Each of the first driving assemblies 1-122 includes a magnetic conductive element 1-1221, a first magnetic element 1-1222 and two first coils 1-1223.

Figure 3A:
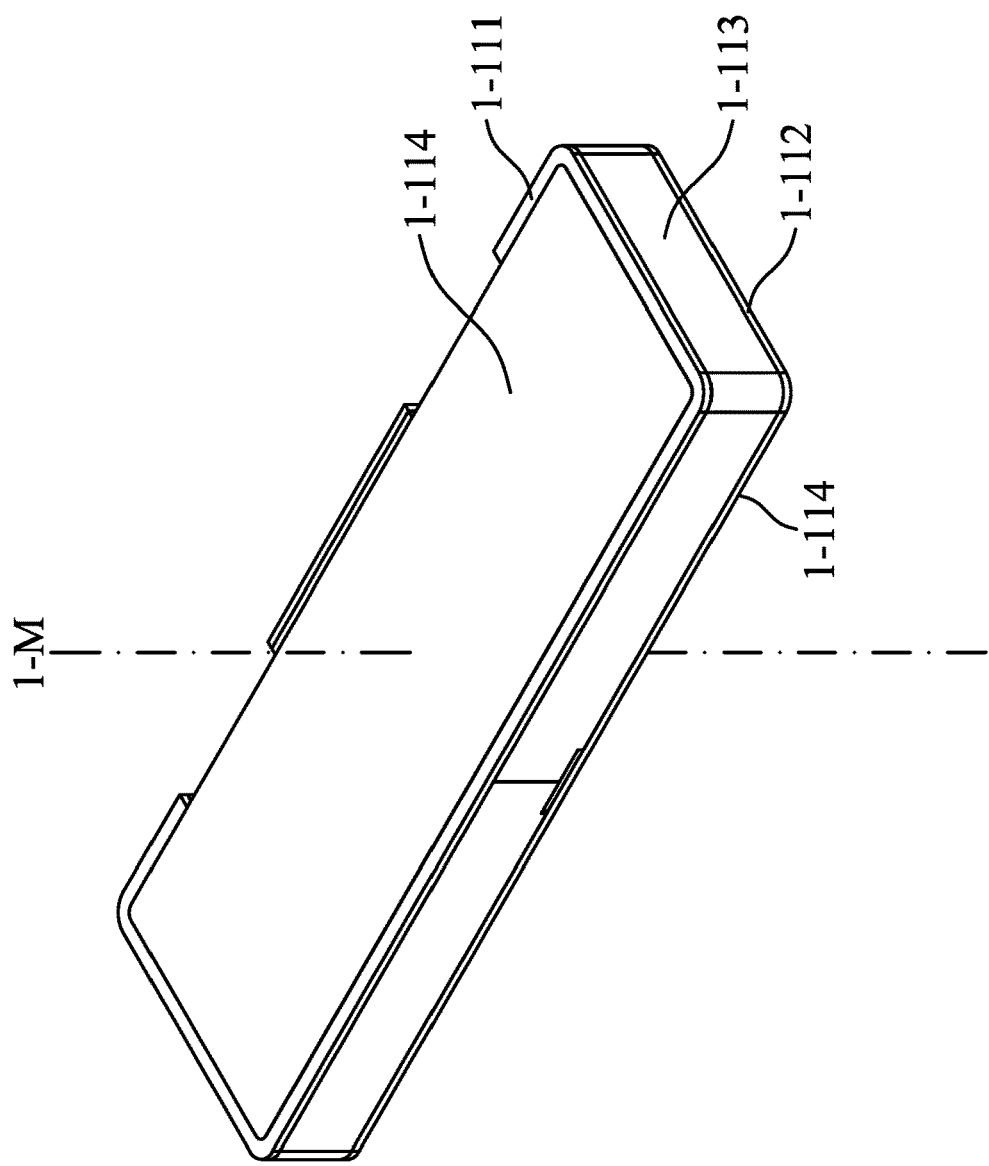
FIG. 3A shows a schematic view of a fixed part of the vibration module according to an embodiment of the invention.
Figure 3B:
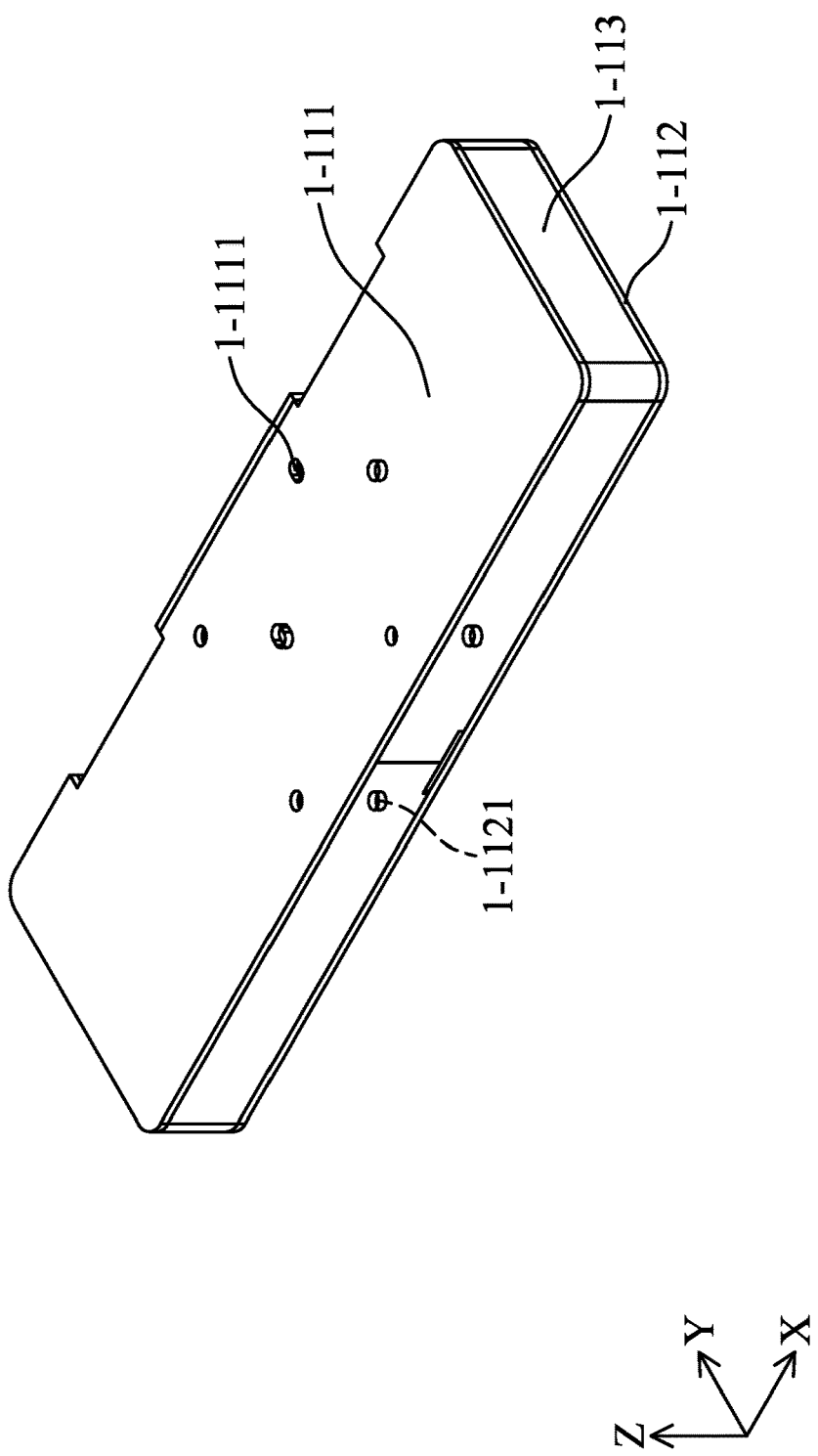
FIG. 3B shows a schematic view of a top plate, a bottom plate and an outer frame according to an embodiment of the invention.

Please refer to FIG. 3A, FIG. 3A is a schematic view of the fixed part 1-110 of the vibration module 1-100. The outer frame 1-113 is located between the top plate 1-111 and the bottom plate 1-112. The top plate 1-111 covers the upper portion of the outer frame 1-113, and the bottom plate 1-112 covers the lower portion of the outer frame 1-113. Therefore, the main axis 1-M also passes through the top plate 1-111 and the bottom plate 1-112. The top plate 1-111, the bottom plate 1-112 and the outer frame 1-113 may be made of a non-ferromagnetic metal, and preferably the density of this non-ferromagnetic metal is greater than the density of a plastic material. Please refer to FIG. 3B, FIG. 3B is a schematic view of the top plate 1-111, the bottom plate 1-112 and the outer frame 1-113. The top plate 1-111 has a through hole 1-1111, and the bottom plate 1-112 has a through hole 1-1121, wherein the through hole 1-1121 is shown as a dashed line. The through hole 1-1111 and the through hole 1-1121 are helpful to position of the elements disposed in the vibration module 1-100 and the assembly of the vibration module 1-100.

Please refer to FIG. 3A again, the two cover elements 1-114 are located above the top plate 1-111 and below the bottom plate 1-112, respectively. The cover element 1-114 located above the top plate 1-111 covers the through hole 1-1111, and the cover element 1-114 located below the bottom plate 1-112 covers the through hole 1-1121. That is, the cover element 1-114 above the top plate 1-111 completely overlaps the through holes 1-1111, and the cover element 1-114 below the bottom plate 1-112 completely overlaps the through holes 1-1121 when viewed along the main axis 1-M. Thus, the through hole 1-1111 and the through hole 1-1121 are not exposed to the outside, and thus avoiding the external dust or water entering the vibration module 1-100 via the through holes 1-1111 or the through hole 1-1121, thereby achieving the effects of waterproof and dustproof. The cover element 1-114 may be a shielding material such as a light-shielding sheet.

Figure 3C:
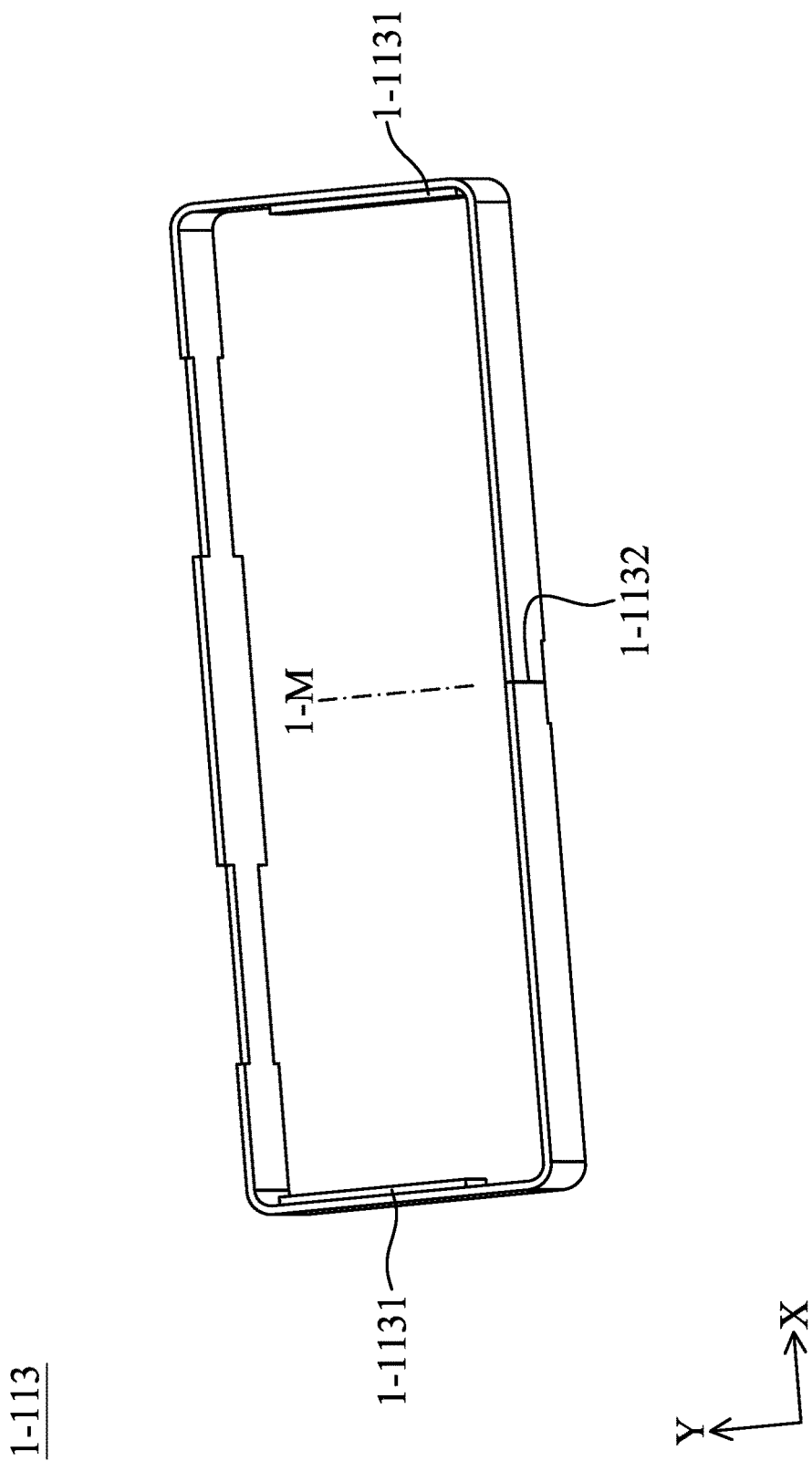
FIG. 3C shows a schematic view of the outer frame according to an embodiment of the invention.
Figure 3D:
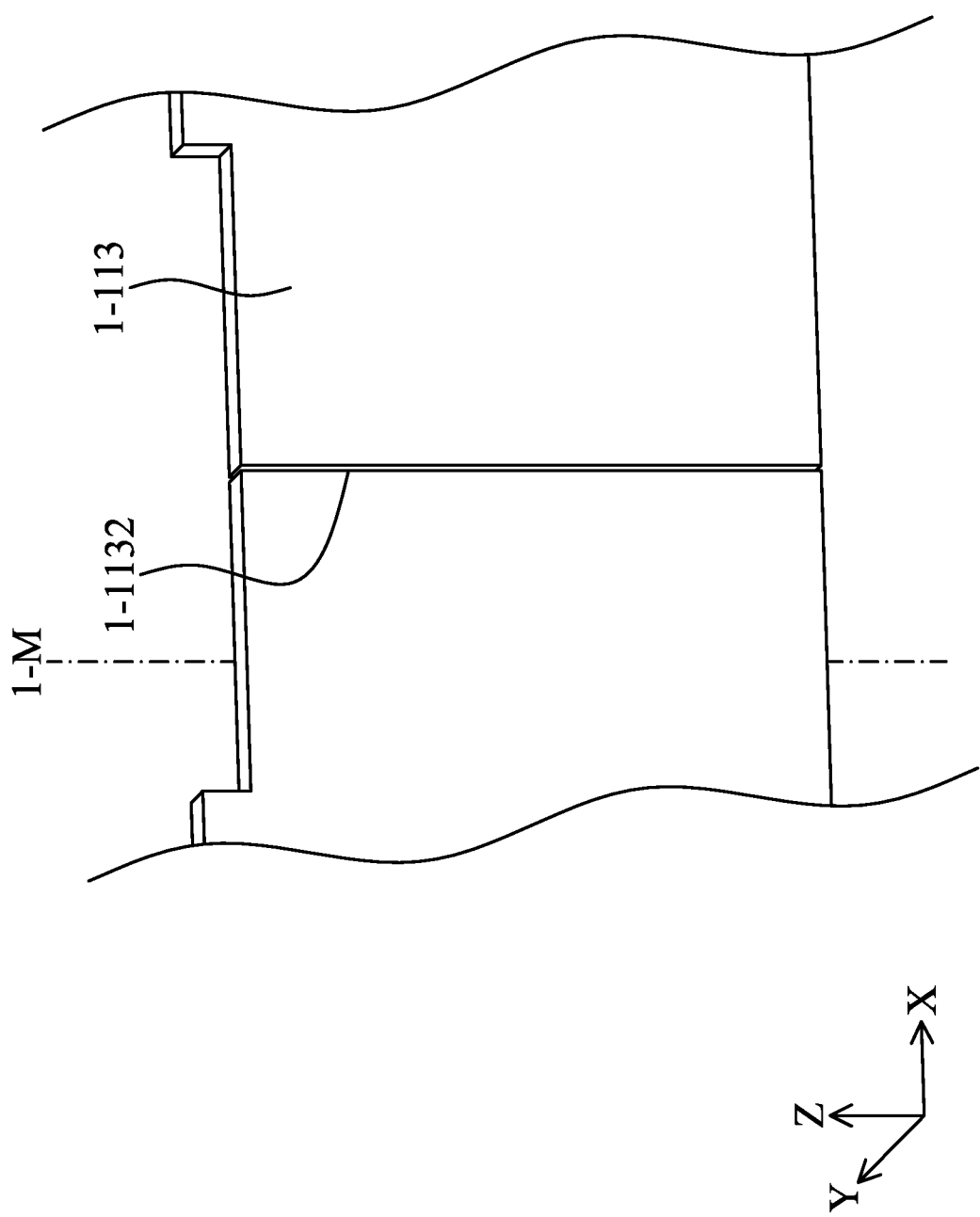
FIG. 3D shows a partial schematic view of the outer frame according to an embodiment of the invention.

FIG. 3C is a schematic view of the outer frame 1-113, and FIG. 3D is a partial schematic view of the outer frame 1-113. As shown in FIG. 3C, the outer frame 1-113 is shaped centered on the main axis 1-M, and the outer frame 1-113 includes two welding portions 1-1131 and a gap 1-1132. The welding portions 1-1131 are located on both sides of the outer frame 1-113, and extends along the outer frame 1-113. As shown in FIG. 3D, the gap 1-1132 of the outer frame 1-113 traverse the outer frame 1-113 along the main axis 1-M. That is, the outer frame 1-113 is disconnected at the gap 1-1132 by the gap 1-1132, therefore, the outer frame 1-113 is not circumferentially connected to be an integrity, and a circuit board, plastic member, solder, or the light-shielding sheet may be used to shield the gap 1-1132 to prevent foreign matters from entering the vibration module 1-100. In fact, the outer frame 1-113 may be a metal sheet which is bent and shaped, rather than cast molding, by centering on the main axis 1-M. Thus, the complexity in manufacturing the vibration module 1-100 may be reduced, thereby reducing the cost in manufacturing the vibration module 1-100.

Figure 4A:
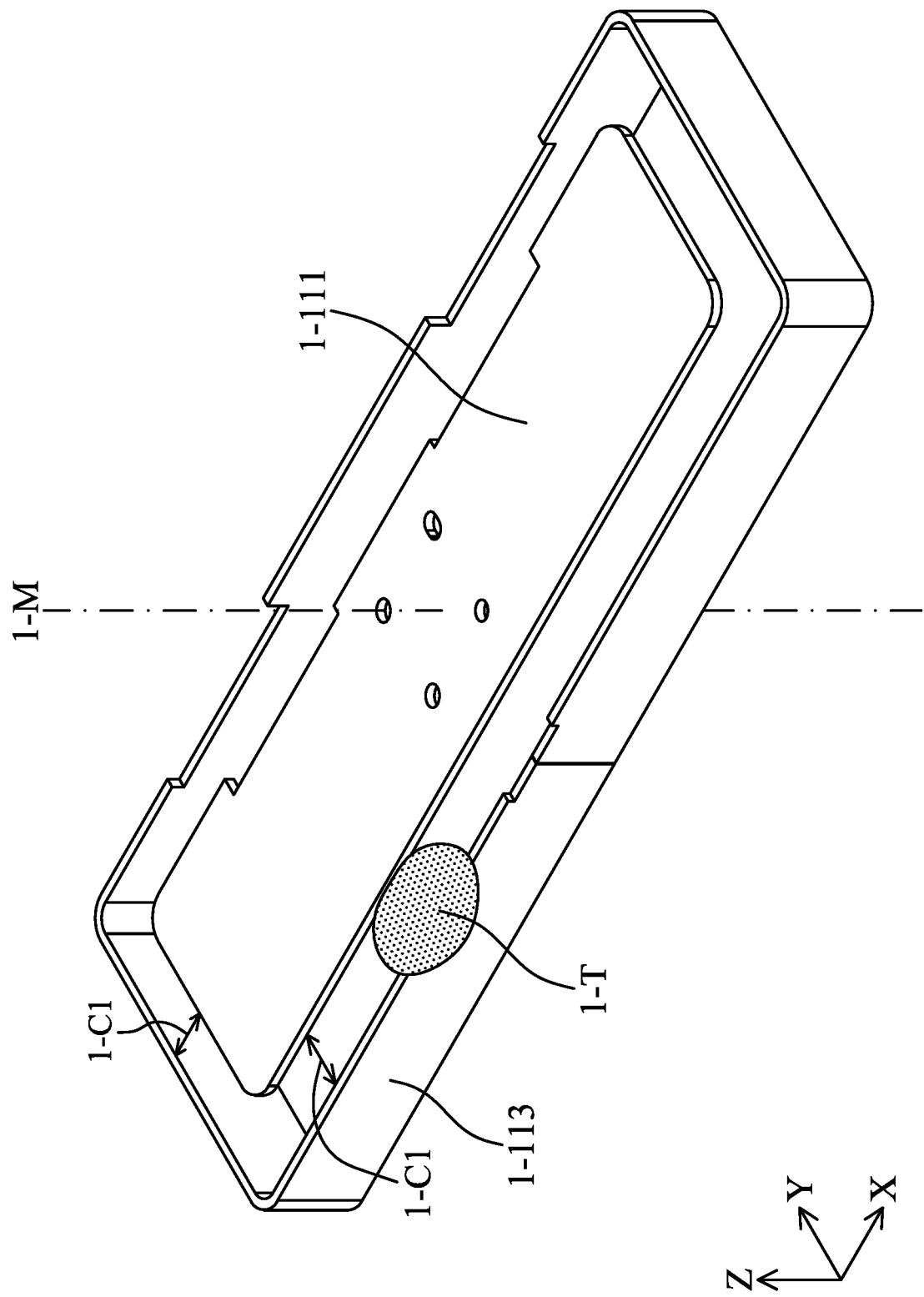
FIG. 4A shows a partial schematic view of the top plate and the outer frame according to an embodiment of the invention.
Figure 4B:
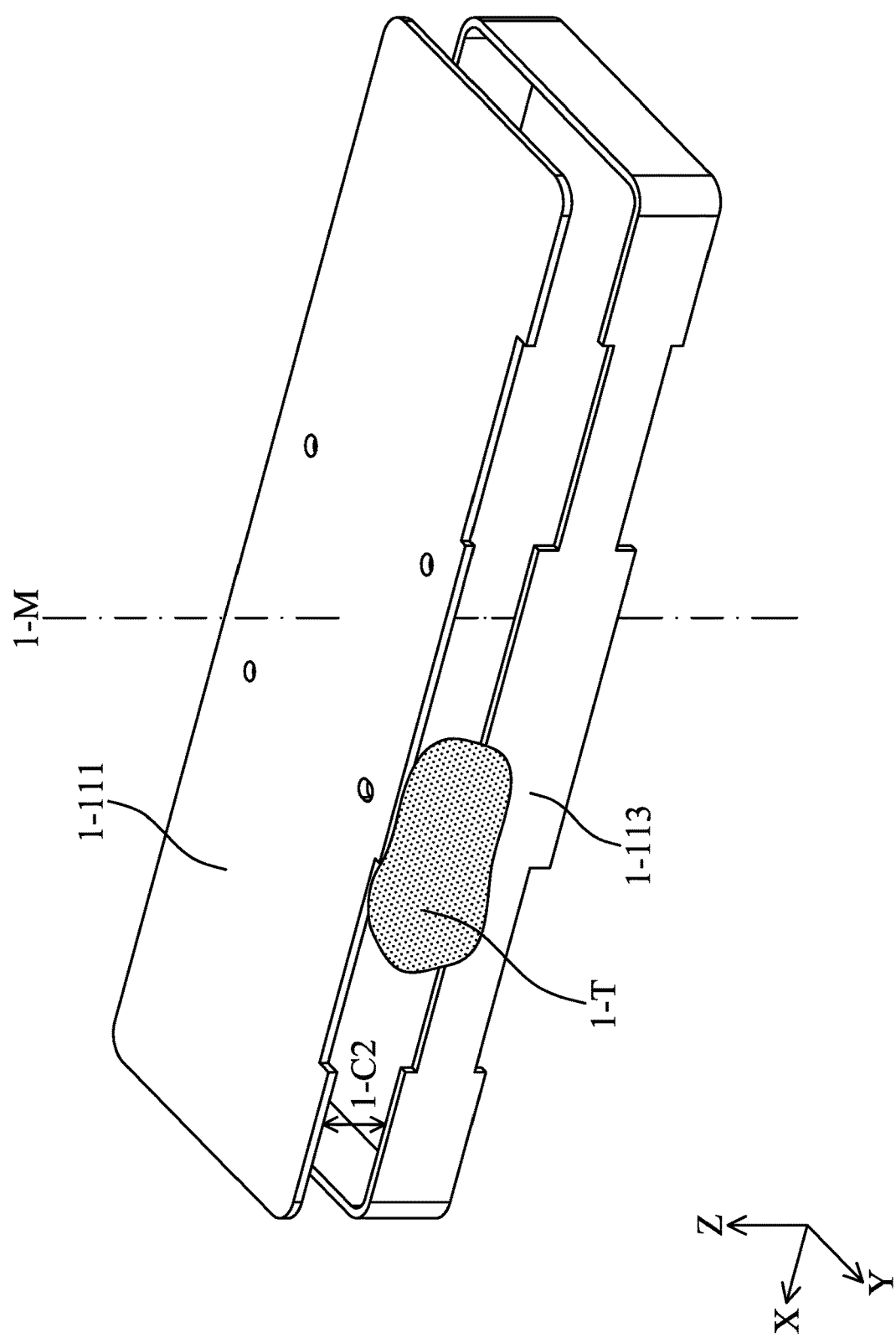
FIG. 4B shows a partial schematic view of the top plate and the outer frame according to another embodiment of the invention.

FIGS. 4A and 4B are partial schematic views of the top plate 1-111 and outer frame 1-113 according to different embodiments. As shown in FIG. 4A, in one embodiment, the top plate 1-111 is not directly connected to the outer frame 1-113, and there is a gap 1-C1 between the top plate 1-111 and the outer frame 1-113 when viewed along the main axis 1-M. As shown in FIG. 4B, in another embodiment, the top plate 1-111 is not directly connected to the outer frame 1-113, and there is a gap 1-C2 between the top plate 1-111 and the outer frame 1-113 when viewed in a direction perpendicular to the main axis 1-M. As shown in FIGS. 4A and 4B, the connecting member 1-T is provided between the top plate 1-111 and the outer frame 1-113 to fix the top plate 1-111 to the outer frame 1-113. The connecting member 1-T may be a light-shielding sheet, or a material such as solder or adhesive.

Figure 4C:
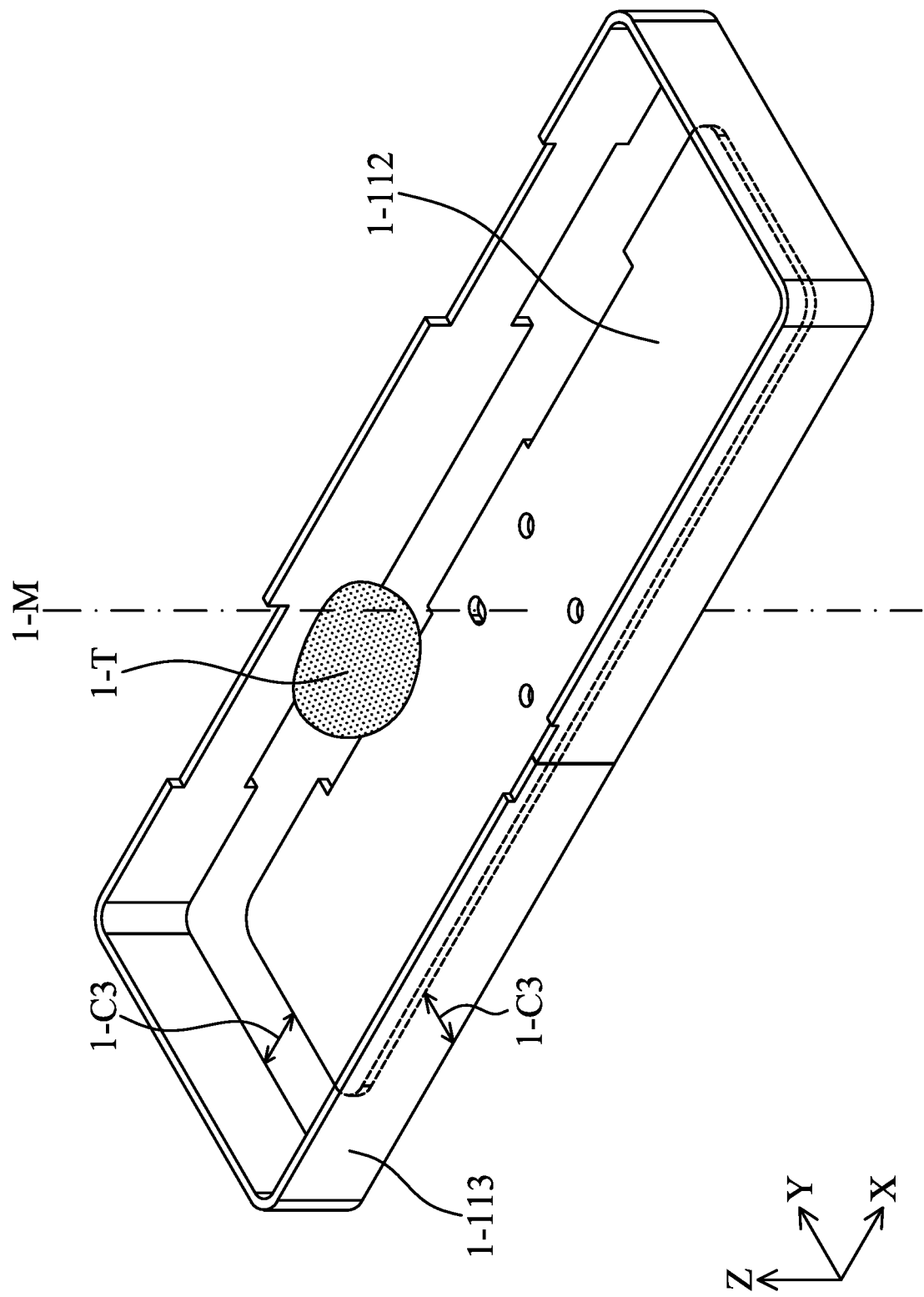
FIG. 4C shows a partial schematic view of the bottom plate and the outer frame according to an embodiment of the invention.
Figure 4D:
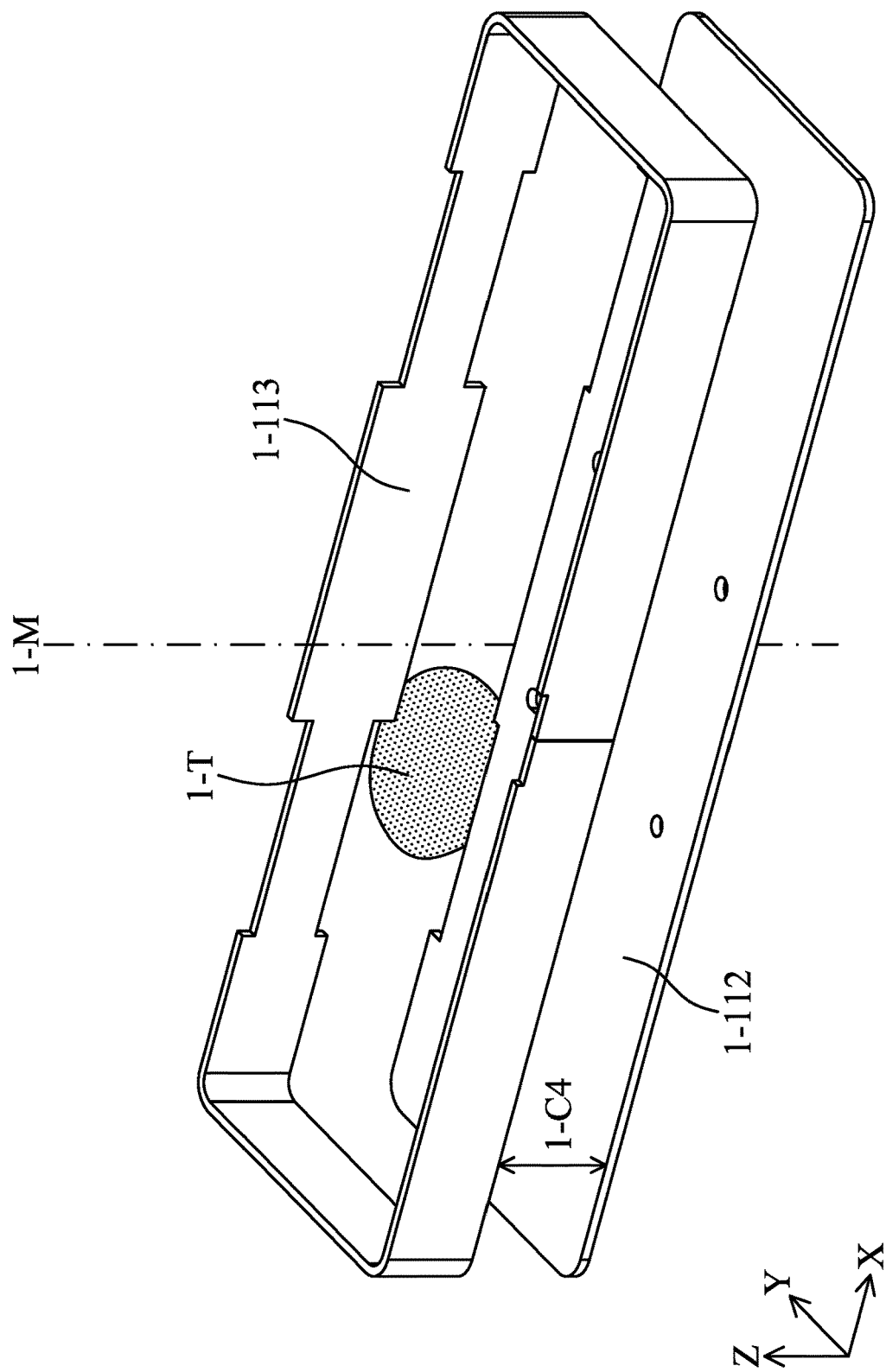
FIG. 4D shows a partial schematic view of the bottom plate and the outer frame according to another embodiment of the invention.

FIGS. 4C and 4D are partial schematic views of the bottom plate 1-112 and the outer frame 1-113 according to different embodiments. As shown in FIG. 4C, in one embodiment, the bottom plate 1-112 is not directly connected to the outer frame 1-113, and there is a gap 1-C3 between the bottom plate 1-112 and the outer frame 1-113 when viewed along the main axis 1-M. As shown in FIG. 4D, in another embodiment, the bottom plate 1-112 is not directly connected to the outer frame 1-113, and there is a gap 1-C4 between the bottom plate 1-112 and the outer frame 1-113 when viewed in a direction perpendicular to the main axis 1-M. As shown in FIGS. 4C and 4D, the connecting member 1-T is provided between the bottom plate 1-112 and the outer frame 1-113 to fix the bottom plate 1-112 to the outer frame 1-113. The connecting member 1-T may be a light-shielding sheet, or a material such as solder or adhesive.

Figure 5A:
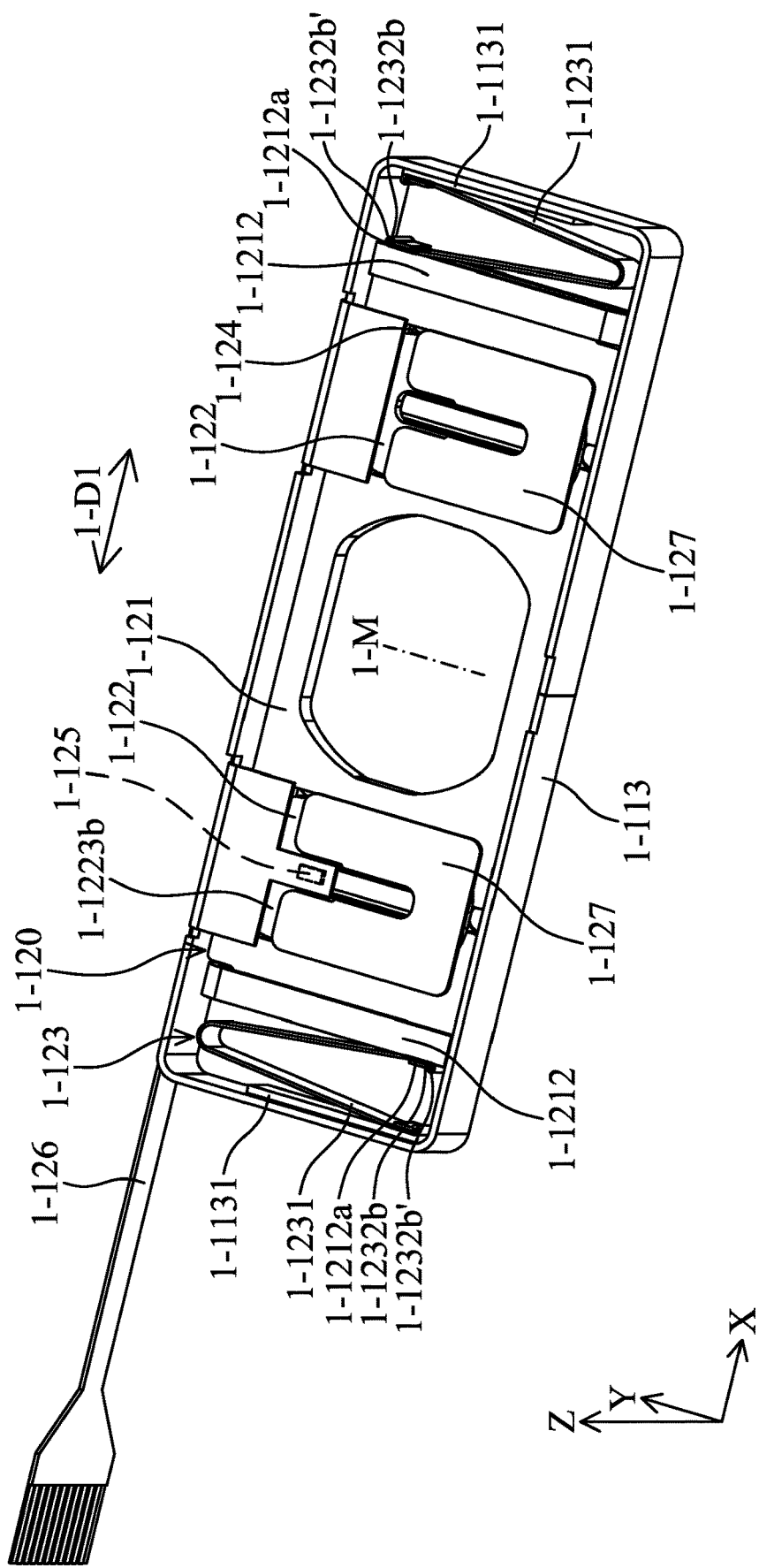
FIG. 5A shows a schematic view of the outer frame and a first vibration part according to an embodiment of the invention.
Figure 5B:
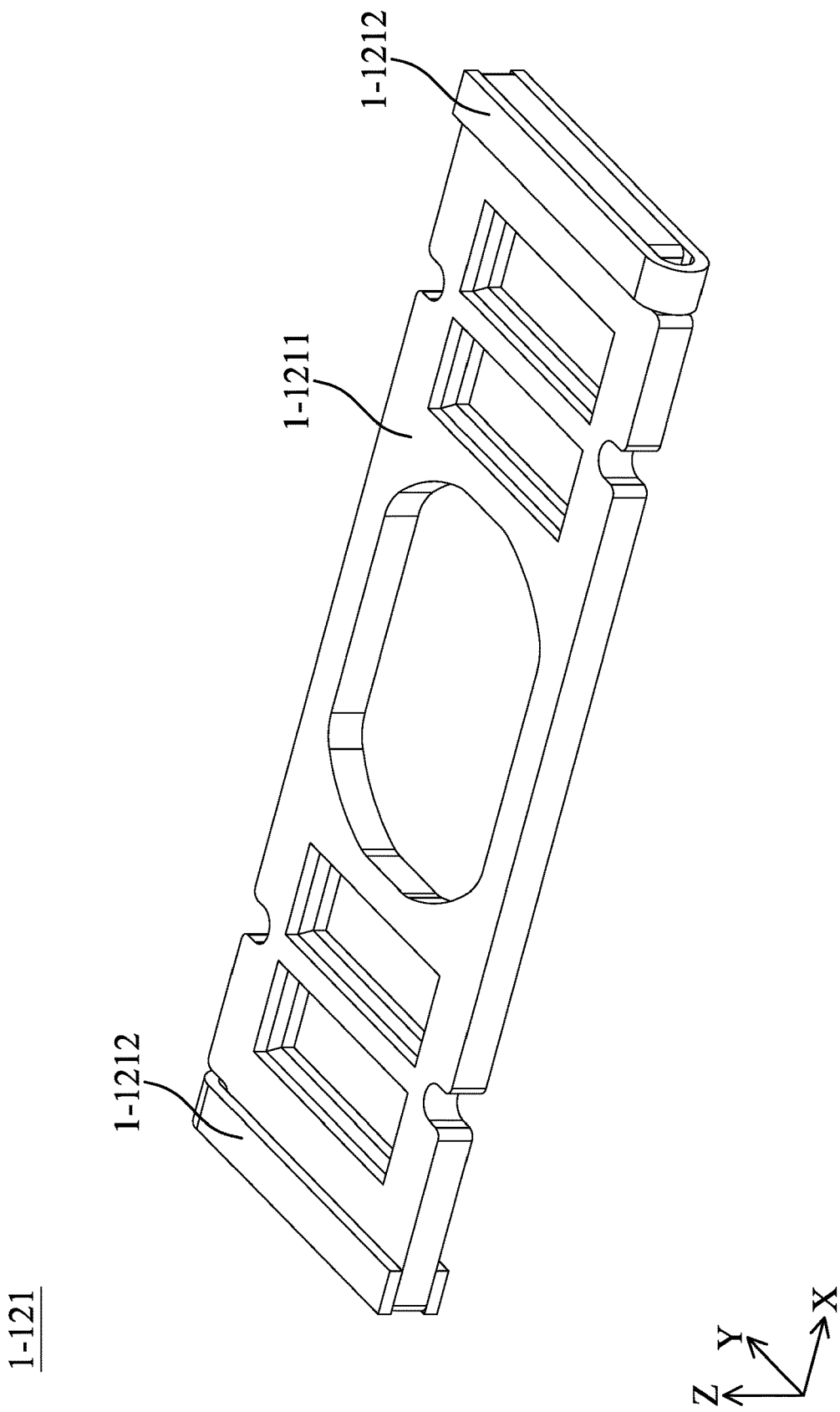
FIG. 5B shows a schematic view of a first moving member according to an embodiment of the invention.

FIG. 5A is a schematic view of the outer frame 1-113 and the first vibration part 1-120. As shown in FIG. 5A, the first vibration part 1-120 is disposed in the outer frame 1-113 of the fixed part 1-110. FIG. 5B is a schematic view of the first moving member 1-121. As shown in FIG. 5B, the first moving member 1-121 has a plate-like structure, and the outer frame 1-113 of the fixed part 1-110 is centered on the main axis 1-M and surrounds the first moving member 1-121 (may refer to FIG. 5A). The first moving member connecting portion 1-1212 of the first moving member 1-121 protrudes from the first moving member body 1-1211.

Please refer to FIG. 5A, the first driving assemblies 1-122 are located at the different ends of the first moving member 1-121, and the first driving assemblies 1-122 drive the first moving member 1-121 to move relative to the fixed part 1-110. Specifically, the first driving assembly 1-122 drives the first moving member 1-121 to move relative to the fixed part 1-110 along a first direction 1-D1, and the first direction 1-D1 is not parallel to the main axis 1-M. More specifically, the first direction 1-D1 is perpendicular to the main axis 1-M.

Figure 6:
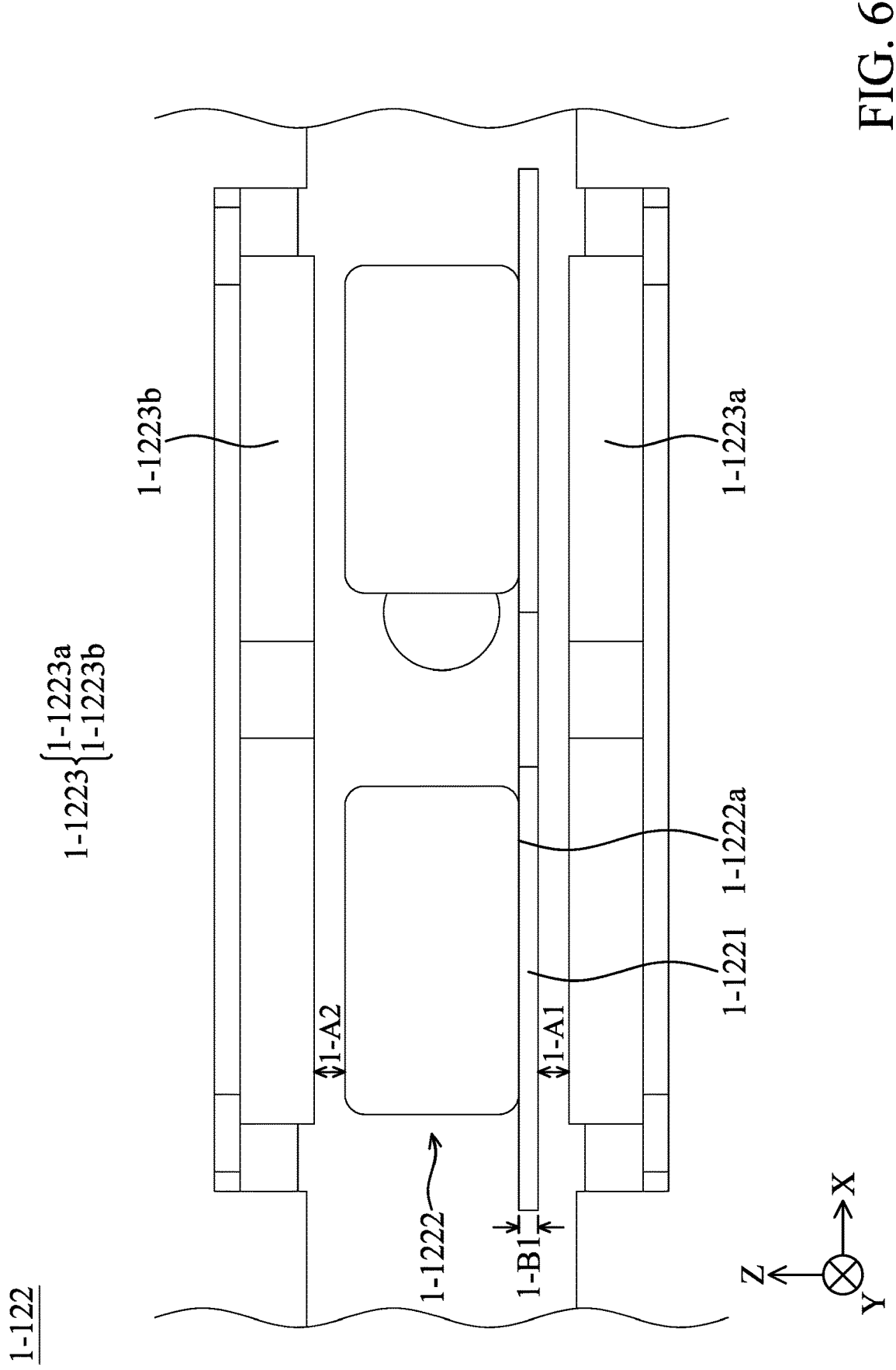
FIG. 6 shows a schematic view of a first driving assembly according to an embodiment of the invention.

Please refer to FIG. 6, FIG. 6 is a schematic view of the first driving assembly 1-122. In the embodiment shown in FIG. 6, each of the first driving assemblies 1-122 includes two first coils 1-1223. In some embodiments, each of the first driving assemblies 1-122 may include more than two first coils 1-1223. However, in other embodiments, each of the first driving assemblies 1-122 may include only one first coil 1-1223. The magnetic conductive element 1-1221 may be connected to the first moving member body 1-1211 (not shown in FIG. 6) of the first moving member 1-121 by soldering, welding or adhering. In one embodiment, the magnetic conductive element 1-1221 may have holes (not shown) to adjust the strength of the magnetic force generated by the first magnetic element 1-1222. The two first coils 1-1223 are respectively located above and below the first magnetic element 1-1222, the first coil 1-1223 located below the first magnetic member 1-1222 is first coil 1-1223a, and the first coil 1-1223 located above the first magnetic member 1-1222 is first coil 1-1223b. The first coil 1-1223a and the first coil 1-1223b at least partially overlap each other when viewed along the main axis 1-M. The magnetic conductive element 1-1221 is disposed between the first magnetic element 1-1222 and the first coil 1-1223a. Specifically, the magnetic conductive element 1-1221 is disposed on a surface 1-1222a of the first magnetic element 1-1222 which faces the first coil 1-1223a. The first magnetic element 1-1222 may be a permanent magnet. In the present embodiment, the first magnetic element 1-1222 includes two permanent magnets, and the magnetic poles of the permanent magnets are staggered. That is, when the north seeking pole of one of the permanent magnets faces the magnetic conductive element 1-1221, the south seeking pole of another permanent magnet faces the magnetic conductive element 1-1221, and vice versa. The shortest distance 1-A1 between the magnetic conductive element 1-1221 and the first coil 1-1223a is substantially the same as the shortest distance 1-A2 between the first magnetic element 1-1222 and the first coil 1-1223b. Since the magnetic conductive element 1-1221 has a thickness B, the shortest distance between the first magnetic element 1-1222 and the first coil 1-1223a is different from the shortest distance between the first magnetic element 1-1222 and the first coil 1-1223b. Thus, during the operation, the deviation variables may be reduced so that the vibration module 1-100 is more stable.

Please refer to FIG. 5A again, the first elastic element 1-123 includes two springs 1-1231. In other embodiments, the first elastic element 1-123 may include more than two springs 1-1231. Each spring 1-1231 is fixedly connected to (e.g., welding) the first moving member connecting portion 1-1212 of the first moving member 1-121, and is fixed to the welding portion 1-1131 of the outer frame 1-113 by welding. Thus, the first moving member 1-121 may be movably connected to the frame 1-113 by the springs 1-1231, and the first moving member 1-121 is supported by the springs 1-1231 without contact with the bottom plate 1-112. The two springs 1-1231 are respectively located at both sides of the first moving member 1-121, and the springs 1-1231 are respectively disposed in the opposite directions. More specifically, the two springs 1-1231 respectively include a recessed structure, and the openings of the recessed structures face different directions. Thus, the first moving member 1-121 is prevented from generating movements along a direction other than the first direction 1-D1. For example, the first moving member 1-121 may be prevented from generating movements along the main axis 1-M or a direction perpendicular to the first direction 1-D1.

Figure 7:
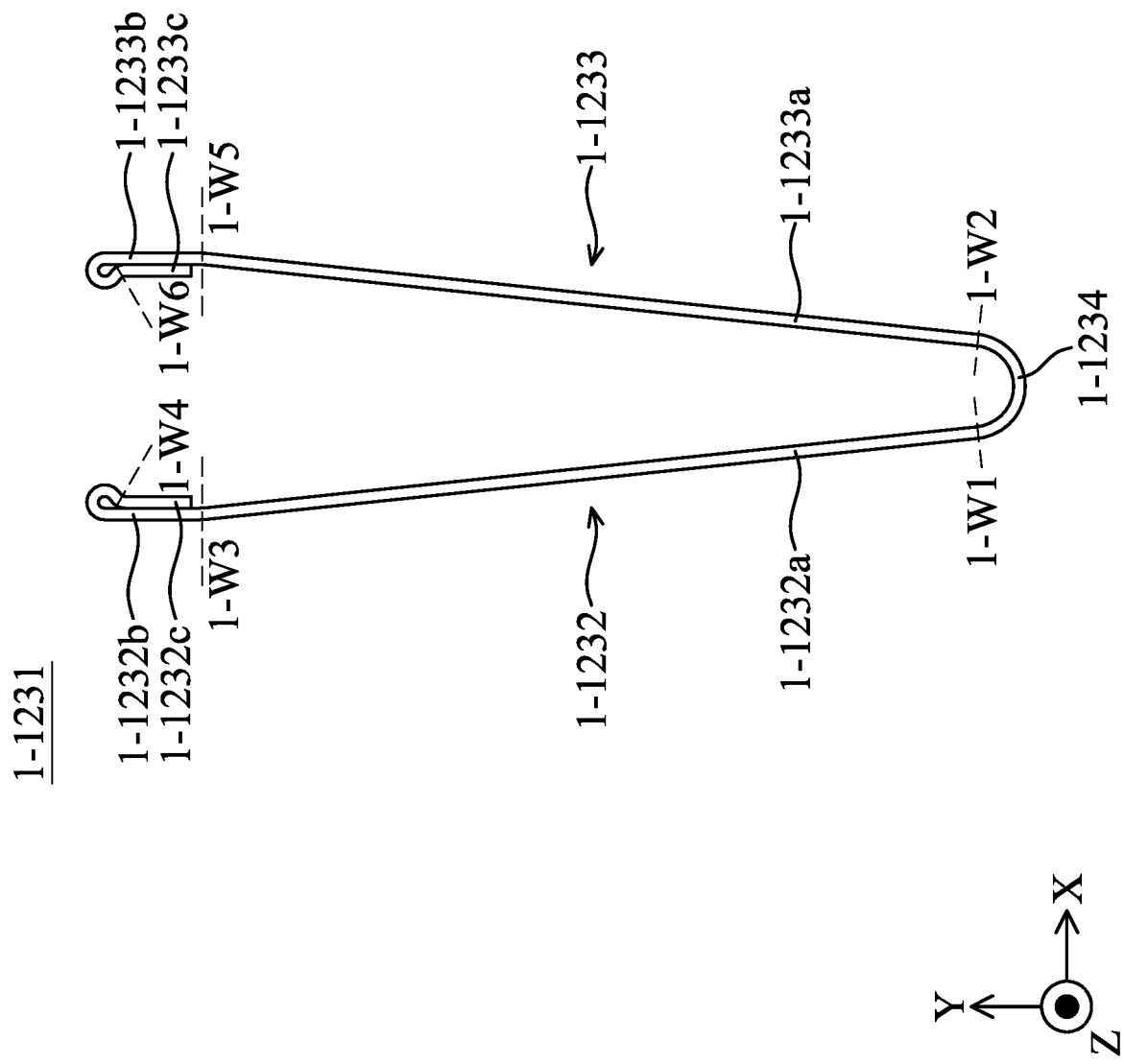
FIG. 7 shows a schematic view of a spring according to an embodiment of the invention.

FIG. 7 is a schematic view of the spring 1-1231. Each spring 1-1231 includes a first segment 1-1232, a second segment 1-1233, and a bent portion 1-1234. The first segment 1-1232 is connected to the second segment 1-1233 through the bent portion 1-1234. The boundary between the first segment 1-1232 and the bent portion 1-1234 is a dashed line 1-W1, and the boundary between the second segment 1-1233 and the bent portion 1-1234 is a dashed line 1-W2. The first segment 1-1232 includes a first straight section 1-1232a, a first bent section 1-1232b and a first folded section 1-1232c extending at different angles, wherein the boundary between the first straight section 1-1232a and the first bent section 1-1232b is a dashed line 1-W3, and the boundary between the first bent section 1-1232b and the first folded section 1-1232c is a dashed line 1-W4. The second segment 1-1233 includes a second straight section 1-1233a, a second bent section 1-1233b and a second folded section 1-1233c extending at different angles, wherein the boundary between the second straight section 1-1233a and the second bent section 1-1233b is a dashed line 1-W5, and the boundary between the second bent section 1-1233b and the second folded section 1-1233c is a dashed line 1-W6. The first bent section 1-1232b at least partially overlaps the second bent section 1-1233b when viewed along the direction perpendicular to the main axis 1-M.

The first bent section 1-1232b extends from the dashed line 1-W3, bends greater than 180 degrees and connects to the first folded section 1-1232c. The first bent section 1-1232b at least partially overlaps the first folded section 1-1232c when viewed along the direction perpendicular to the main axis 1-M. Similarly, the second bent section 1-1233b extends from the dashed line 1-W5, bends greater than 180 degrees and connects to the second folded section 1-1233c. The second bent section 1-1233b at least partially overlaps the second folded section 1-1233c when viewed along the direction perpendicular to the main axis 1-M. Thus, the first bent section 1-1232b, the first folded section 1-1232c, the second bent section 1-1233b and the second folded section 1-1233c may be beneficial to the welding between the spring 1-1231 and the outer frame 1-113 and the first moving member connecting portion 1-1212, and may prevent the spring 1-1231 from breaking.

Please refer to FIG. 5A again, the first bent section 1-1232b is fixedly connected to (e.g., welding) first moving member connecting portion 1-1212 of the first moving member 1-121. A surface 1-1232b' of the first bent section 1-1232b is flush with a surface 1-1212a of the first moving member connecting portion 1-1212, and is not parallel to the main axis 1-M.

Figure 8A:
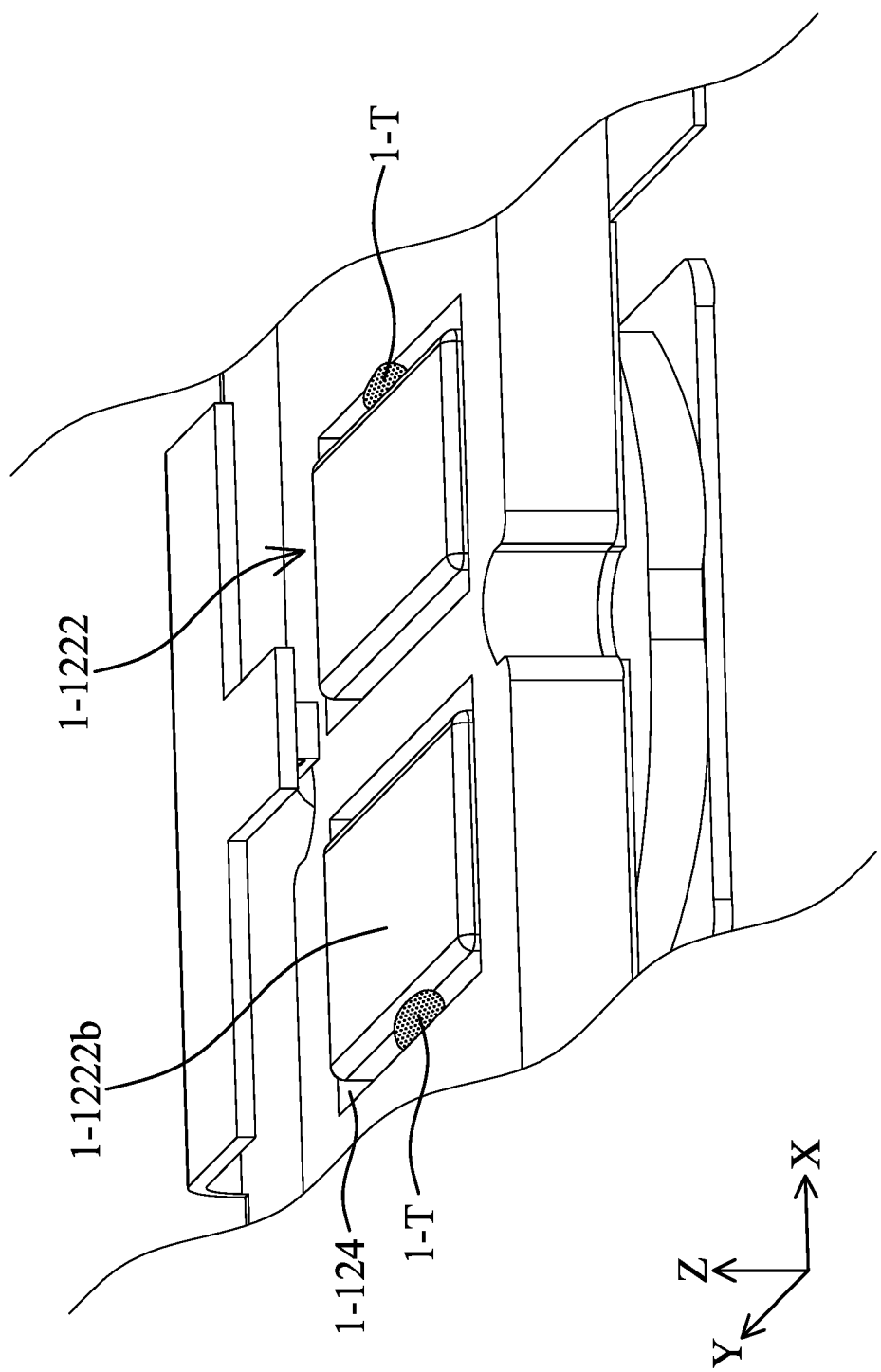
FIG. 8A shows a schematic view of a first magnetic element and a glue recess according to an embodiment of the invention.
Figure 8B:
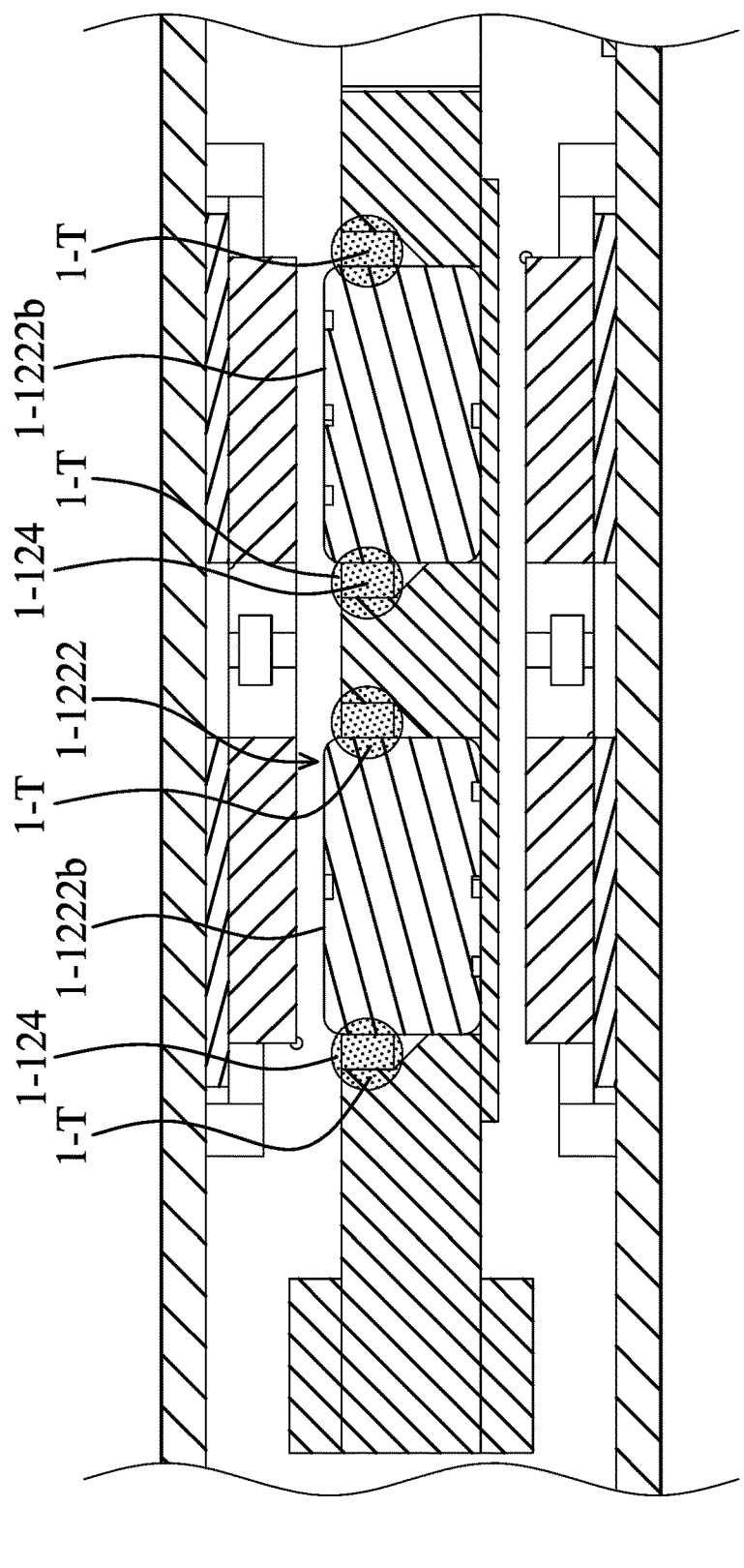
FIG. 8B shows a partial cross-sectional view along line 1-A-1-A in FIG. 2A according to an embodiment of the present invention.

Please refer to FIGS. 8A and 8B at the same time, FIG. 8A is a schematic view of a first magnetic element 1-1222 and the glue recess 1-124, FIG. 8B is a partial cross-sectional view along line 1-A-1-A in FIG. 2A. The glue recess 1-124 is disposed adjacent to the first magnetic element 1-1222. A surface 1-1222b (the surface of the first magnetic element 1-1222 which is not disposed with the magnetic conductive element 1-1221) of the first magnetic element 1-1222 which faces the first coil 1-1223b protrudes from the glue recess 1-124. Thus, a shortest distance 1-A1 between the magnetic conductive element 1-1221 and the first coil 1-1223a is substantially the same as a shortest distance 1-A2 between the surface 1-1222b and the first coil 1-1223b (may refer to FIG. 6). Similarly, during the operation, the deviation variables may be reduced so that the vibration module 1-100 is more stable. The glue recess 1-124 may be provided with the connecting member 1-T to fix the magnetic conductive element 1-1221. The connecting member 1-T disposed in the glue recess 1-124 may be a fixing material such as glue.

Figure 9A:
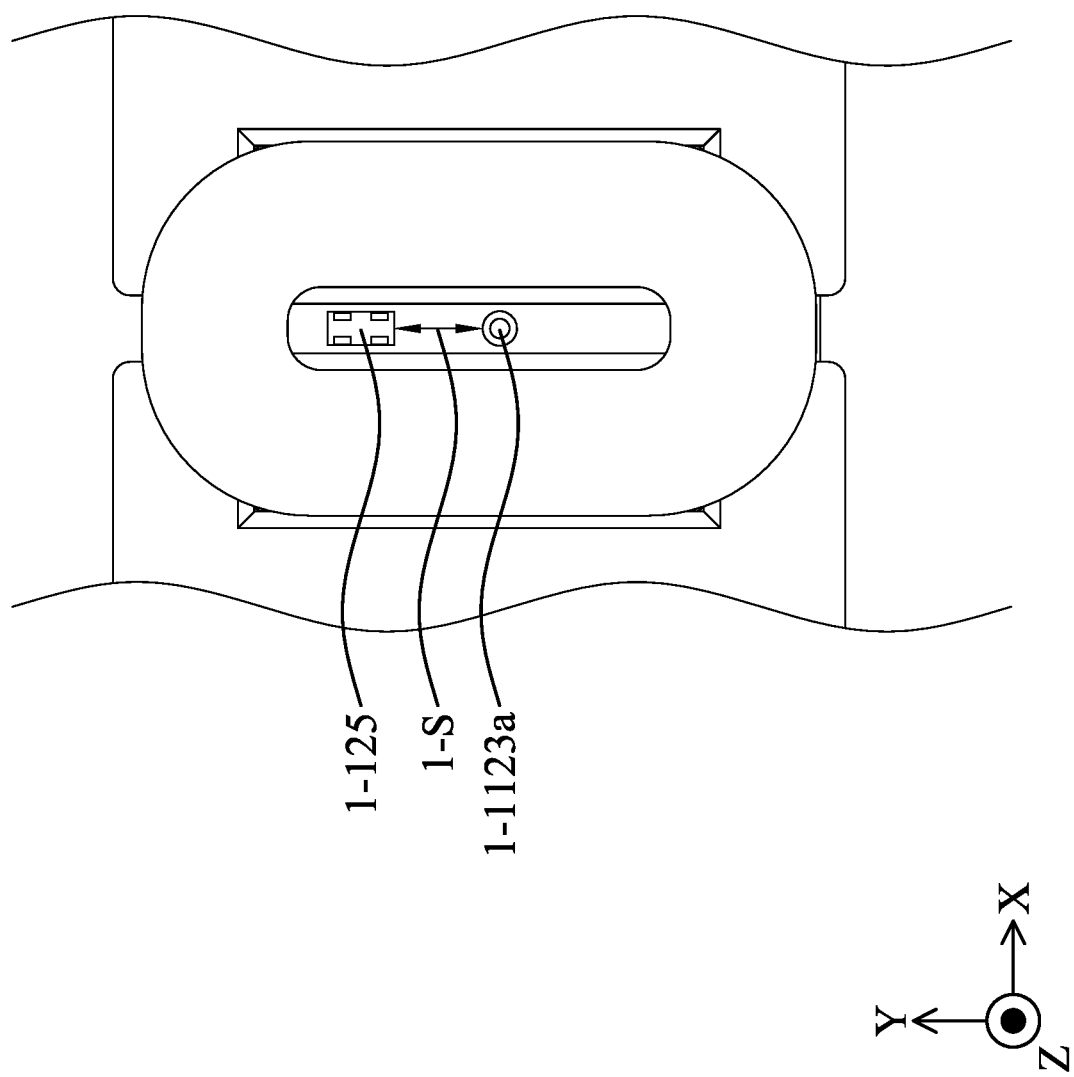
FIG. 9A shows a schematic view of a first coil and a position sensing assembly according to an embodiment of the invention.

Please refer to FIG. 9A, FIG. 9A is a schematic view of the first coil 1-1223 and the position sensing assembly 1-125. The position sensing assembly 1-125 may include a Hall sensor, which is disposed on the first circuit assembly 1-126 (not shown in FIG. 9A, may refer to the position sensing assembly 1-125 shown in dashed line in FIG. 5A), and the position sensing assembly 1-125 senses the movement of the first moving member 1-121 relative to the fixed part 1-110. More specifically, the position sensing assembly 1-125 may sense the movement of the first moving member 1-121 along the first direction 1-D1 relative to the fixed part 1-110. As shown in FIG. 9A, there is a non-zero distance S between the center of the position sensing assembly 1-125 and a winding axis 1123a of the first coil 1-1223. Thus, the miniaturization of the vibration module 1-100 may be achieved, and the risk of damage caused by excess extension of the first circuit assembly 1-126 may be prevented. The position sensing assembly 1-125 may also sense the vibration frequency of the vibration module 1-100 to determine the vibration frequency of the vibration module 1-100 if the vibration frequency of the vibration module 1-100 is the desired vibration frequency.

Figure 9B:
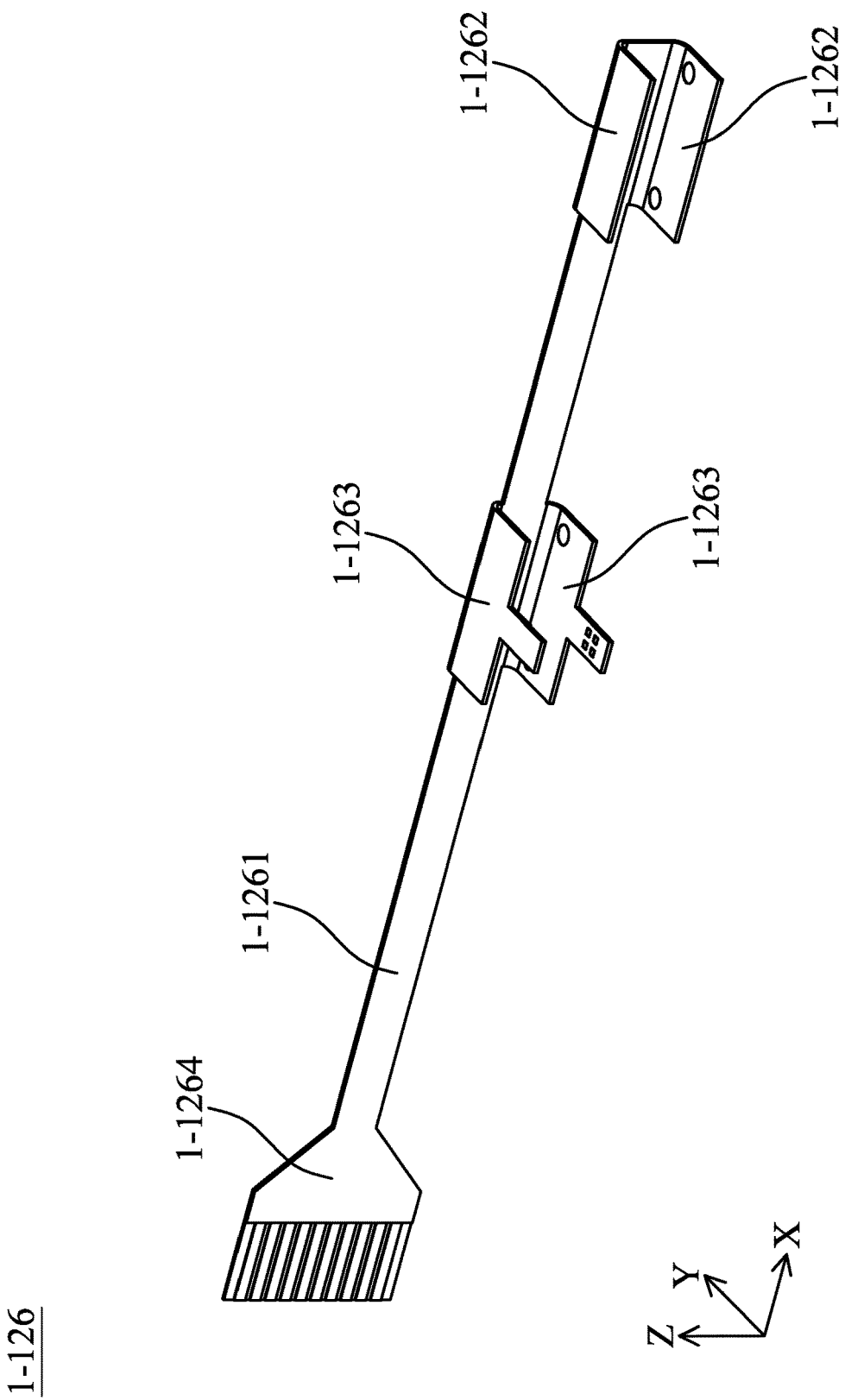
FIG. 9B shows a schematic view of a first circuit assembly according to an embodiment of the invention.

Please refer to FIG. 9B, FIG. 9B is a schematic view of the first circuit assembly 1-126. The first circuit assembly 1-126 has a first circuit assembly body 1-1261, two first extending portions 1-1262, two second extending portions 1-1263 and an external connecting portion 1-1264. The first circuit assembly body 1-1261 has a long plate shape. The first extending portion 1-1262 and the second extending portion 1-1263 respectively extend from the upper and the lower of the first circuit element body 1-1261, so as to be electrically connected to the first coil 1-1223 (refer to FIG. 5A). The second extending portion 1-1263 is provided with the position sensing assembly 1-125 (see FIG. 5A). The external connecting portion 1-1264 extends from the first circuit assembly body 1-1261 and receives external current. Therefore, the first circuit assembly 1-126 may direct external current to the first coil 1-1223.

Figure 10A:
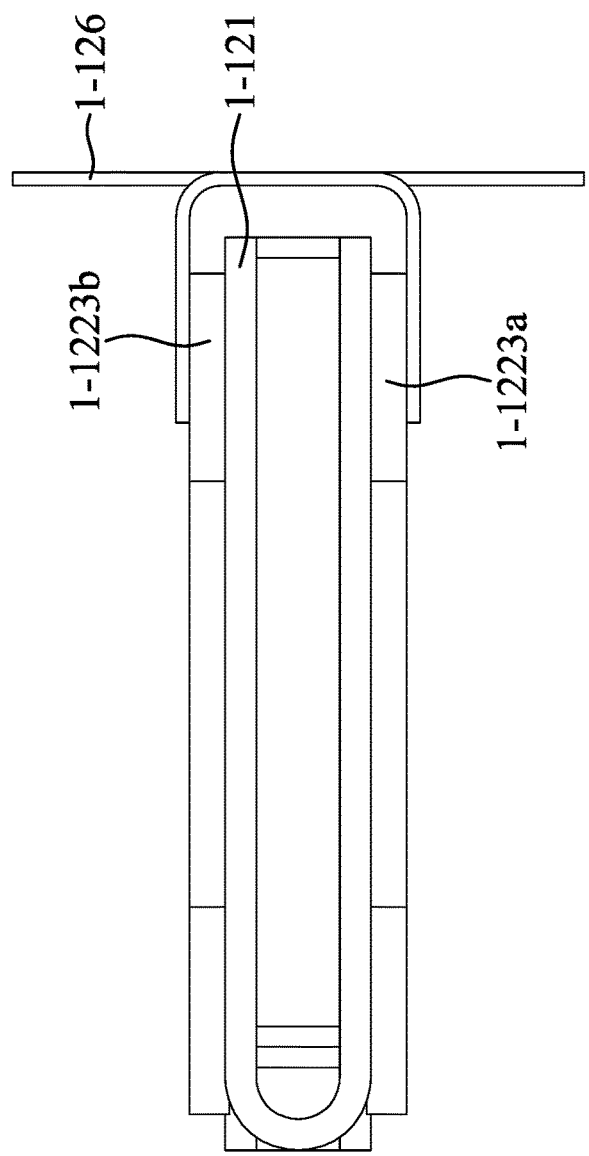
FIG. 10A shows a schematic view of the first moving member and the first circuit assembly viewed along a first direction according to an embodiment of the invention.
Figure 10A:
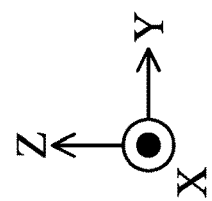
Figure 10B:
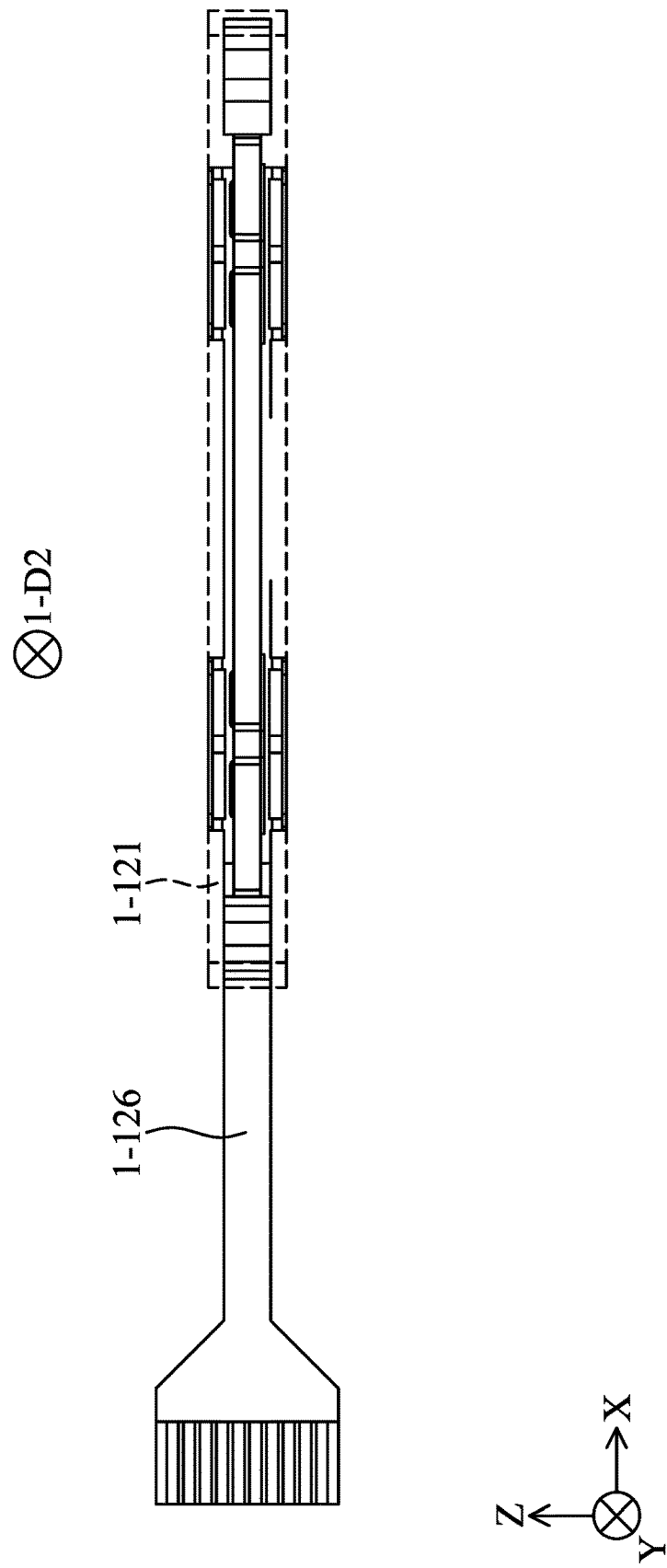
FIG. 10B shows a schematic view of the first moving member and the first circuit assembly viewed along a second direction according to an embodiment of the invention.

Please refer to FIG. 5 again, and refer to FIGS. 10A and 10B, FIG. 10A is a schematic view of the first moving member 1-121 and the first circuit assembly 1-126 viewed along the first direction 1-D1, and FIG. 10B is a schematic view of the first moving member 1-121 and the first circuit assembly 1-126 viewed along a second direction 1-D2, wherein the second direction 1-D2 is not parallel to the main axis 1-M and the first direction 1-D1. As shown in FIG. 5A, the first circuit assembly 1-126 extends to the upper of the first coil 1-1223b, so as to be electrically connected to the first coil 1-1223b. The first moving member 1-121 at least partially overlaps the first circuit assembly 1-126 when viewed along the main axis 1-M. As shown in FIG. 10A, the first circuit assembly 1-126 extends to the lower of the first coil 1-1223a, so as to be electrically connected to the first coil 1-1223a. The first moving member 1-121 does not overlap the first circuit assembly 1-126 when viewed along the first direction 1-D1 which is not parallel to the main axis 1-M. As shown in FIG. 10B, the first moving member 1-121

(shown as a dashed line) at least partially overlaps the first circuit assembly 1-126 when viewed along the second direction 1-D2. Specifically, as shown in FIG. 10A, the first circuit assembly 1-126 generally appears to a C or C shape when viewed along the first direction 1-D1, and a portion of the first moving member 1-121 is accommodated between the circuit assembly 1-126 in the C or C shape. Thus, the first circuit assembly 1-126 may be electrically connected to the first coil 1-1223a and the first coil 1-1223b, and the extending length of the first circuit assembly 1-126 is reduced, so as to achieve the effect of miniaturization. The first circuit assembly 1-126 is electrically connected to each of the first driving assembly 1-122, so as to supply current to the first driving assemblies 1-122, so that the first driving assembly 1-122 may drive the first moving member 1-121 to move.

Figure 11A:
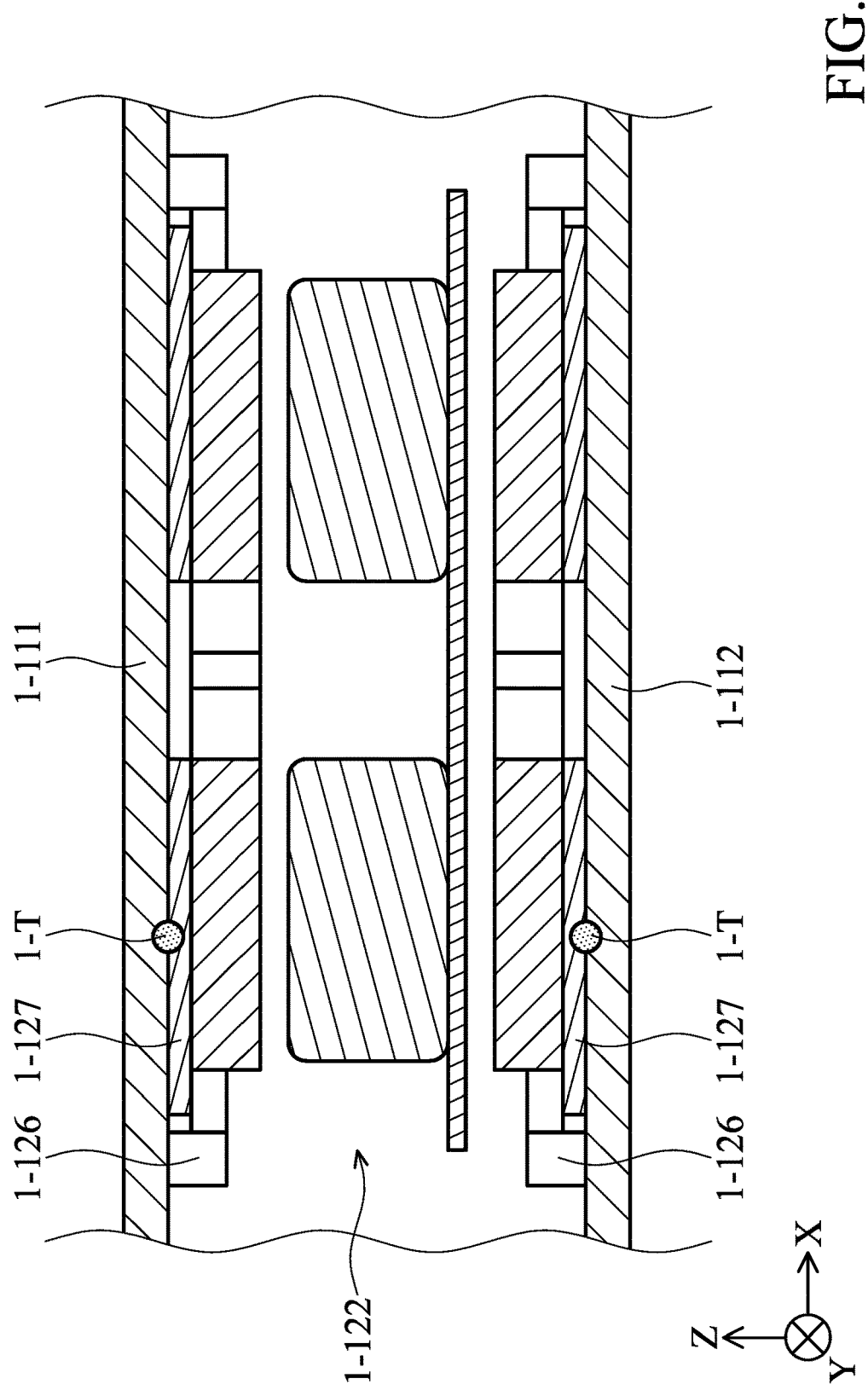
FIG. 11A shows a schematic view of the first driving assembly and a supporting element according to an embodiment of the invention.
Figure 11B:
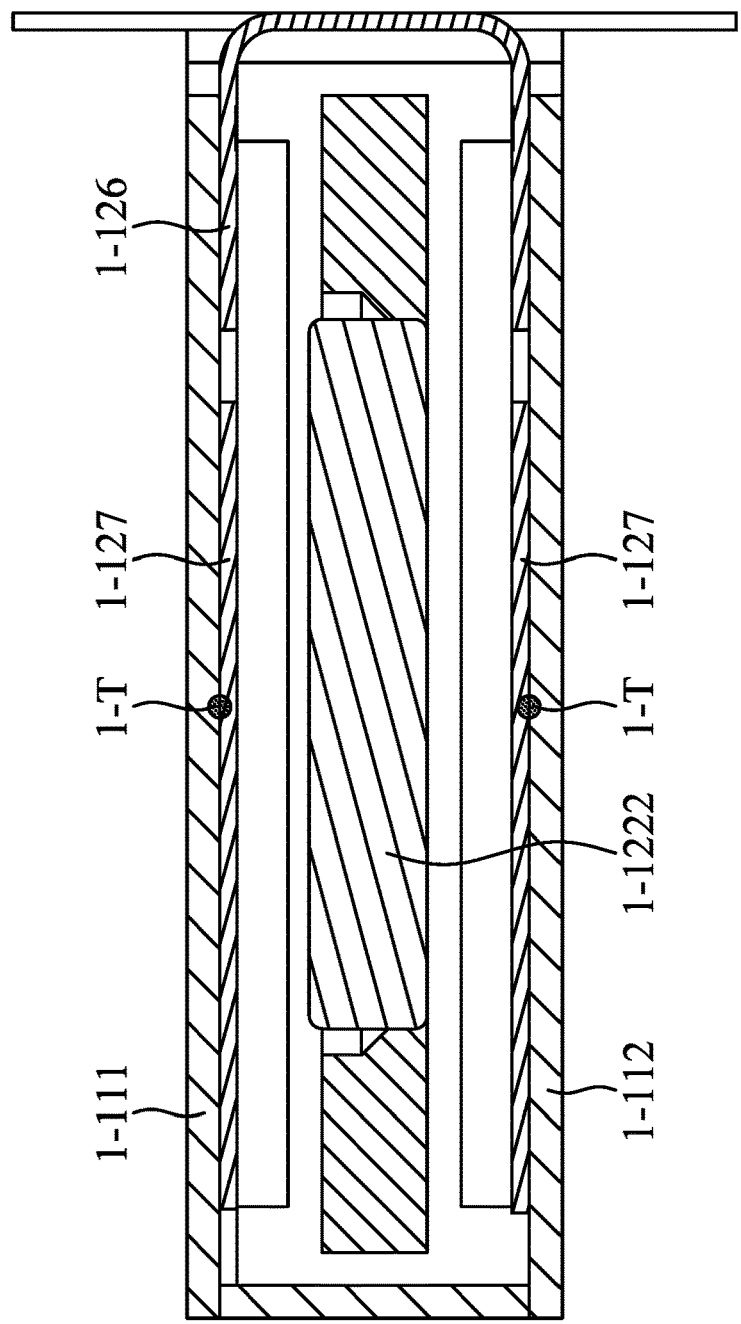
FIG. 11B shows a cross-sectional view along line 1-B-1-B in FIG. 2A according to an embodiment of the present invention.

Please refer to FIGS. 11A and 11B at the same time, FIG. 11A is a schematic view of one of the first driving assemblies 1-122 and the supporting element 1-127, FIG. 11B is a cross-sectional view along line 1-B-1-B in FIG. 2A. As shown in FIGS. 11A and 11B, the supporting element 1-127 is disposed between the first driving assembly 1-122 and the top plate 1-111 and the bottom plate 1-112 of the fixed part 1-110. The first circuit assembly 1-126 at least partially overlaps the supporting element 1-127 when viewed along the direction perpendicular to the main axis 1-M. Specifically, the first circuit assembly 1-126 is aligned with the supporting element 1-127 when viewed along the direction perpendicular to the main axis 1-M. Thus, it is easier to connect the first vibration part 1-120 to the top plate 1-111 and the bottom plate 1-112 of the fixed part 1-110. The connecting member 1-T may be disposed between the top plate 1-111 and the bottom plate 1-112 and the supporting element 1-127, so that the first vibration part 1-120 is connected to the top plate 1-111 and the bottom plate 1-112. The connecting member 1-T which connects the first vibration part 1-120 to the top plate 1-111 and the bottom plate 1-112 may be solder or adhesives. The supporting element 1-127 may be made of metals. In one embodiment, the supporting element 1-127 may be made of ferromagnetic metals or ferromagnetic alloys, e.g. ferromagnetic metals such as iron, cobalt, nickel, and the likes or alloys thereof. In another embodiment, the supporting element 1-127 may be made of non-ferromagnetic metals or non-ferromagnetic alloys.

In summary, the embodiments of the present invention provide the vibration module 1-100 capable of generating a stable vibration in a single direction, and the vibration module 1-100 disclosed in the embodiments of the present invention has a lower manufacturing cost and has been miniaturized.

Figure 12:
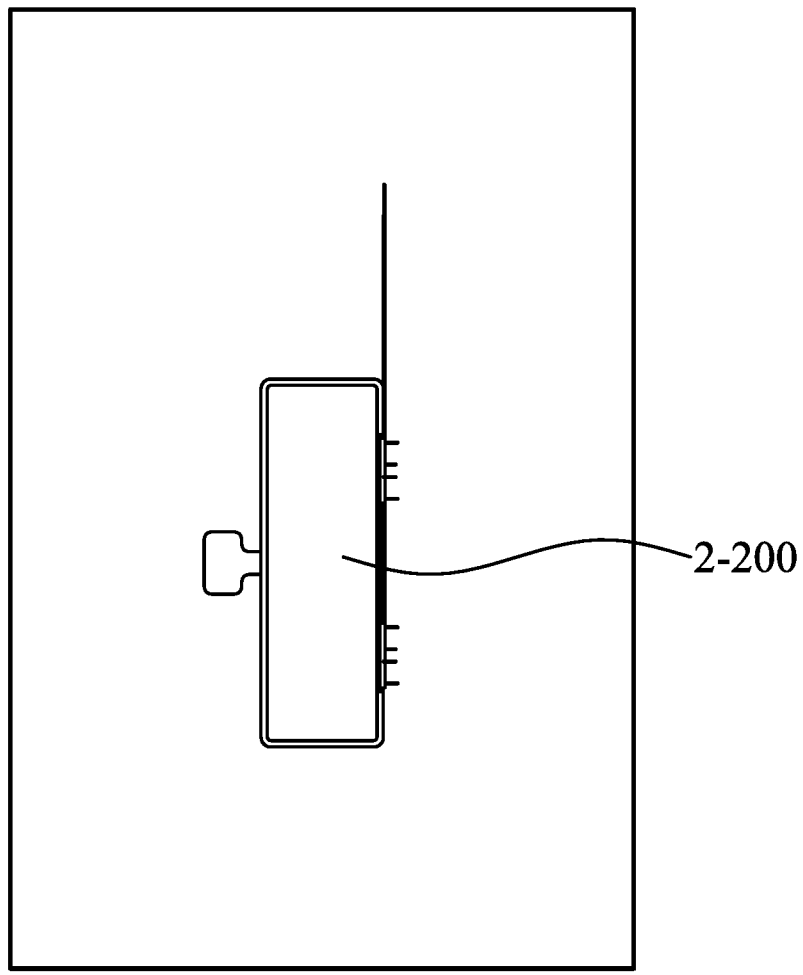
FIG. 12 shows an electronic device with a vibration module according to an embodiment of the present invention.

Please refer to FIG. 12, a vibration module 2-200 of an embodiment of the present invention may be mounted into an electronic device 2-2 within for generating vibrations. The electronic device 2-2 may be, for example, a smart phone or a tablet. When generating vibrations, the vibration module 2-200 may receive a current from the outside of the vibration module 2-200 and generates an electromagnetic driving force, the electromagnetic driving force may interact with a magnetic field and makes the vibration module 2-200 to vibrate, thereby the user of the electronic device 2-2 may feel the vibration. It should be noted that the relation in position and size between the vibration module 2-200 and the electronic device 2-2 shown in FIG. 12 is only an example, but not limiting the relation in position and size between the vibration module 2-200 and the electronic device 2-2. In fact, the vibration module 2-200 may be mounted at different positions in the electronic device 2-2 according to the different needs.

Figure 13A:
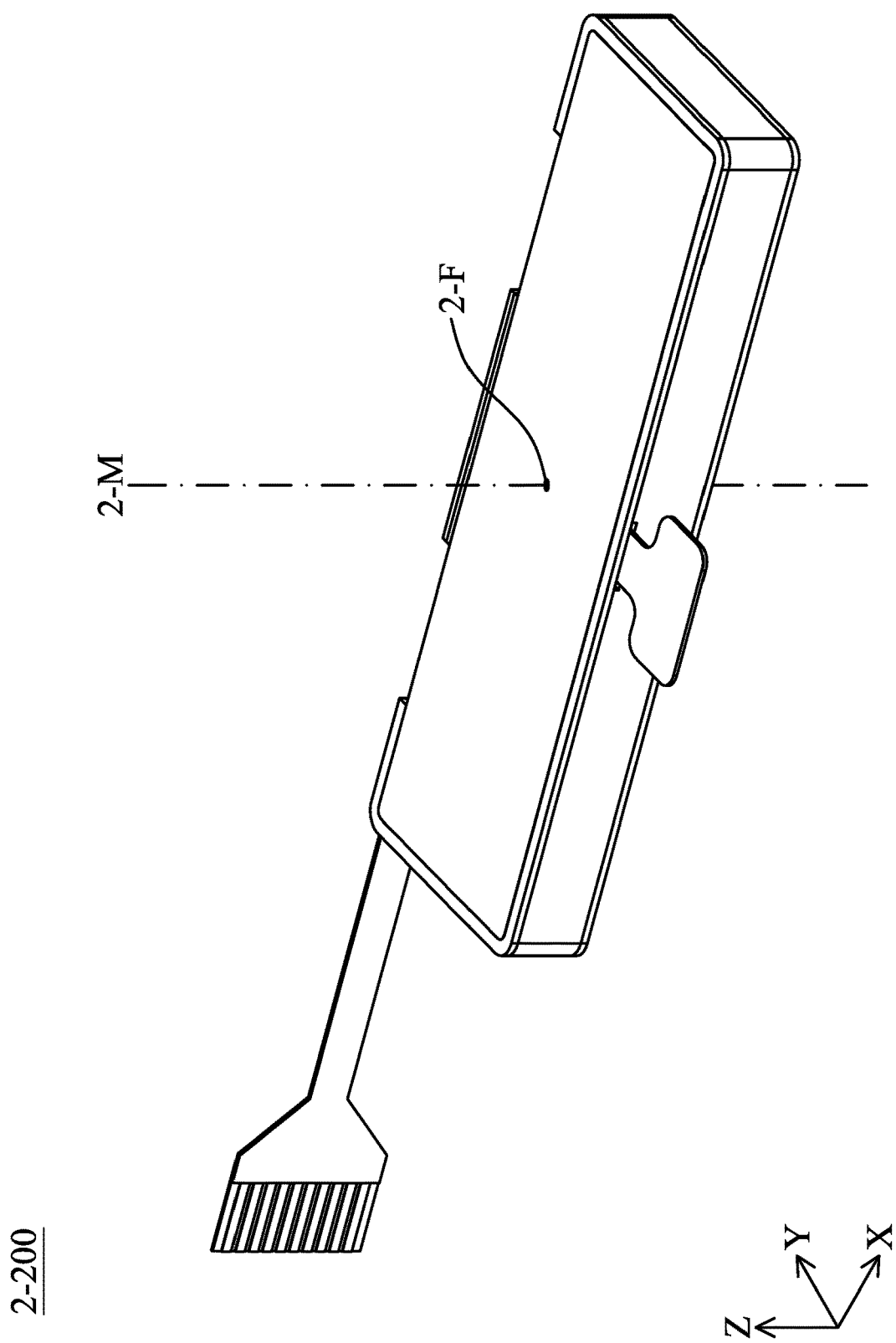
FIG. 13A shows a perspective view of the vibration module according to an embodiment of the present invention.
Figure 13B:
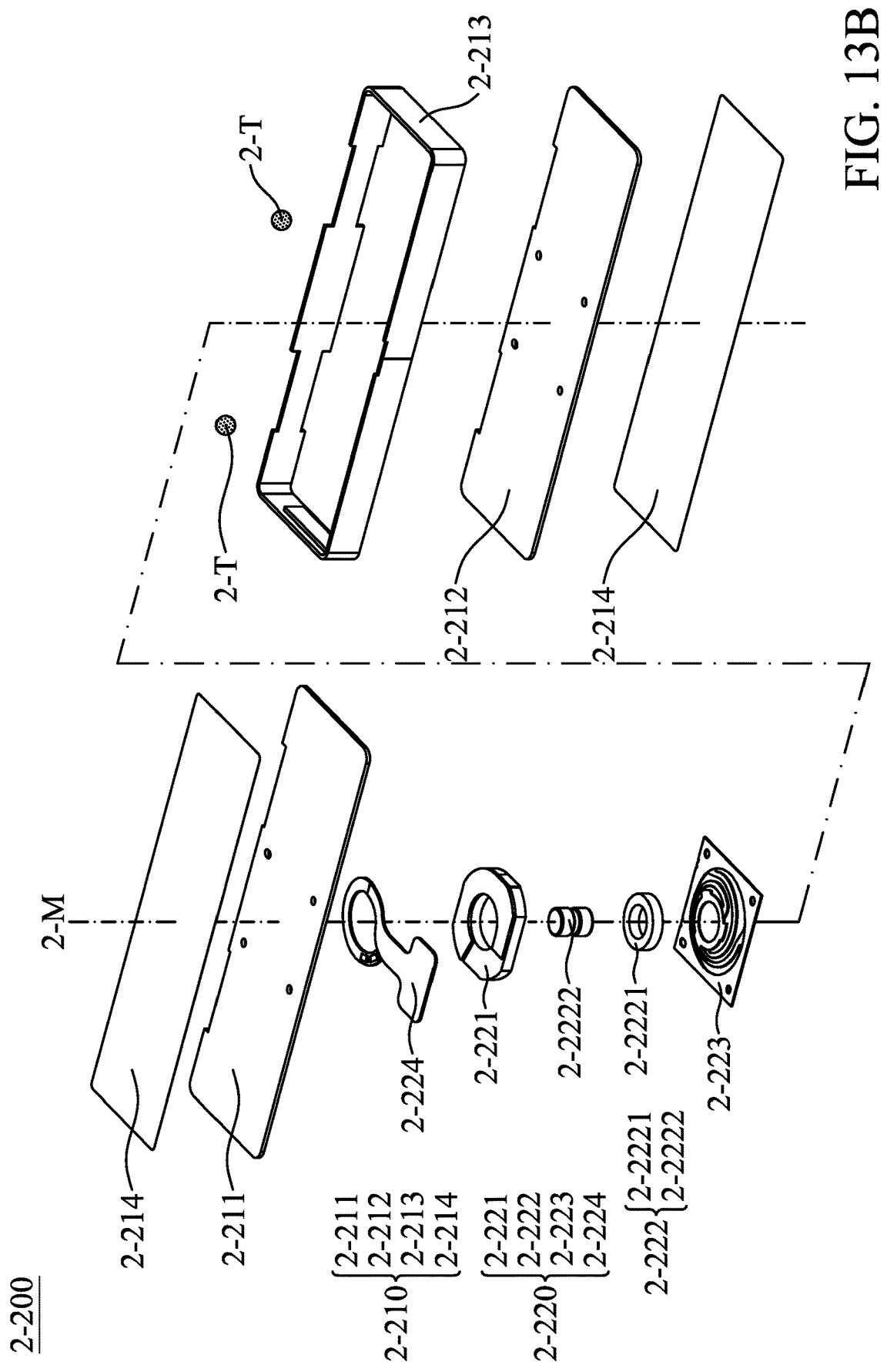
FIG. 13B shows an exploded view of the vibration module according to an embodiment of the present invention.

Please refer to FIG. 13A and FIG. 13B, FIG. 13A is a perspective view of the vibration module 2-200, and FIG. 13B is an exploded view of the vibration module 2-200. As shown in FIG. 13A, the vibration module 2-200 has a main axis 2-M, the main axis 2-M passes through a center 2-F of the vibration module 2-200. As shown in FIG. 13B, the vibration module 2-200 includes a fixed part 2-210, a first vibration part 2-220 and a connecting member 2-T. The fixed part 2-210 includes a top plate 2-211, a bottom plate 2-212, an outer frame 2-213 and two shielding elements 2-214. The first vibration part 2-220 includes a first moving member 2-221, a first driving assembly 2-222, a first elastic element 2-223, a first circuit assembly 2-224. The first driving assembly 2-222 includes a first driving coil 2-2221 and a first driving magnetic element 2-2222.

Figure 14A:
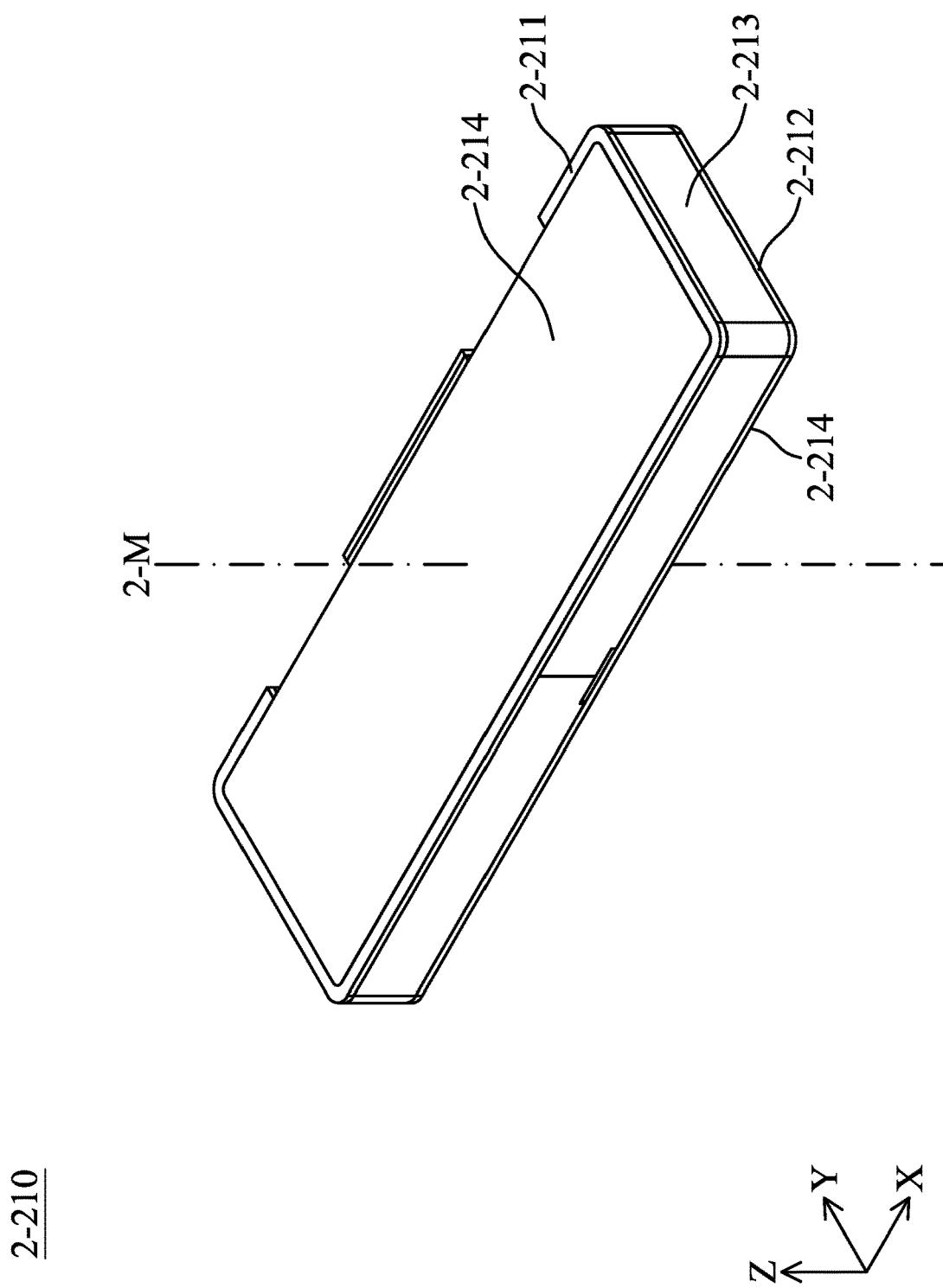
FIG. 14A shows a schematic view of a fixed part of the vibration module according to an embodiment of the present invention.
Figure 14B:
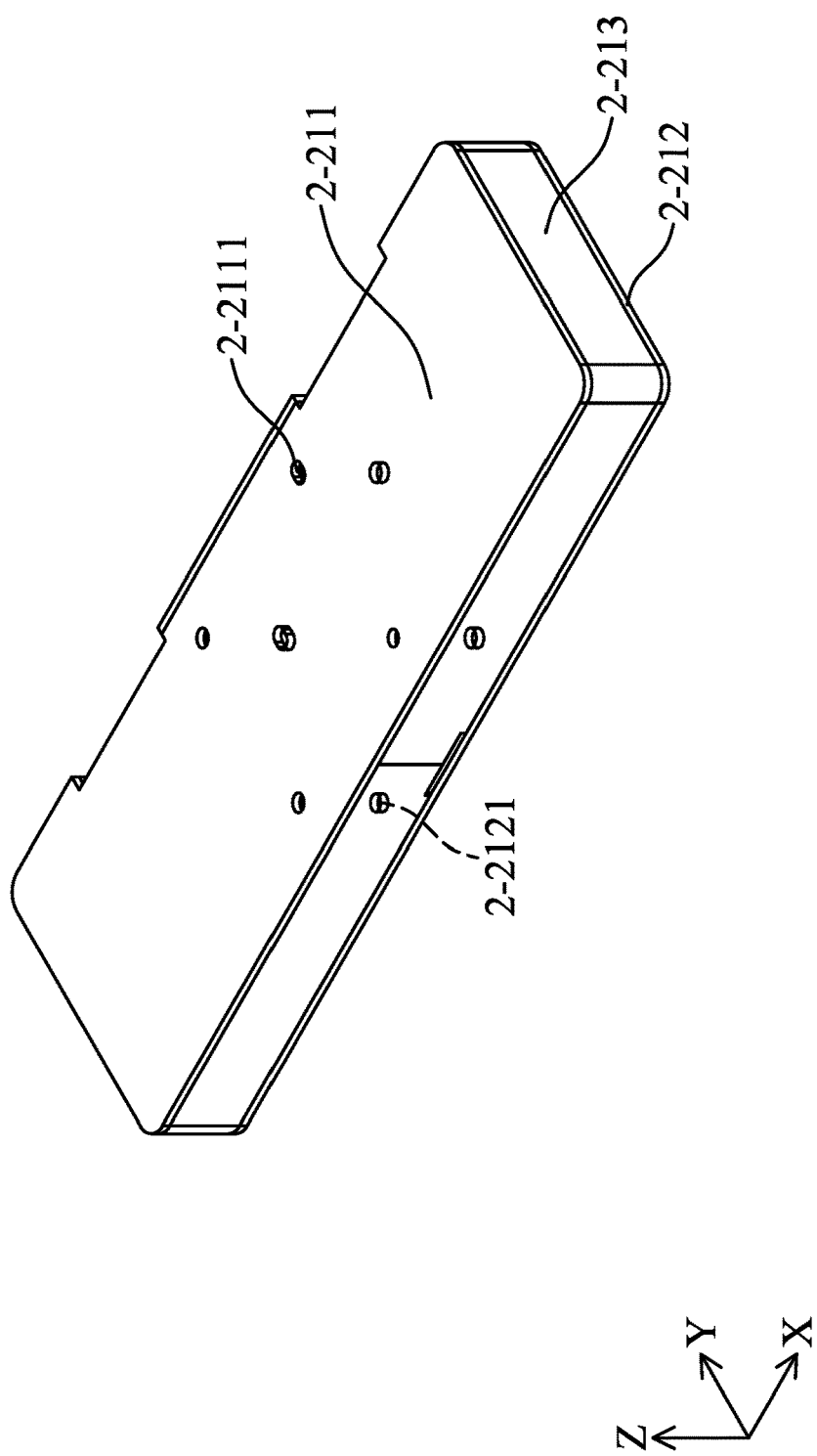
FIG. 14B shows a schematic view of a top plate, a bottom plate and an outer frame according to an embodiment of the present invention.

Please refer to FIG. 14A, FIG. 14A is a schematic view of the fixed part 2-210. The outer frame 2-213 is located between the top plate 2-211 and the bottom plate 2-212. The top plate 2-211 covers the upper portion of the outer frame 2-213, and the bottom plate 2-212 covers the lower portion of the outer frame 2-213. Therefore, the main axis 2-M also passes through the top plate 2-211 and the bottom plate 2-212. The top plate 2-211, the bottom plate 2-212 and the outer frame 2-213 may be made of a non-ferromagnetic metal, and preferably the density of this non-ferromagnetic metal is greater than the density of a plastic material. Please refer to FIG. 14B, FIG. 14B is a schematic view of the top plate 2-211, the bottom plate 2-212 and the outer frame 2-213. The top plate 2-211 has a through hole 2-2111, and the bottom plate 2-212 has a through hole 2-2121, wherein the through hole 2-2121 is shown as a dashed line. The through hole 2-2111 and the through hole 2-2121 are helpful to position of the elements disposed in the vibration module 2-200 and the assembly of the vibration module 2-200.

Please refer to FIG. 14A again, the two shielding elements 2-214 are located above the top plate 2-211 and below the bottom plate 2-212, respectively. The shielding element 2-214 located above the top plate 2-211 covers the through hole 2-2111, and the shielding element 2-214 located below the bottom plate 2-212 covers the through hole 2-2121. That is, the shielding element 2-214 above the top plate 2-211 completely overlaps the through holes 2-2111, and the shielding element 2-214 below the bottom plate 2-212 completely overlaps the through holes 2-2121 when viewed along the main axis 2-M. Thus, the through hole 2-2111 and the through hole 2-2121 are not exposed to the outside, and thus avoiding the external dust or water entering the vibration module 2-200 via the through holes 2-2111 or the through hole 2-2121, thereby achieving the effects of waterproof and dustproof. The shielding element 2-214 may be a shielding material such as a light-shielding sheet.

Figure 14C:
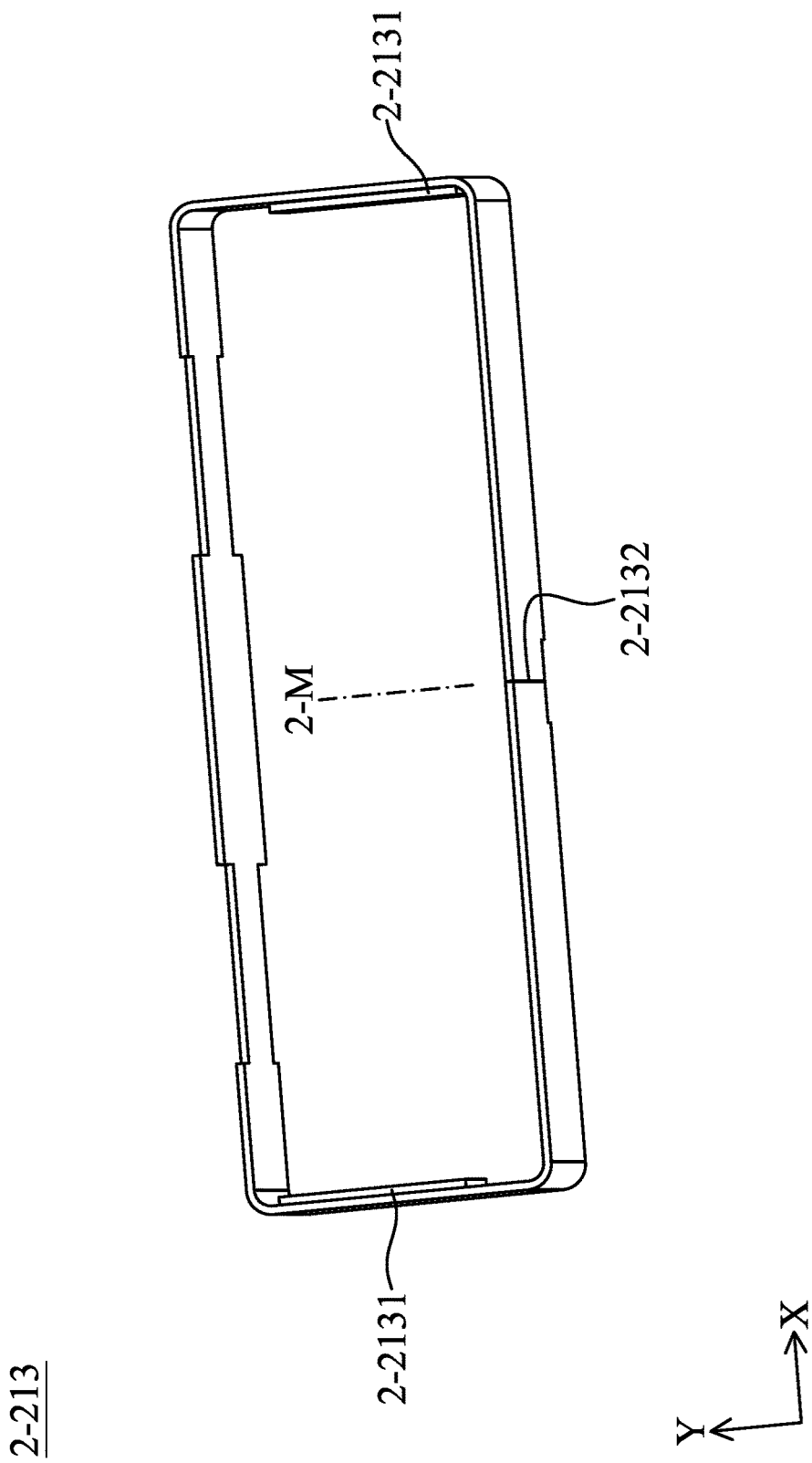
FIG. 14C shows a schematic view of the outer frame according to an embodiment of the present invention.
Figure 14D:
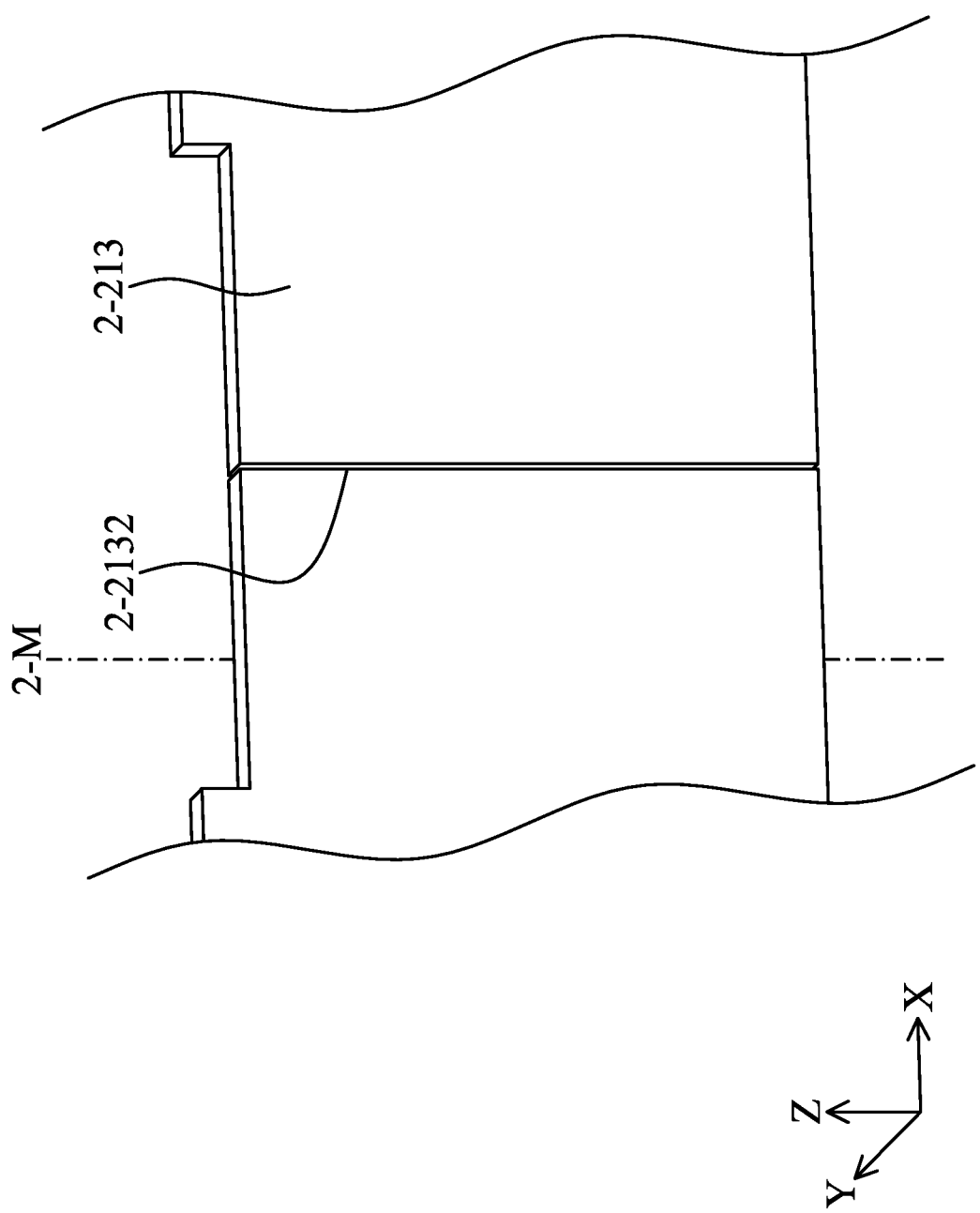
FIG. 14D shows a partial schematic view of the outer frame according to an embodiment of the present invention.

FIG. 14C is a schematic view of the outer frame 2-213, and FIG. 14D is a partial schematic view of the outer frame 2-213. As shown in FIG. 14C, the outer frame 2-213 is shaped centered on the main axis 2-M, and the outer frame 2-213 includes two welding portions 2-2131 and a gap 2-2132. The welding portions 2-2131 are located on both sides of the outer frame 2-213, and extends along the outer frame 2-213. As shown in FIG. 14D, the gap 2-2132 of the outer frame 2-213 traverse the outer frame 2-213 along the main axis 2-M. That is, the outer frame 2-213 is disconnected at the gap 2-2132 by the gap 2-2132, therefore, the outer frame 2-213 is not circumferentially connected to be an integrity, and a circuit board, plastic member, solder, or the light-shielding sheet may be used to shield the gap 2-2132 to prevent foreign matters from entering the vibration module 2-200. In fact, the outer frame 2-213 may be a metal sheet which is bent and shaped, rather than cast molding, by centering on the main axis 2-M. Thus, the complexity in manufacturing the vibration module 2-200 may be reduced, thereby reducing the cost in manufacturing the vibration module 2-200.

Figure 15A:
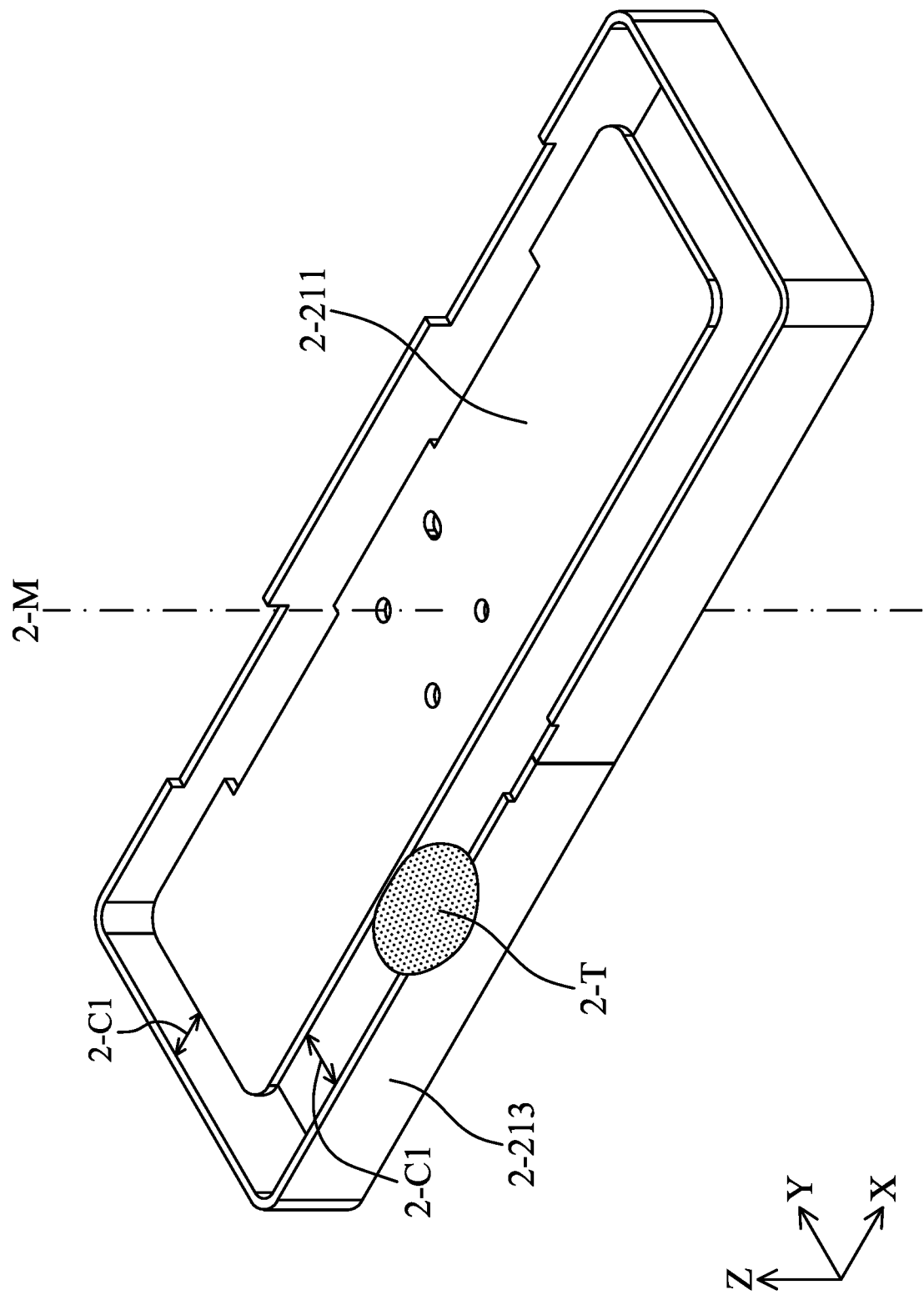
FIG. 15A shows a partial schematic view of the top plate and the outer frame according to an embodiment of the present invention.
Figure 15B:
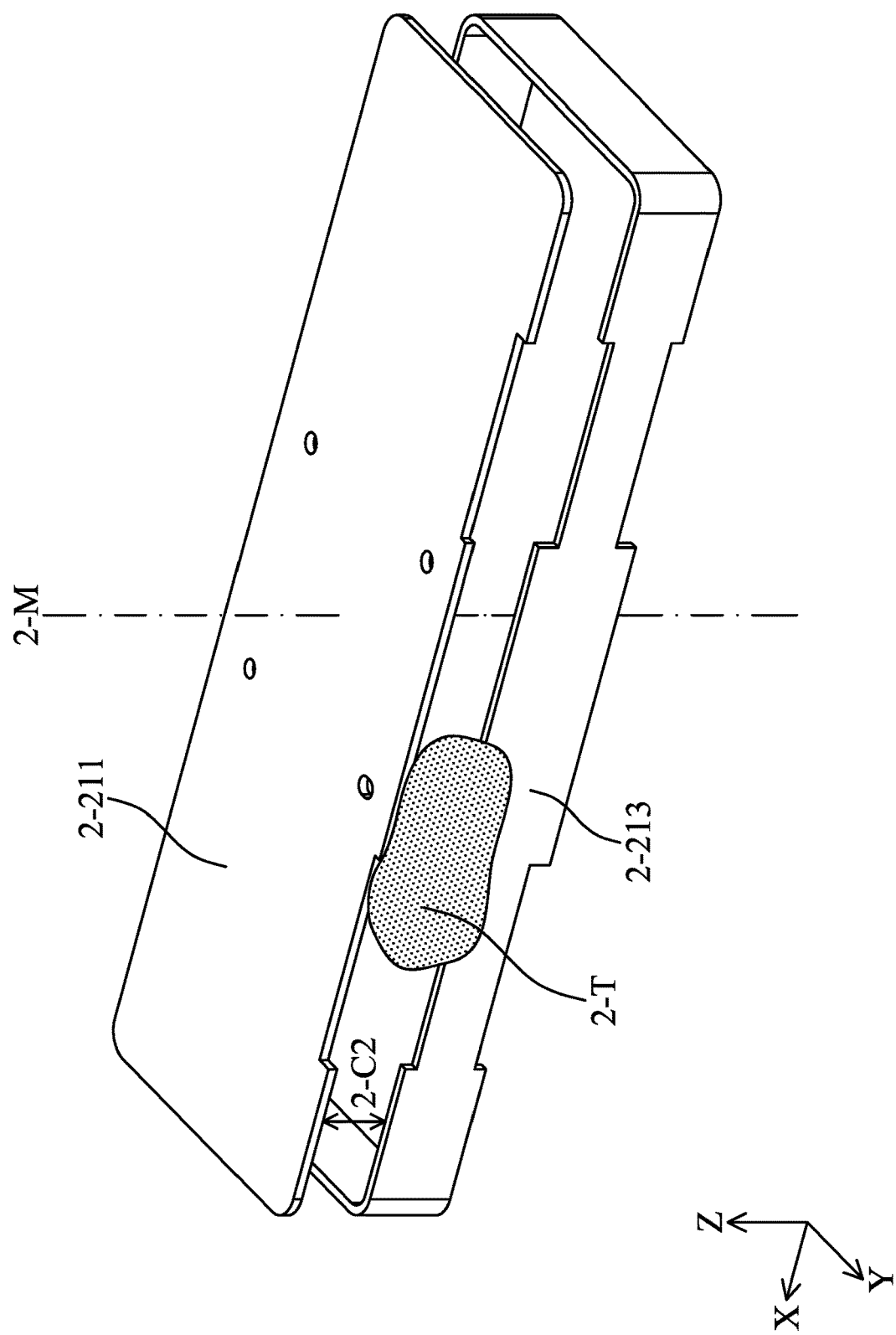
FIG. 15B shows a partial schematic view of the top plate and the outer frame according to another embodiment of the present invention.

FIG. 15A and FIG. 15B are partial schematic views of the top plate 2-211 and the outer frame 2-213 according to different embodiments. As shown in FIG. 15A, in one embodiment, the top plate 2-211 is not directly connected to the outer frame 2-213, and there is a gap 2-C1 between the top plate 2-211 and the outer frame 2-213 when viewed along the main axis 2-M. As shown in FIG. 15B, in another embodiment, the top plate 2-211 is not directly connected to the outer frame 2-213, and there is a gap 2-C2 between the top plate 2-211 and the outer frame 2-213 when viewed in a direction perpendicular to the main axis 2-M. As shown in FIG. 15A and FIG. 15B, the connecting member 2-T is provided between the top plate 2-211 and the outer frame 2-213 to fix the top plate 2-211 to the outer frame 2-213. The connecting member 2-T may be a light-shielding sheet, or a material such as solder or adhesive.

Figure 15C:
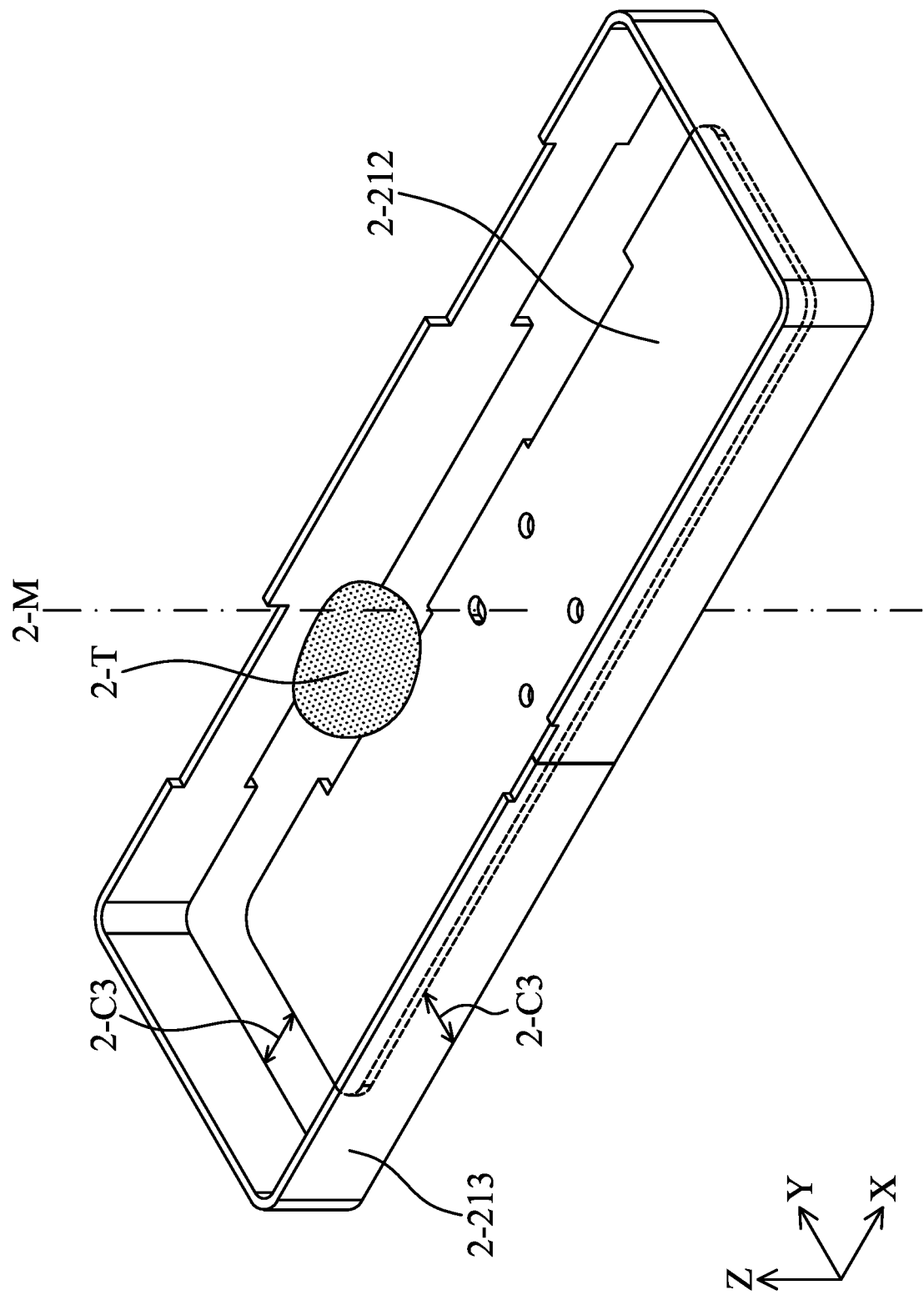
FIG. 15C shows a partial schematic view of the bottom plate and the outer frame according to an embodiment of the present invention.
Figure 15D:
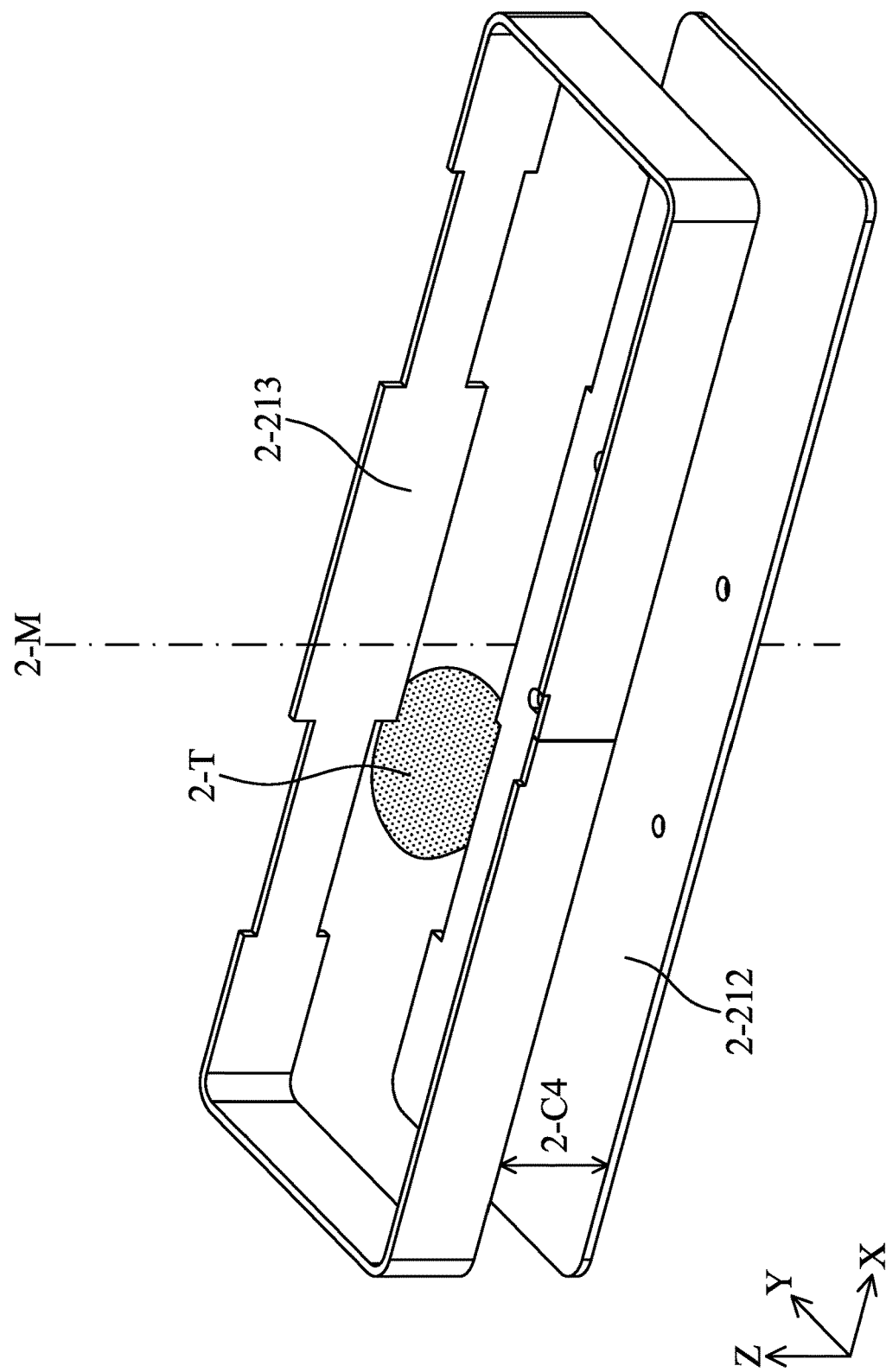
FIG. 15D shows a partial schematic view of the bottom plate and the outer frame according to another embodiment of the present invention.

FIG. 15C and FIG. 15D are partial schematic views of the bottom plate 2-212 and the outer frame 2-213 according to different embodiments. As shown in FIG. 15C, in one embodiment, the bottom plate 2-212 is not directly connected to the outer frame 2-213, and there is a gap 2-C3 between the bottom plate 2-212 and the outer frame 2-213 when viewed along the main axis 2-M. As shown in FIG. 15D, in another embodiment, the bottom plate 2-212 is not directly connected to the outer frame 2-213, and there is a gap 2-C4 between the bottom plate 2-212 and the outer frame 2-213 when viewed in a direction perpendicular to the main axis 2-M. As shown in FIG. 15C and FIG. 15D, the connecting member 2-T is provided between the bottom plate 2-212 and the outer frame 2-213 to fix the bottom plate 2-212 to the outer frame 2-213. The connecting member 2-T may be a light-shielding sheet, or a material such as solder or adhesive.

Figure 16:
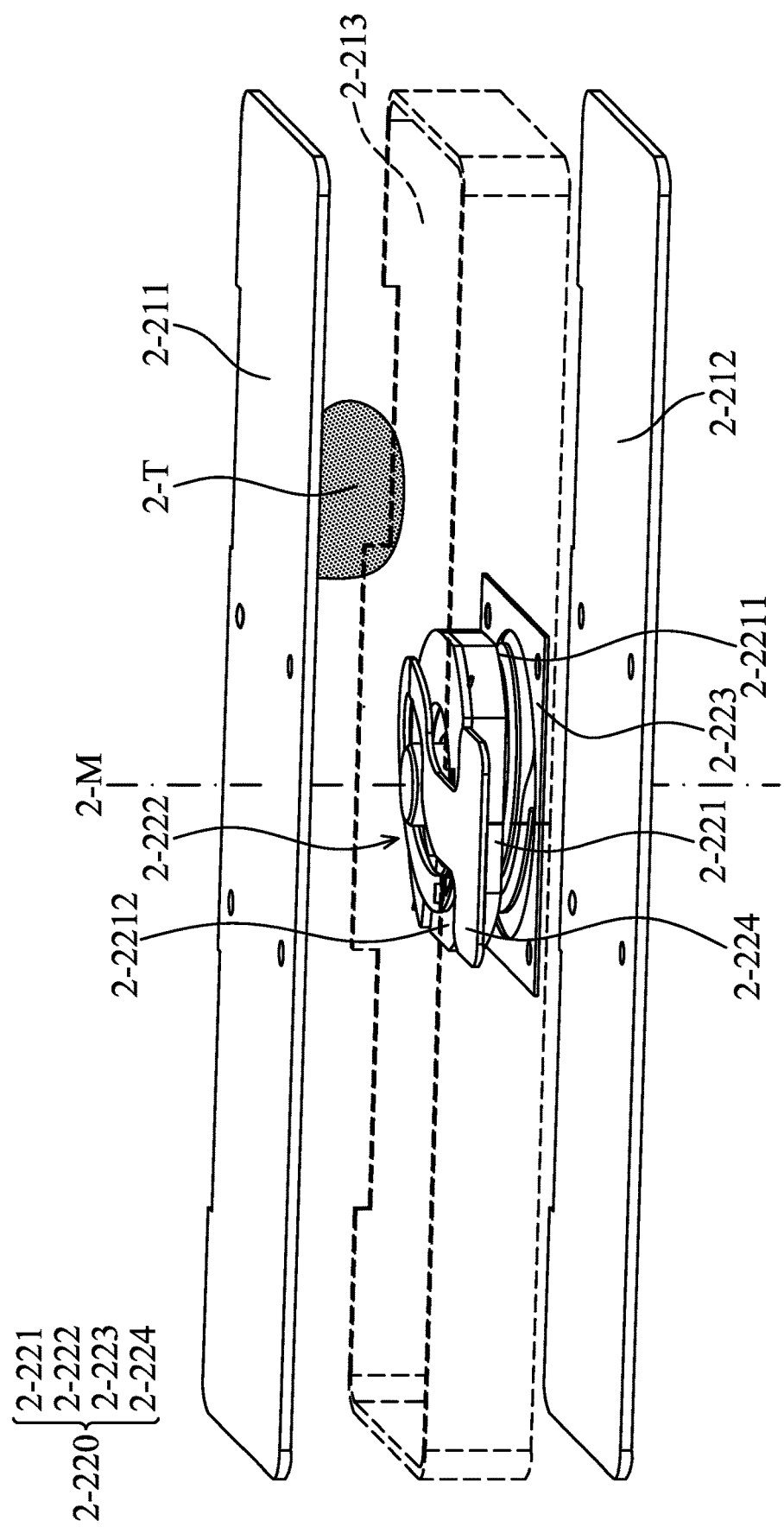
FIG. 16 shows a schematic view of the top plate, the bottom plate, the outer frame, and a first vibration part according to an embodiment of the present invention, wherein the outer frame is shown as a dashed line.

Please refer to FIG. 16, FIG. 16 is a schematic view of the top plate 2-211, the bottom plate 2-212, the outer frame 2-213, and the first vibration part 2-220, wherein the outer frame 2-213 is shown as a dashed line. As shown in FIG. 16, the first vibration part 2-220 is disposed at the top plate 2-211 and the bottom plate 2-212 of the fixed part 2-210. In one embodiment, the first moving member 2-221 may has a pie shape, however, the shape of the first moving member 2-221 may be adjusted according to actual needs. The first driving assembly 2-222 drives the first moving member 2-221 to move relative to the fixed part 2-210 along the main axis 2-M. The first elastic element 2-223 is disposed on a first side 2-2211 of the first moving member 2-221, and the first moving member 2-221 is movably connected to the bottom plate 2-212 of the fixed part 2-210 via the first elastic element 2-223. A second side 2-2212 of the first moving member 2-221 opposite the first side 2-2211 is provided with a first circuit assembly 2-224. The main axis 2-M passes through the first moving member 2-221, therefore, the main axis 2-M passes through the first side 2-2211 and the second side 2-2212. The first circuit assembly 2-224 is connected to the first moving member 2-221 by welding or adhering, and the first circuit assembly 2-224 is connected to the top plate 2-211 and the frame 2-213 via the connecting member 2-T (the connecting member 2-T herein may be a solder or fixing materials such as glue). In other words, the first moving member 2-221 is connected to the top plate 2-211 and the outer frame 2-213 of the fixed part 2-210 via the first circuit assembly 2-224. The first circuit assembly 2-224 has a flexible structure, so that the first circuit assembly 2-224 will not break when the first moving member 2-221 moves. Along the main axis 2-M, the elastic coefficient of the first elastic element 2-223 is greater than that of the first circuit assembly 2-224.

Figure 17A:
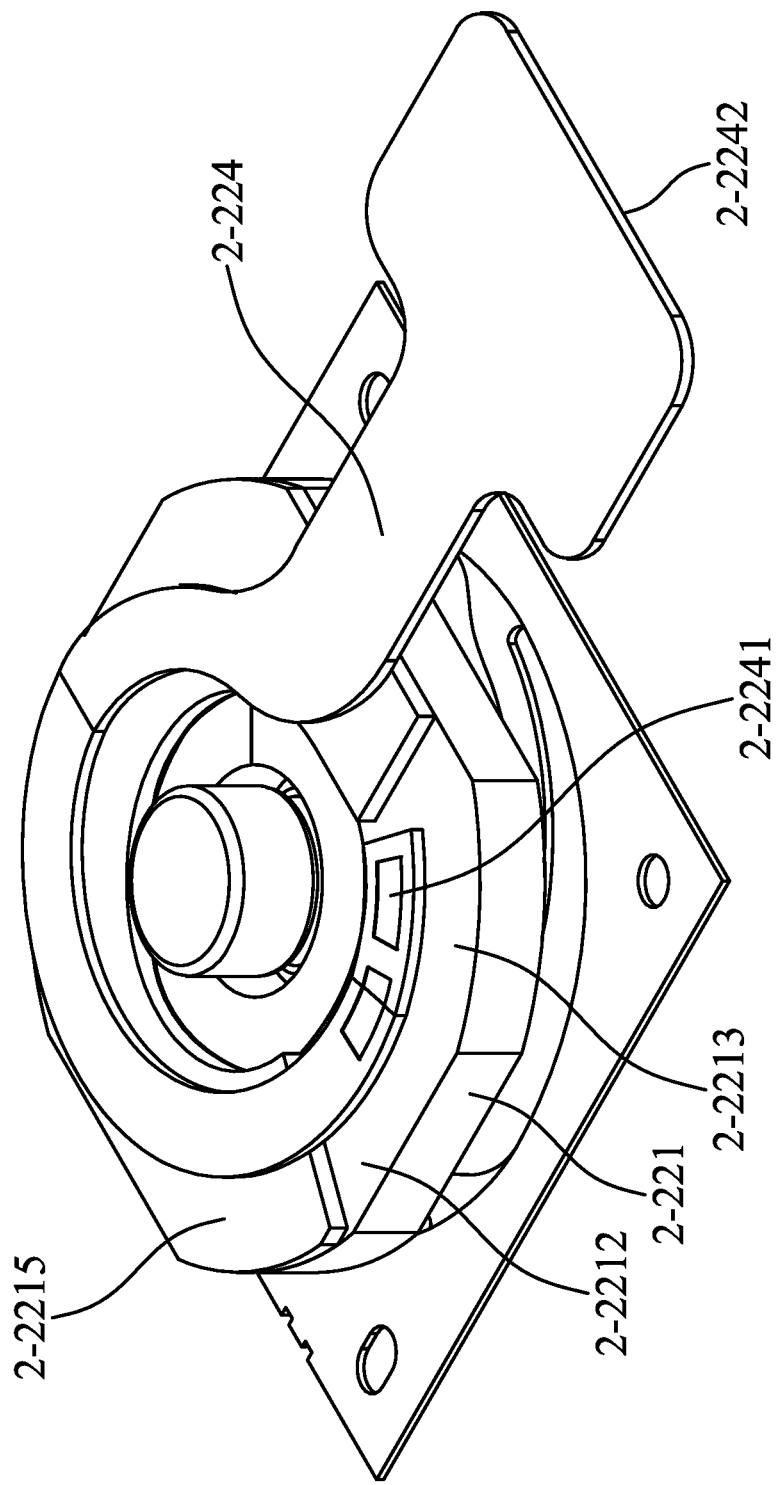
FIG. 17A shows a schematic view of a first moving member, and a first circuit assembly according to an embodiment of the present invention.
Figure 17B:
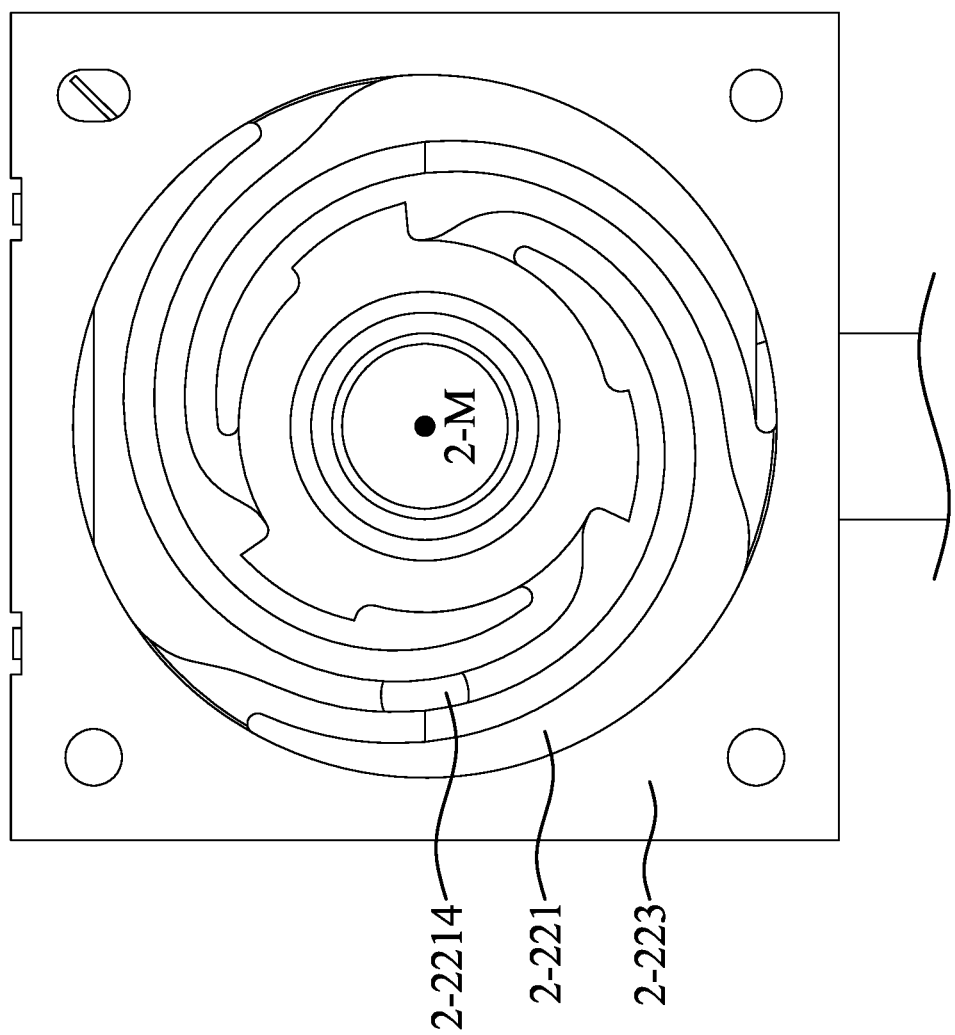
FIG. 17B shows a schematic view of the first moving member, and a first elastic element according to an embodiment of the present invention.
Figure 17C:
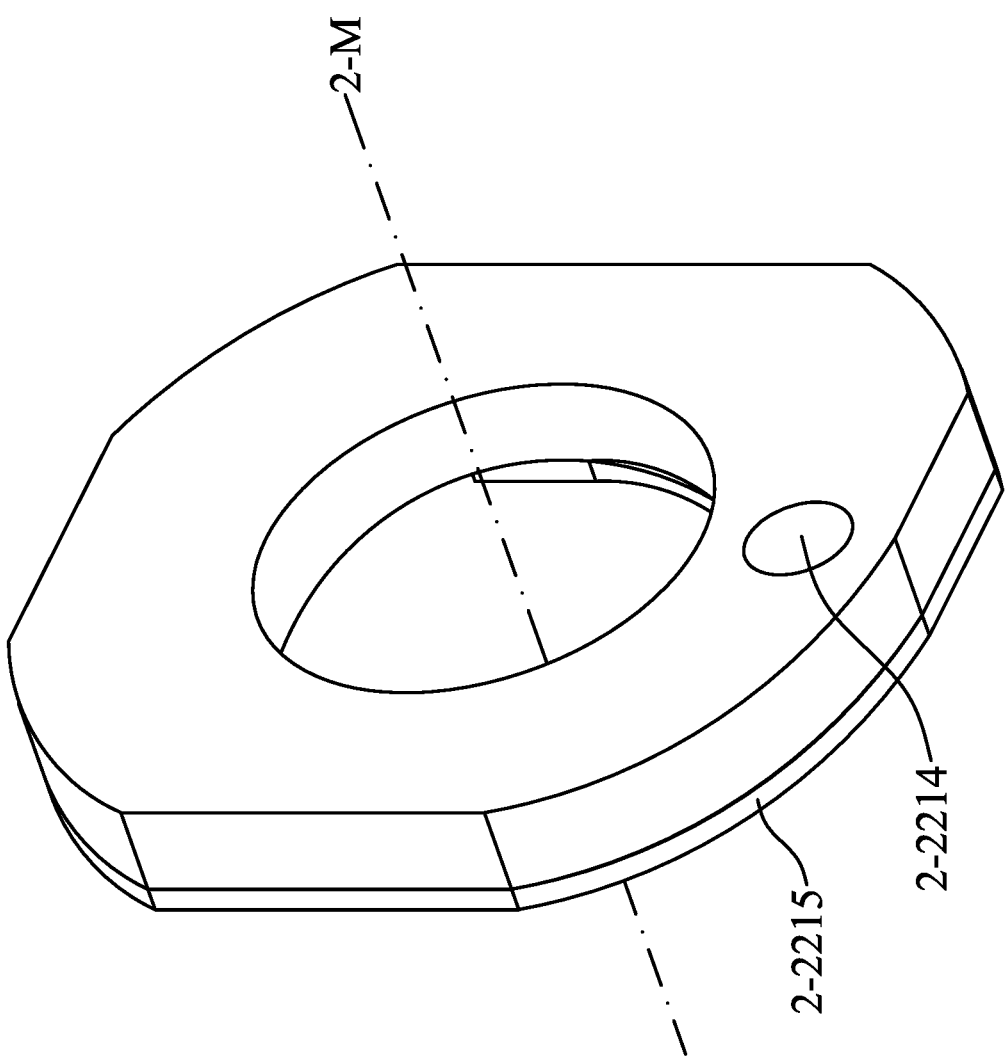
FIG. 17C shows a schematic view of the first moving member according to an embodiment of the present invention.

Please refer to FIG. 17A, FIG. 17B and FIG. 17C. FIG. 17A is a schematic view of the first moving member 2-221 and the first circuit assembly 2-224, FIG. 17B is a bottom view of the first moving member 2-221 and the first elastic element 2-223, and FIG. 17C is a schematic view of the first moving member 2-221. The first moving member 2-221 includes a receiving portion 2-2213, a recess 2-2214, and a shielding element 2-2215. As shown in FIG. 17A, the first circuit assembly 2-224 has a semi-spiral shape spiraling along the main axis, and the first circuit assembly 2-224 has an internal electrical connection portion 2-2241 and an external electrical connection portion 2-2242. The internal electrical connection portion 2-2241 is located at a spiral end of the first circuit assembly 2-224 of and is disposed in the receiving portion 2-2213, while the external electrical connection portion 2-2242 is located at a non-spiral end of the first circuit assembly 2-224. It should be noted that, since the first circuit assembly 2-224 is spiral along the main axis, the internal electrical connection portion 2-2241 and the external electrical connection portion 2-2242 are located on different planes. The receiving portion 2-2213 is located on the second side 2-2212 of the first moving member 2-221, and the receiving portion 2-2213 has a recessed structure to receive at least a portion of the first circuit assembly 2-224, i.e., the recessed structure receives at least a portion of the flexible structure of the first circuit assembly 2-224. The shielding element 2-2215 is disposed on the second side 2-2212 of the first moving member 2-221, and a part of the first circuit assembly 2-224 is disposed on the shielding element 2-2215. As shown in FIG. 17B, the recess 2-2214 faces the first elastic element 2-223. In the embodiment shown in FIG. 17B, the first elastic element 2-223 may have a palisade shape, therefore, the recess 2-2214 and the first elastic element 2-223 at least not partially overlap when observed along the main axis 2-M. The size of the recess 2-2214 may be adjusted to adjust the weight configuration of the first moving member 2-221, such that the first moving member 2-221 is more stable. As shown in FIG. 17C, the recess 2-2214 corresponds to the shielding element 2-2215. That is, the recess 2-2214 at least partially overlaps the shielding element 2-2215 when observed along the main axis 2-M. Thus, the weight configuration of the first moving member 2-221 may be adjusted, such that the first moving member 2-221 is more stable.

Figure 18A:
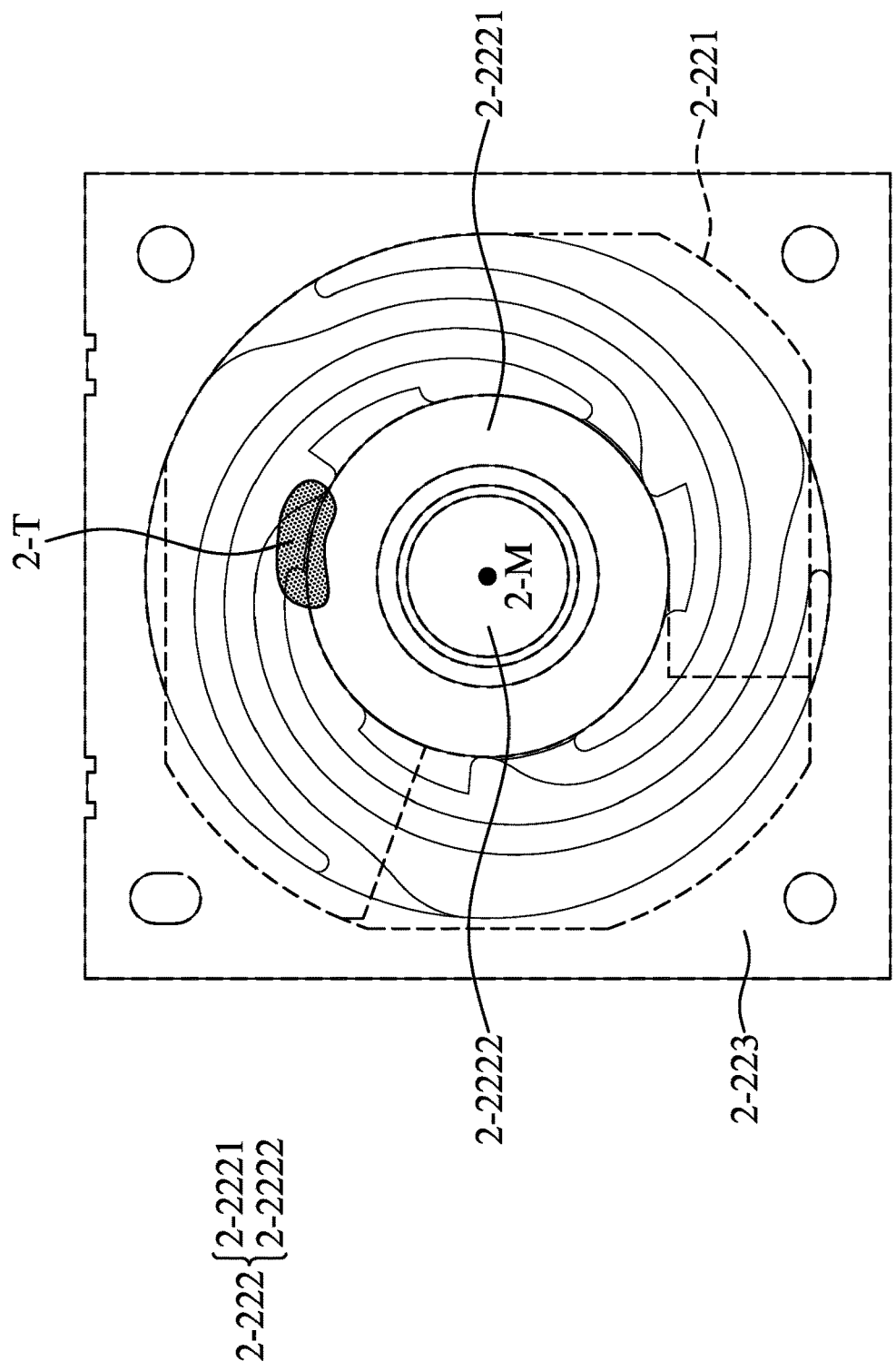
FIG. 18A shows a top view of the first moving member, a first driving assembly, and a first elastic element according to an embodiment of the present invention, wherein the first moving member is shown as a dashed line.

Please refer to FIG. 18A, FIG. 18A is a top view of the first moving member 2-221, the first driving assembly 2-222, and the first elastic element 2-223 according to an embodiment, wherein the first moving member 2-221 is shown as a dashed line. The first driving coil 2-2221 is fixedly connected to the first moving member 2-221 via the connecting member 2-T, and the first moving member 2-221 and the first driving coil 2-2221 may be connected to the first elastic element 2-223 by welding. The first driving magnetic element 2-2222 may include two permanent magnets, and the like poles of the two permanent magnets face each other. That is, when the north-seeking pole of one of the permanent magnets faces downward, the south-seeking pole of the other permanent magnet faces upward, and vice versa. Thus, the magnetic fields of the two permanent magnets of the first magnetic driving assembly 2-2222 may effectively extends to the first driving coil 2-2221. Therefore, the first driving coil 2-2221 may interact with the magnetic fields of the two permanent magnets to generate an electromagnetic driving force after receiving the external current, thereby driving the first moving member 2-221 to move relative to the fixed part 2-210. The center of mass of the vibration module 2-200 is shifted when the first moving member 2-221 moves relative to the fixed part 2-210, thereby causing the user of the electronic device 2-2 to feel the vibration. As shown in FIG. 18A, in this embodiment, the first moving member 2-221, the first driving coil 2-2221 and the first elastic member 2-223 partially overlap when observed along the main axis 2-M.

Figure 18B:
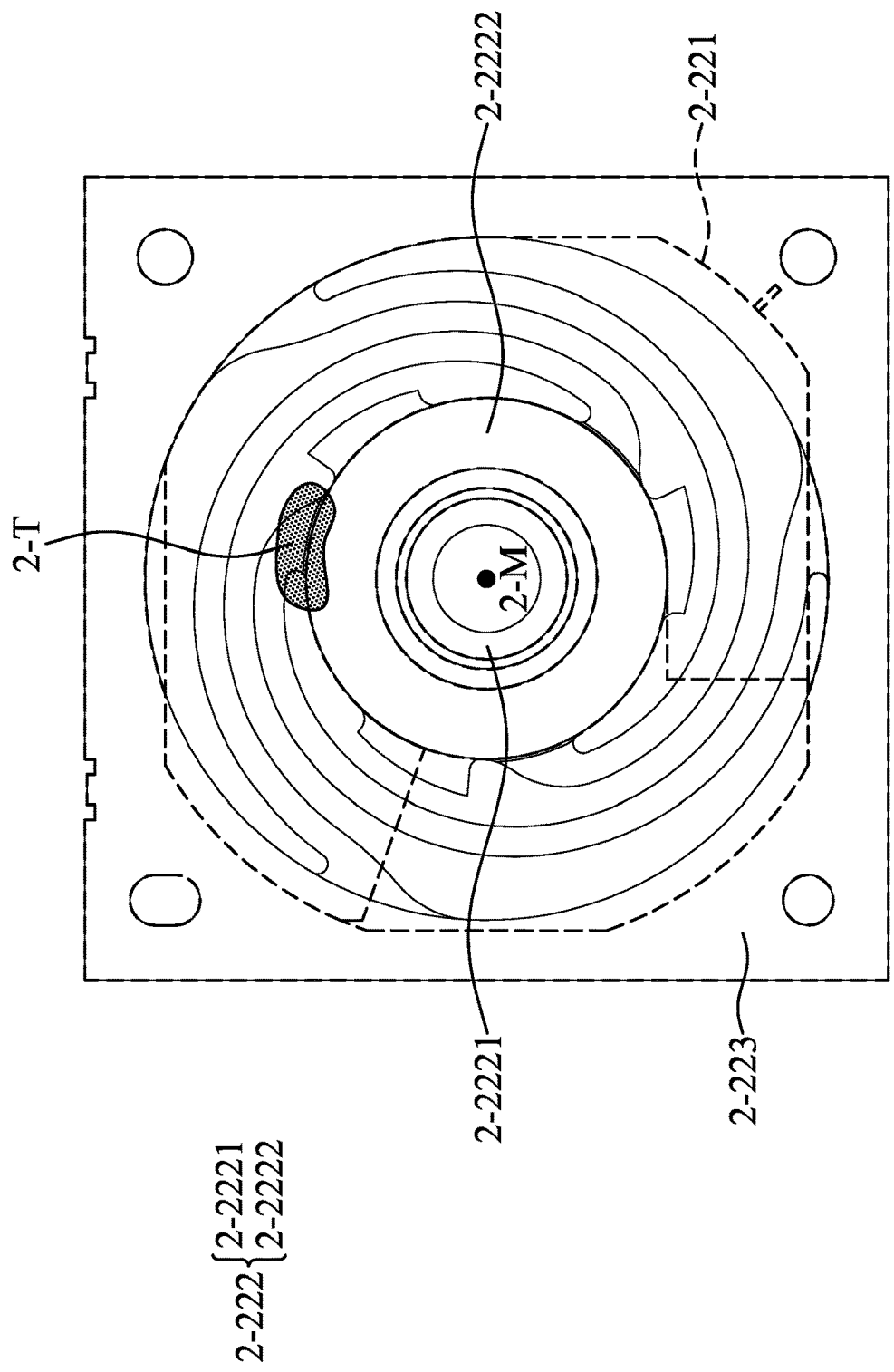
FIG. 18B shows a top view of the first moving member, a first driving assembly, and a first elastic element according to an embodiment of the present invention, wherein the first moving member is shown as a dashed line.

Please refer to FIG. 18B, FIG. 18B is a top view of the first moving member 2-221, the first driving assembly 2-222, and the first elastic element 2-223 according to an embodiment, wherein the first moving member 2-221 is shown as a dashed line. The embodiment shown in FIG. 18B is substantially the same as the embodiment shown in FIG. 18A, and the main difference is that, in the embodiment shown in FIG. 18B, the position of the first driving coil 2-2221 and the position of the first driving magnetic element 2-2222 are exchanged. The first driving magnetic element 2-2222 is fixedly connected to the first moving member 2-221 via the connecting member 2-T. Therefore, the first moving member 2-221, the first driving magnetic element 2-2222, and the first elastic element 2-223 partially overlap when observed along the main axis 2-M.

Figure 19A:
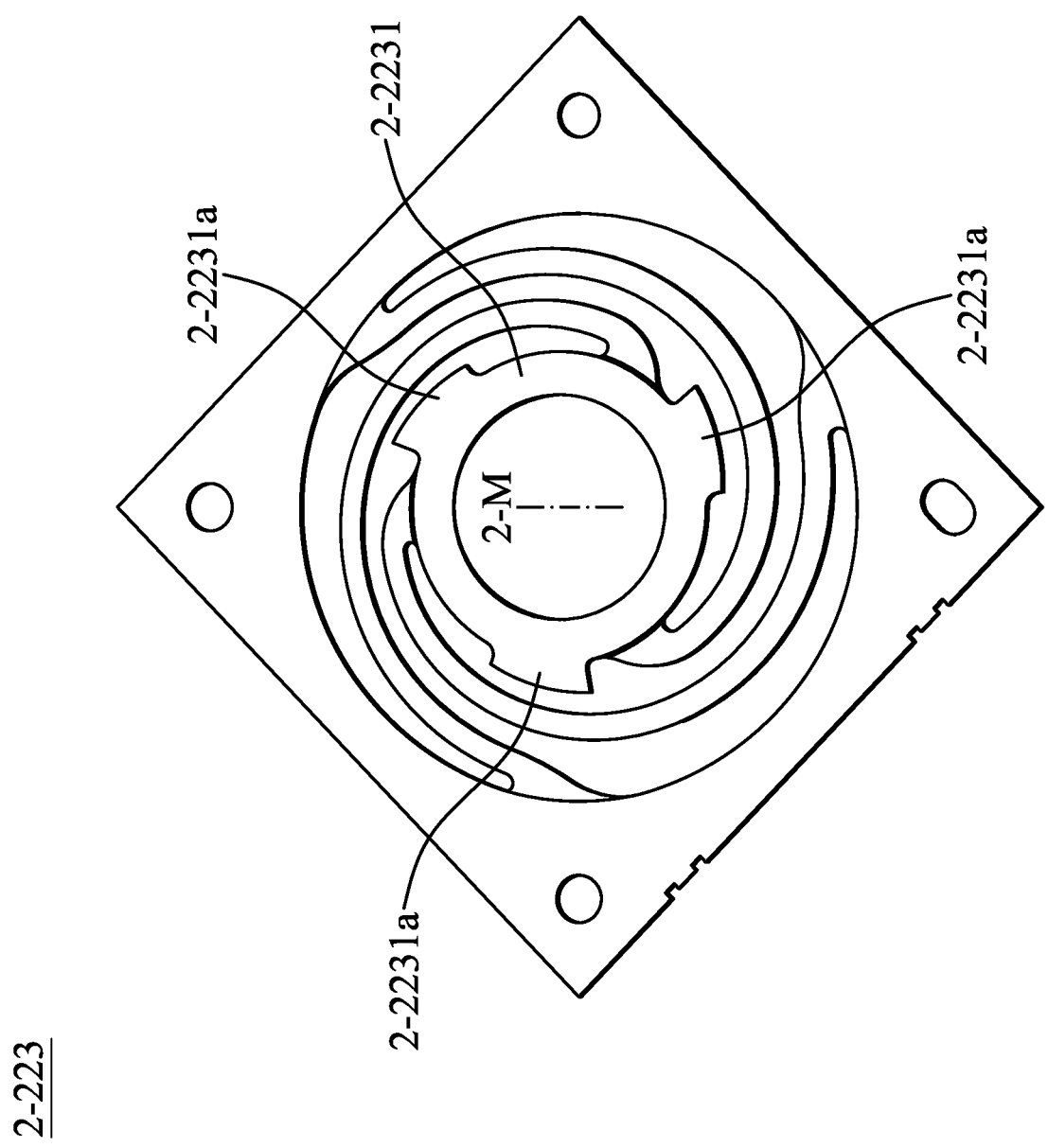
FIG. 19A shows a schematic view of the first elastic element according to an embodiment of the present invention.

Please refer to FIG. 19A, FIG. 19A is a schematic view of the first elastic element 2-223. The first elastic element 2-223 includes a first elastic element connecting portion 2-2231, and the first elastic element connecting portion 2-2231 includes three connection strengthening portions 2-2231a. The connection strengthening portions 2-2231a extend in a direction that is not parallel to the main axis 2-M. It should be noted that, in other embodiments, the number of the connection strengthening portions 2-2231a is not limited to three.

Figure 19B:
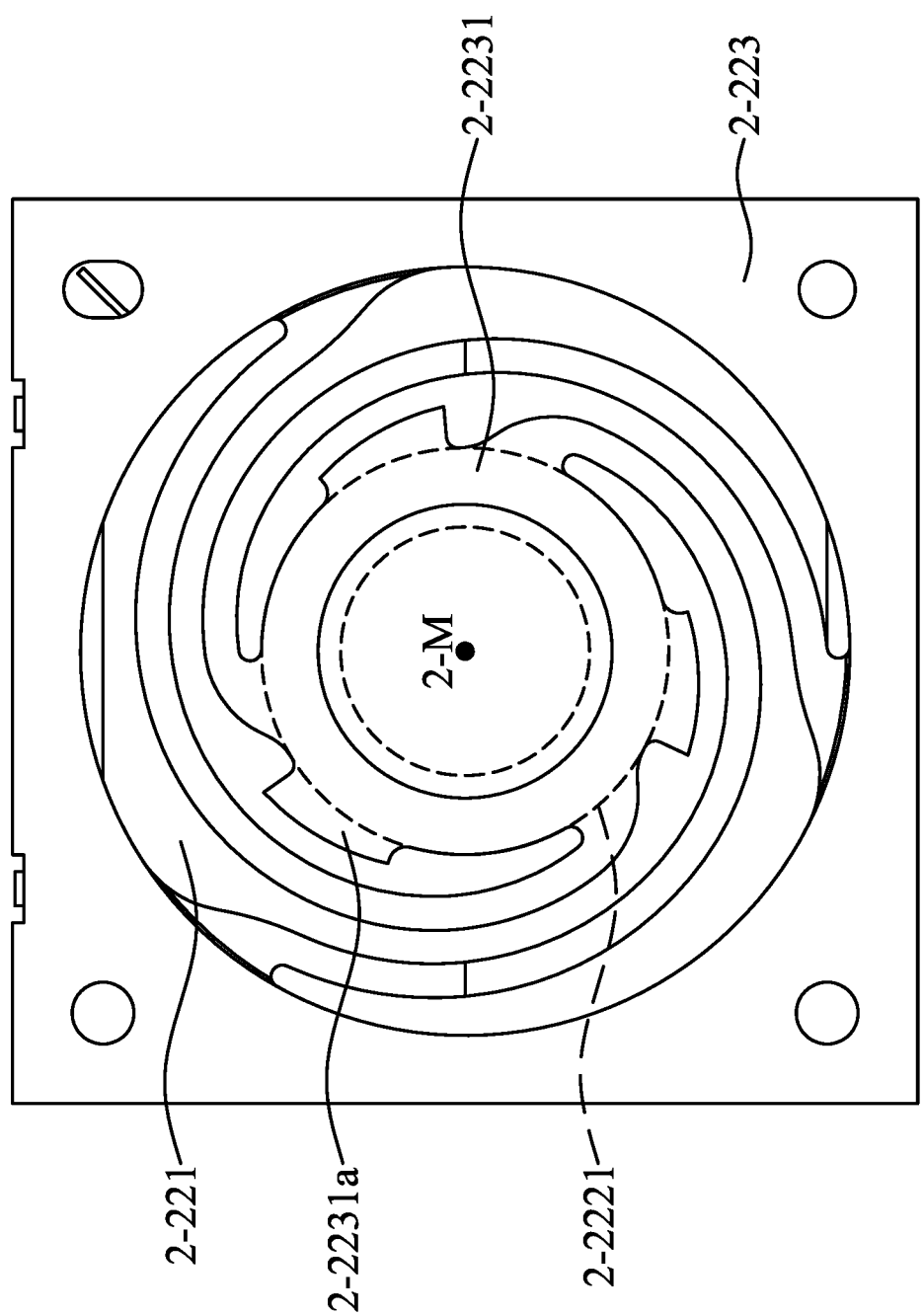
FIG. 19B shows a bottom view of the first moving member, a first driving coil, and the first elastic element according to an embodiment of the present invention, wherein the first driving coil is shown as a dashed line.

Please refer to FIG. 19B, FIG. 19B is a bottom view of the first moving member 2-221, the first driving coil 2-2221, and the first elastic element 2-223, wherein the first driving coil 2-2221 is shown as a dashed line. The first elastic element connecting portion 2-2231 may be fixedly connected to the first moving member 2-221 and the first driving coil 2-2221 by welding. Therefore, the first elastic element connecting portion 2-2231 and the first driving coil 2-2221 at least not partially overlap when observed along the main axis 2-M. The connection strengthening portions 2-2231a may increase the connecting area between the first elastic element connecting portion 2-2231 and the first moving member 2-221, so as to enhance the connecting strength of the first elastic element 2-223 and the first moving member 2-221.

Figure 19C:
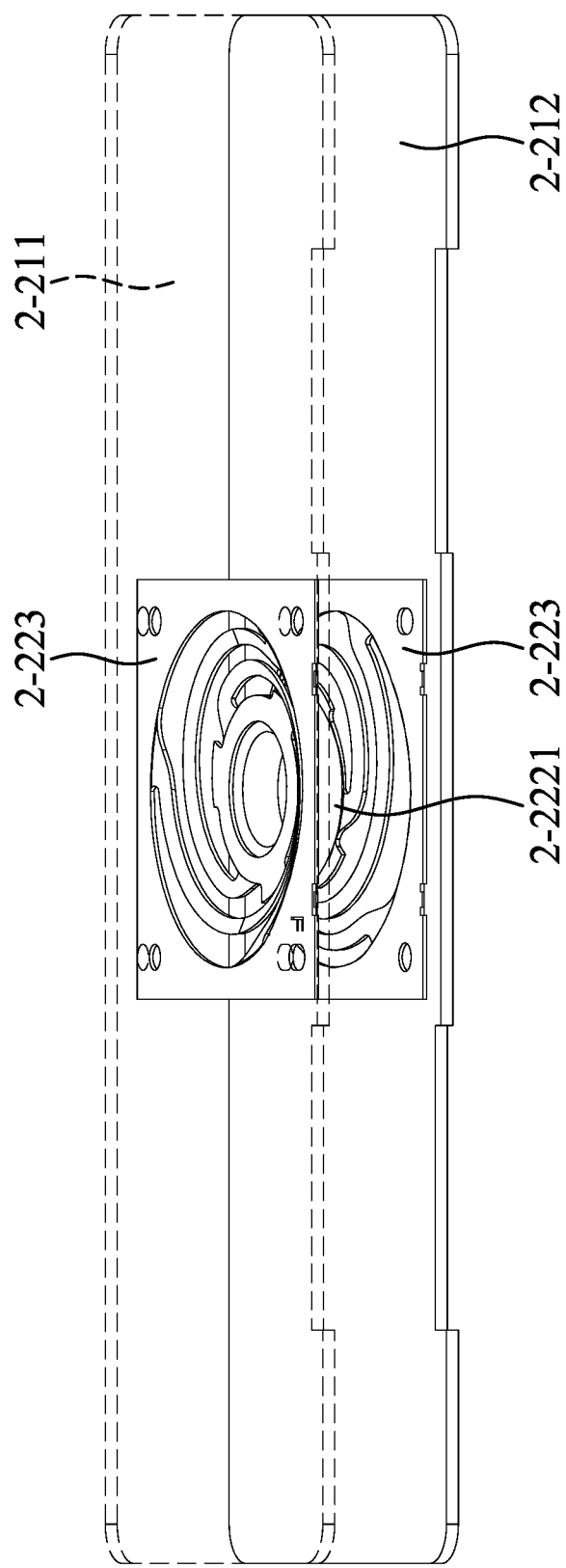
FIG. 19C shows a side view of the top plate, the bottom plate, and the first vibration part according to an embodiment of the present invention.

Please refer to FIG. 19C, FIG. 19C is a side view of the top plate 2-211, the bottom plate 2-212, and the first vibration part 2-220. In this embodiment, the first vibrating part 2-220 has two first elastic elements 2-223, and the two first elastic elements 2-223 are respectively connected to the top plate 2-211 and the bottom plate 2-212. The two first elastic elements 2-223 are both electrically connected to the first driving coil 2-2221. Therefore, in this embodiment, the two first elastic elements 2-223 supply external current to the first driving coil 2-2221 to generate the electromagnetic driving force.

Figure 20:
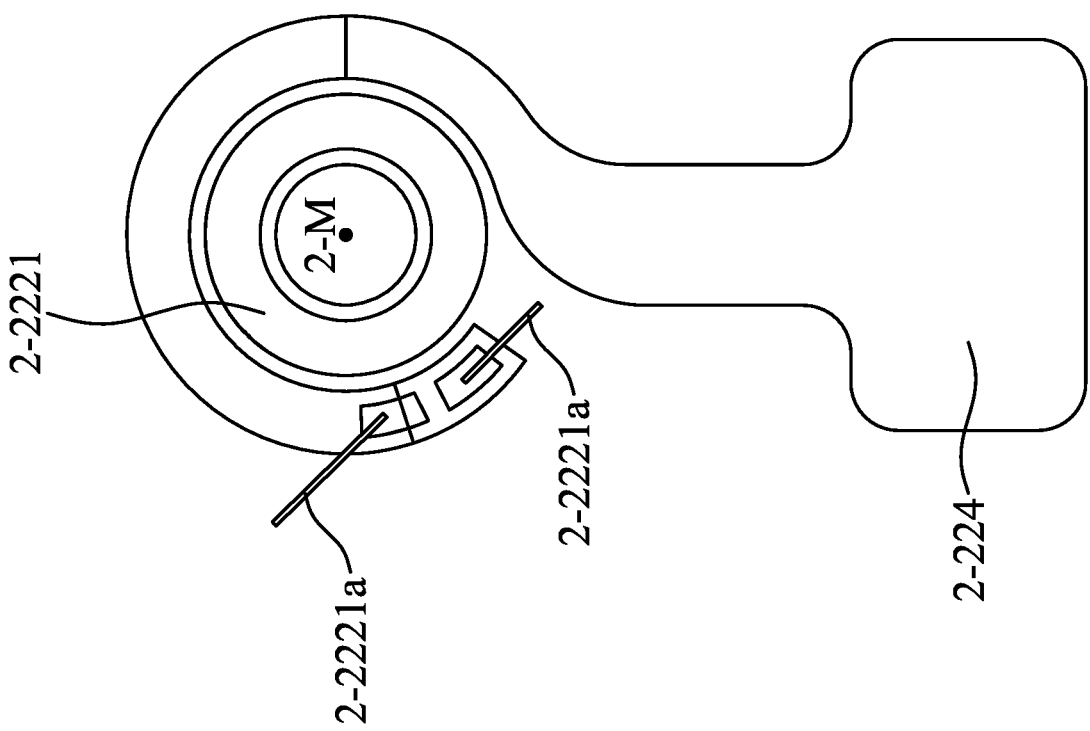
FIG. 20 shows a schematic view of the first driving coil, and the first circuit assembly according to an embodiment of the present invention.

FIG. 20 is a schematic view of the first driving coil 2-2221, and the first circuit assembly 2-224. The first driving coil 2-2221 of the first driving assembly 2-222 is electrically connected to the first circuit assembly 2-224 via two wires 2-2221a of the first driving coil 2-2221. Therefore, in the embodiment shown in FIG. 20, the first circuit assembly 2-224 supplies external current to the first driving coil 2-2221 to generate the electromagnetic driving force.

Figure 21A:
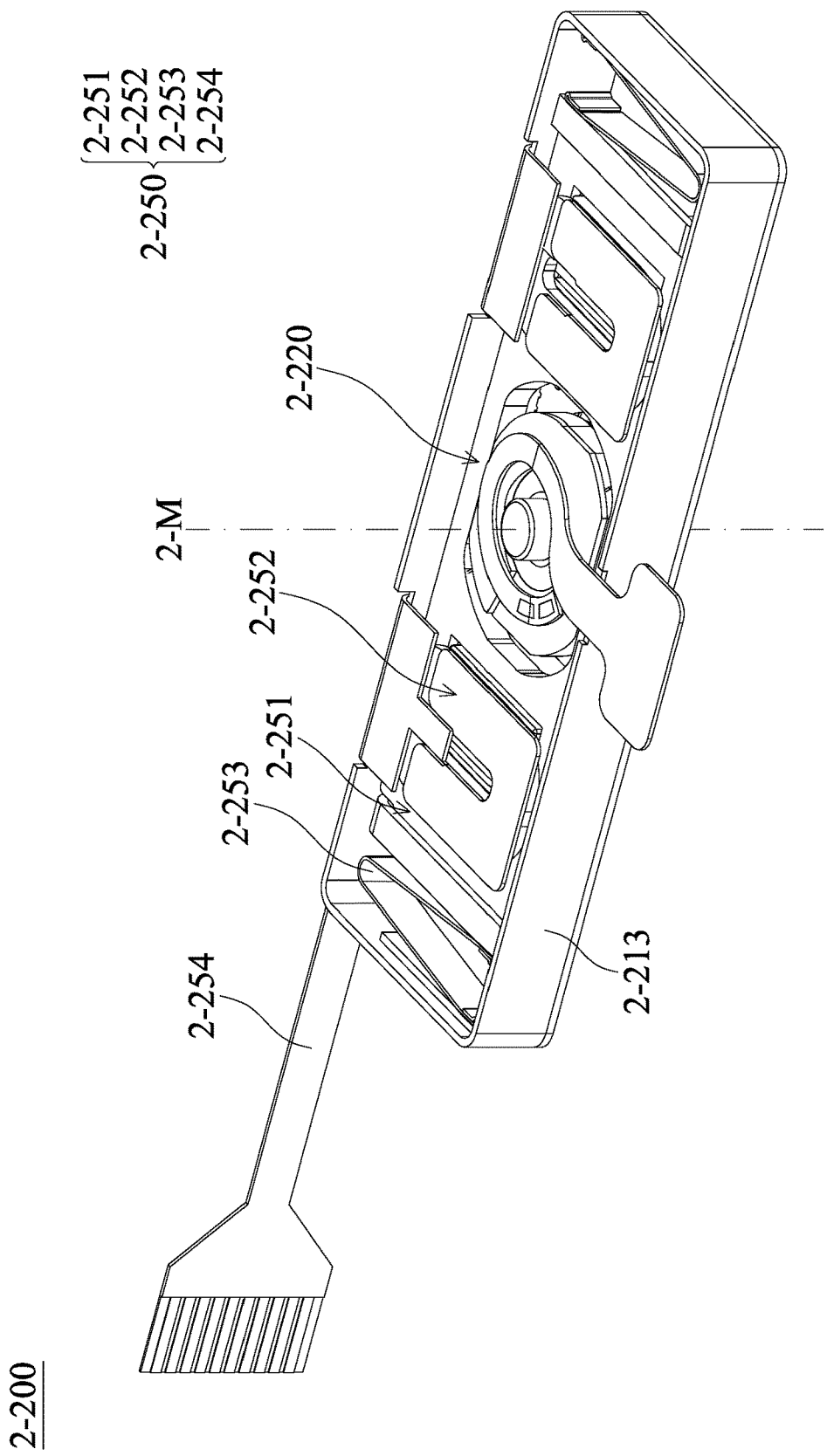
FIG. 21A shows a schematic view of the vibration module according to an embodiment of the present invention, wherein the top plate and the shielding element are omitted.

FIG. 21A is a schematic view of the vibration module 2-200 according to an embodiment, wherein the top plate 2-211 and the shielding element 2-214 are omitted. As shown in FIG. 21A, in an embodiment of the present invention, the vibration module 2-200 further includes a second vibration part 2-250. The second vibration part 2-250 is disposed within the outer frame 2-213 of the fixed part 2-210. The second vibration part 2-250 includes a second moving member 2-251, a second driving assembly 2-252, a second elastic element 2-253, and a second circuit element 2-254. The first vibration part 2-220 has a first natural resonance frequency, and the second vibration part 2-250 has a second natural resonance frequency, and the second natural resonance frequency is different from the first natural resonance frequency. The second driving assembly 2-252 drives the second moving member 2-251 to move relative to the fixed part 2-210 in the direction that is not parallel to the main axis 2-M. The second moving member 2-251 is movably connected to the outer frame 2-213 of the fixed part 2-210 via the second elastic element 2-253. The second circuit assembly 2-254 is electrically connected to the second driving assembly 2-252 to supply the external current to the second driving assembly 2-252, thereby driving the second moving member 2-251 to move.

Figure 21B:
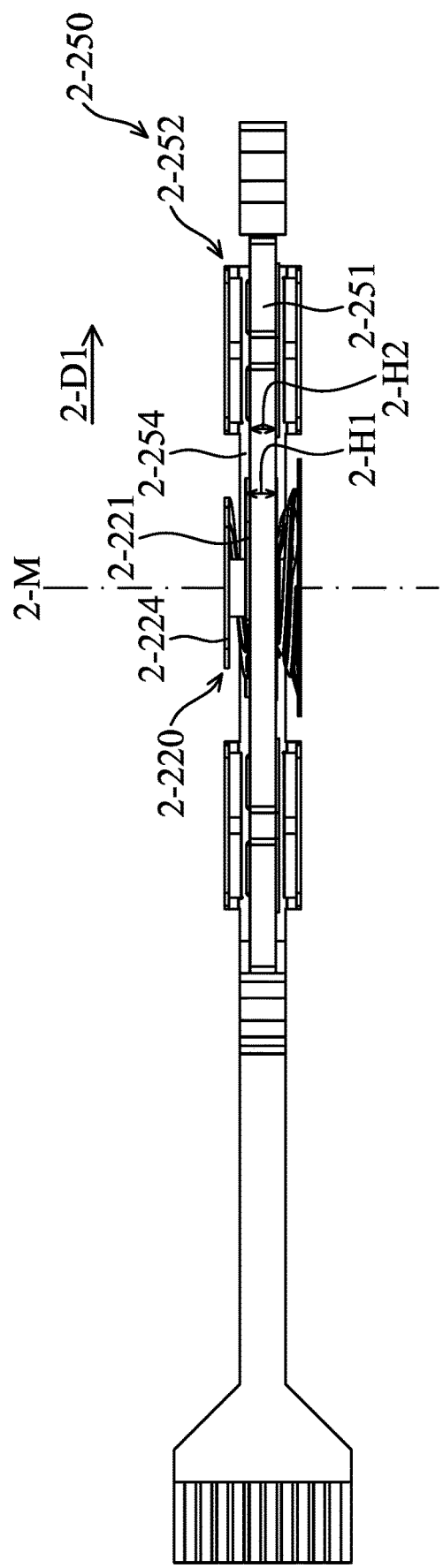
FIG. 21B is a side view of the first vibration part and a second vibration part according to the same embodiment as FIG. 21A.

FIG. 21B is a side view of the first vibration part 2-220 and the second vibration part 2-250 according to the same embodiment as FIG. 21A. As shown in FIG. 21B, a largest size 2-H1 of the first moving member 2-221 on the main axis 2-M is larger than a largest size 2-H2 of the second moving member 2-251 on the main axis 2-M when observed along a direction perpendicular to the main axis. That is, the largest size 2-H2 of the second moving member 2-251 on the main axis 2-M is smaller than the largest size 2-H1 of the first moving member 2-221 on the main axis 2-M. Thus, the size and the weight of the second moving member 2-251 may be reduced, and the effect of miniaturization is achieved. The second circuit assembly 2-254 extends in a first direction 2-D1 to supply the external current to the second driving assembly 2-252. Therefore, the first circuit assembly 2-224 and the second circuit assembly 2-254 at least partially overlap when observed along the direction perpendicular to the main axis 2-M.

Figure 21C:
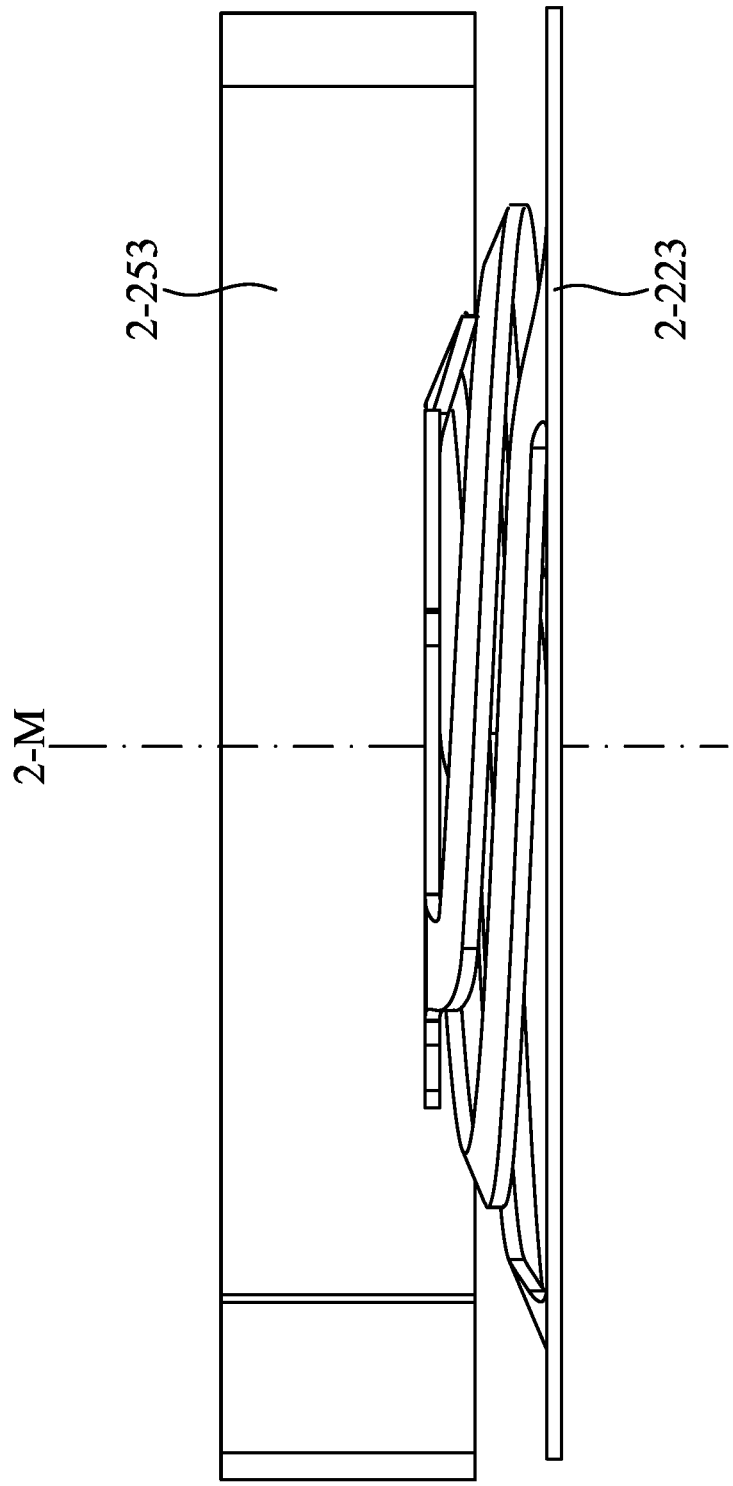
FIG. 21C shows a side view of the first elastic element, and a second elastic element according to an embodiment of the present invention.

FIG. 21C is a side view of the first elastic element 2-223 and the second elastic element 2-253. As shown in FIG. 21C, the first elastic element 2-223 and the second elastic element 2-253 at least partially overlap when observed along the direction perpendicular to the main axis 2-M. Thus, the vibration module 2-200 may be more stable, and the internal space of the vibration module 2-200 is effectively use, and the effect of miniaturization is achieved.

Figure 21D:
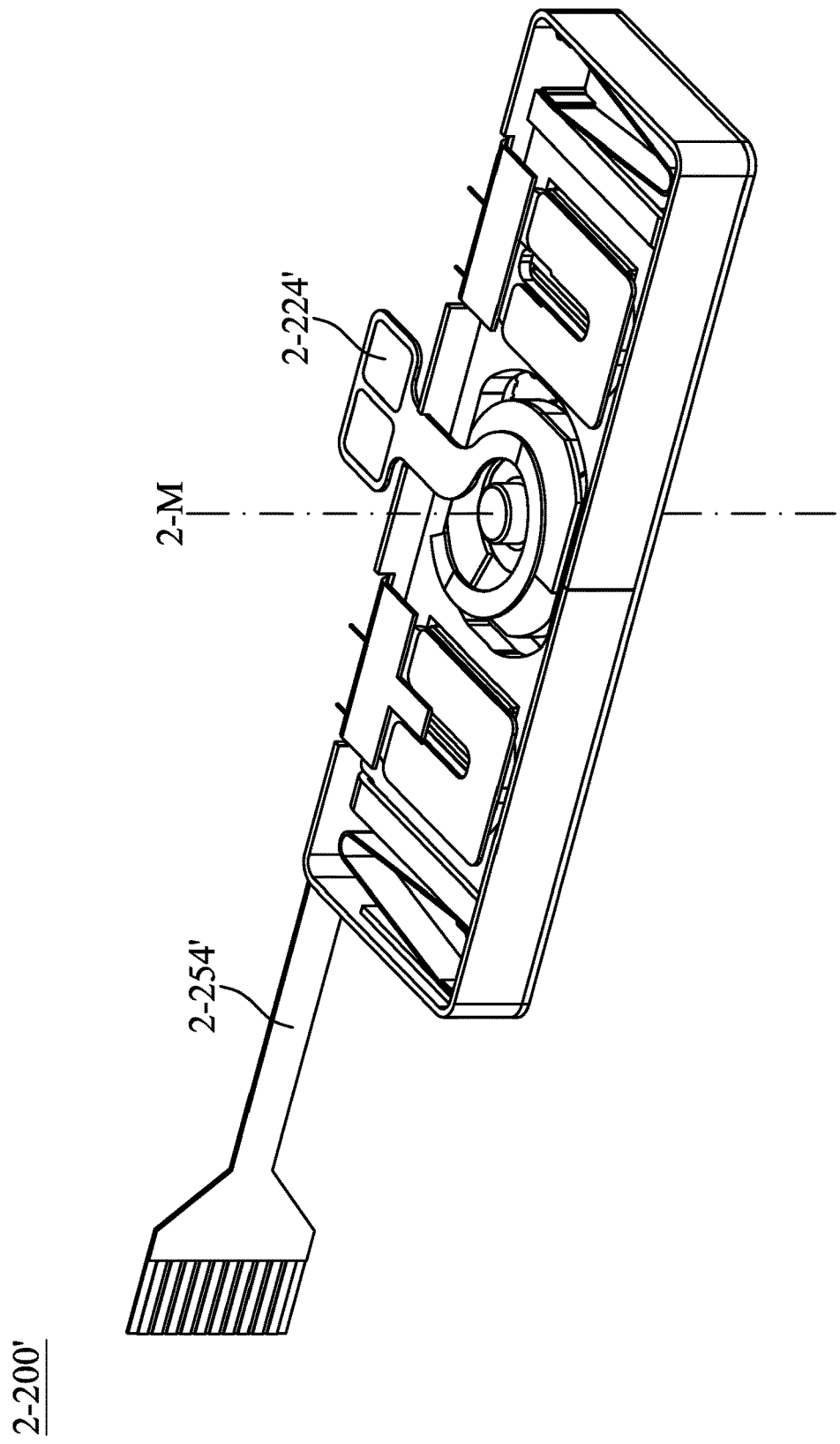
FIG. 21D is a schematic view of the vibration module according to an embodiment similar to FIG. 21A.

FIG. 21D is a schematic view of the vibration module 2-200' according to an embodiment similar to FIG. 21A. In the embodiment shown in FIG. 21D, most of the elements of the vibration module 2-200' are the same as the elements of the vibration module 2-200 of the embodiment shown in FIG. 21A. However, as shown in the FIG. 21D, in this embodiment, the orientation of the first circuit assembly 2-224' is different from the orientation of the first circuit assembly 2-224 of the embodiment shown in FIG. 21A. In the embodiment shown in FIG. 21A, the first circuit assembly 2-224 extends in a direction opposite the second circuit assembly 2-254. However, in the embodiment shown in FIG. 21D, the first circuit assembly 2-224' extends toward the second circuit assembly 2-254'. Therefore, in this embodiment, the first circuit assembly 2-224' and the second circuit assembly 2-254' at least partially overlap when observed along the main axis 2-M. Thus, it may be beneficial to the connection between the first circuit assembly 2-224' and the second circuit assembly 2-254' and the external power source.

In one embodiment, the vibration module 2-200 may not be provided with a second circuit assembly 2-254, and the external current supplied to the first driving assembly 2-222 and the second driving assembly 2-252 only via the first circuit assembly 2-224. Alternatively, in another embodiment, the vibration module 2-200 may not be provided with a first circuit assembly 2-224, and the external current supplied to the first driving assembly 2-222 and the second driving assembly 2-252 only via the second circuit assembly 2-254. Thus, the weight of the vibration module 2-200 may be reduced, and the effect of miniaturization is achieved.

In summary, the embodiments of the present invention provide the vibration module 2-200 capable of generating a stable vibration in a single direction and two directions, and the vibration module 2-200 disclosed in the embodiments of the present invention has a lower manufacturing cost and has been miniaturized.

Figure 22:
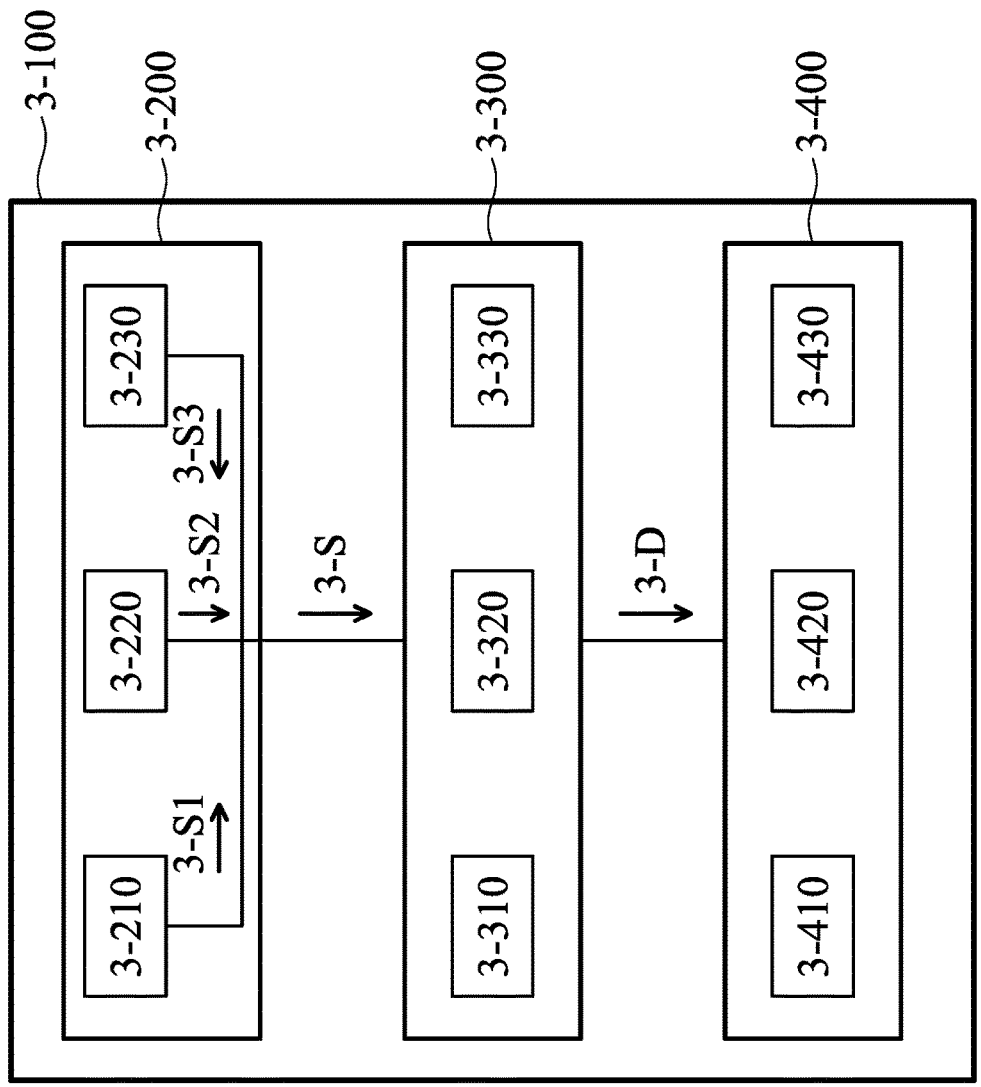
FIG. 22 is a schematic view of a feedback system in some embodiments of the present disclosure.

FIG. 22 is a schematic view of a feedback system 3-1 in some embodiments of the present disclosure. The feedback system 3-1 may be disposed in an electronic device, such as a mobile device like a cellphone, a mouse, or a smart bracelet, or may be used in automobile industry (such as disposed in the steering wheel or in the car key) to provide a feedback force to users, and the user may receive the information by vibration. As shown in FIG. 22, the feedback system 3-1 may mainly include a main body 3-100, a sensing module 3-200, a control module 3-300, and a vibration module 3-400.

As shown in FIG. 22, the main body 3-100 may be, for example, a case of the feedback system 3-1, and the sensing module 3-200, the control module 3-300, and the vibration module 3-400 may be disposed in the main body 3-100 to protect the sensing module 3-200, the control module 3-300, and the vibration module 3-400. In some embodiments, the vibration module 3-400 may be replaced by the vibration module 1-100 or the vibration module 2-200, depending on design requirement. In some embodiments, the sensing module 3-200 may be used for detecting the status of the main body 3-100, and provide a sensing signal 3-S to the control module 3-300 that corresponds to the status. For example, the sensing module 3-200 may include different sensing assemblies, such as an inertia sensing assembly 3-210, a depth sensing assembly 3-220, and a light sensing assembly 3-230, to detect different statuses of the main body 3-100. In some embodiments, the inertia sensing assembly 3-210 may include, for example, gyroscope, accelerometer, angular velocity meter, or gravity direction sensor to detect the inertia status of the main body 3-100 and provide an inertia signal 3-S1 (a portion of the sensing signal 3-S).

In some embodiments, when detecting the inertia of the feedback system 3-1 using the inertia sensing assembly 3-210, the signal detected by the inertia sensing assembly 3-210 may be processed in advance, and then the inertia signal 3-S1 may be provided. For example, a specific frequency of the signal may be filtered, such as only allowing the signal having a frequency that may occur during normal usage of the feedback system 3-1 to pass through, while filtering signals having other frequencies. In other embodiments, the interference of the feedback system 3-1 on the electronic device may be recorded, and then noise may be canceled according to the recorded interference. For example, a signal may be provided according to the signal caused by the interference of the feedback system 3-1 on the electronic device, the two signals may have identical amplitude and different directions, so that the noise may be canceled. In other embodiments, the environmental interference on the feedback system 3-1 may be recorded in advance, and then the noise caused by the interference may be canceled, depending on design requirements.

Figure 23:
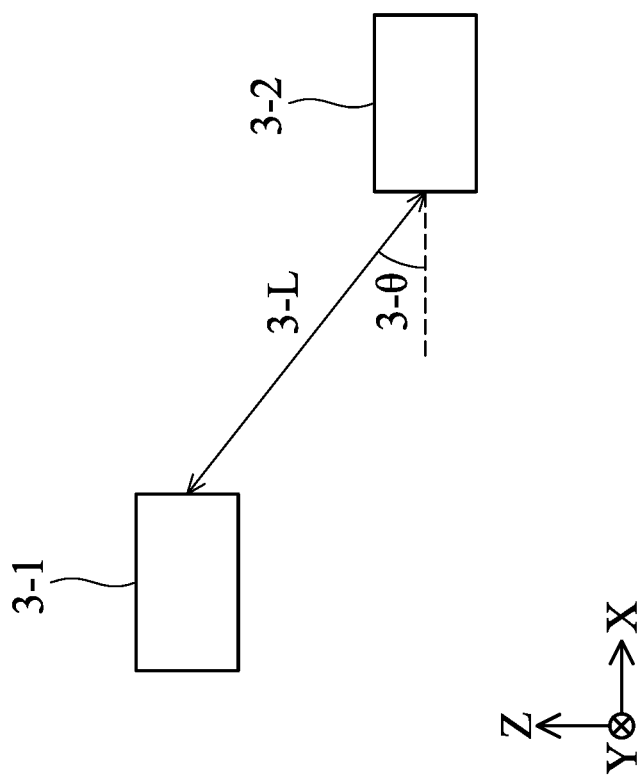
FIG. 23 is a schematic view of the feedback system and a sensing device in some embodiments of the present disclosure.

The depth sensing assembly 3-220 may be used for detecting the position variation of the main body 3-100 related to the environment, and then providing position signal 3-S2 (a portion of the sensing signal 3-S) according to the position variation. For example, FIG. 23 is a schematic view of the feedback system 3-1 and a sensing device 3-2 in some embodiments of the present disclosure. As shown in FIG. 23, the sensing device 3-2 outside the feedback system 3-1 may be used for detecting the position of the feedback system 3-1 relative to the sensing device 3-2, such as the distance 3-L between the feedback system 3-1 and the sensing device 3-2, or an angle θ between a horizontal reference plane and a connection line of the feedback system 3-1 and the sensing device 3-2. Afterwards, the position variation or speed of the feedback system 3-1 relative to the environment may be calculated, and then the position signal 3-S2 may be provided accordingly. In some embodiments, the light sensing assembly 3-230 may include an optical sensor, and may be used for detecting light variation of the environment near the main body 3-100, and a light signal 3-S3 (a portion of the sensing signal 3-S) may be provided by the light sensing assembly 3-230 according to the light variation of the environment.

The inertia signal 3-S1, the position signal 3-S2, and the light signal 3-S3 may be combined to get the sensing signal 3-S, and the sensing signal 3-S may be provided to the control module 3-300 by the sensing module 3-200 to further control the feedback system 3-1. The control module 3-300 may include, for example, a central processing unit (CPU), to process the received sensing signal 3-S, and then provide a driving signal 3-D to the vibration module 3-400. Therefore, the vibration module 3-400 may be controlled to provide a vibration force to the main body 3-100.

In some embodiments, the control module 3-300 may further include a memory such as read-only memory (ROM) or random access memory (RAM) used to store data for calibrating the sensing signal 3-S. For example, inertia sensing calibration data 3-310, depth sensing calibration data 3-320, and light sensing calibration data 3-330 may be stored in the control module 3-300. The inertia sensing calibration data 3-310 may be used for recording the calibration information of the inertia sensing assembly 3-210, the depth sensing calibration data 3-320 may be used for recording the calibration information of the depth sensing assembly 3-220, and the light sensing calibration data 3-330 may be used for recording the calibration information of the light sensing assembly 3-230. Therefore, the sensing signal 3-S may be proceed according to the inertia sensing calibration data 3-310, the depth sensing calibration data 3-320, and the light sensing calibration data 3-330 that are stored in the control module 3-300, and then providing the driving signal 3-D to the vibration module 3-400.

In some embodiments, when the feedback system 3-1 is used for the first time, it is not necessary to recalibrate the inertia sensing calibration data 3-310 and the light sensing calibration data 3-330, but it is necessary to recalibrate the depth sensing calibration data 3-320 to get the position of the feedback system 3-1 relative to the environment. In some embodiments, the inertia sensing calibration data 3-310 and the light sensing calibration data 3-330 may be recalibrated when the feedback system 3-1 is used for the first time as well to get more accurate information.

In some embodiments, the vibration module 3-400 may include a first vibration mechanism 3-410, a second vibration mechanism 3-420, and a third vibration mechanism 3-430. However, the present disclosure is not limited thereto. The number of the vibration mechanisms in the vibration module 3-400 may be adjusted according to actual requirement. The first vibration mechanism 3-410, the second vibration mechanism 3-420, and the third vibration mechanism 3-430 may be mechanisms that can provide vibration forces to the main body 3-100, such as vibrating motors.

The vibration forces may be provided to the main body 3-100 at different positions. For example, a first vibration force may be provided by the first vibration mechanism 3-410 at a first vibration position of the main body 3-100, a second vibration force may be provided by the second vibration mechanism 3-420 at a second vibration position of the main body 3-100, a third vibration force may be provided by the third vibration mechanism 3-430 at a third vibration position of the main body 3-100. It should be noted that distances between the first vibration position, the second vibration position, and the third vibration position are not equal to zero (such as greater than zero). In other words, the first vibration mechanism 3-410, the second vibration mechanism 3-420, and the third vibration mechanism 3-430 may provide forces to the main body 3-100 at different positions. Therefore, different feedback forces (forces provided by the main body 3-100 to the user) may be generated.

Figure 24:
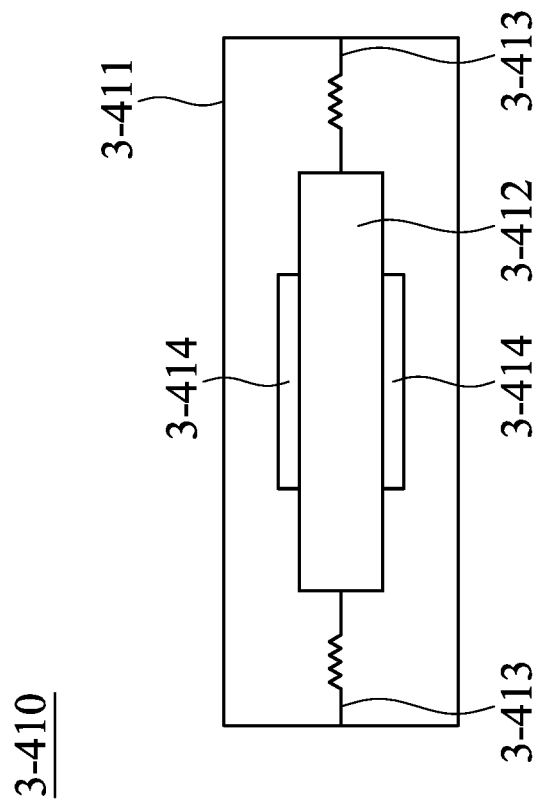
FIG. 24 is a schematic view of a vibration mechanism in some embodiments of the present disclosure.

FIG. 24 is a schematic view of vibration mechanisms in some embodiments of the present disclosure. As shown in FIG. 24, the first vibration mechanism 3-410 may include a fixed portion 3-411, a movable portion 3-412, a resilient element 3-413, and a driving assembly 3-414. The fixed portion 3-411 may be affixed on the main body 3-100, and the movable portion 3-412, the resilient element 3-413, and the driving assembly 3-414 may be disposed in the fixed portion 3-411. The movable portion 3-412 may include a heavier element (such as metal block) and may move relative to the fixed portion 3-411. The resilient element 3-413 may be, for example, a spring which is flexible and resilient, and the movable portion 3-412 is movably connected to the fixed portion 3-411 through the resilient element 3-413 to allow the movable portion 3-412 moving relative to the fixed portion 3-411. The driving assembly 3-414 may be disposed on the fixed portion 3-411 and the movable portion 3-412 to drive the movable portion 3-412 to move relative to the fixed portion 3-411.

In some embodiments, the driving assembly 3-414 may include electromagnetic driving assembly (such as a combination of magnets and coils) to drive the movable portion 3-412 via the electromagnetic principle. In this embodiment, the driving assembly 3-414 may have portions that are respectively disposed on the fixed portion 3-411 and the movable portion 3-412 and separated from each other.

Although a kind of vibration mechanism is described above, the present disclosure is not limited thereto. In some embodiments, the driving assembly 3-414 may include shape memory alloy (SMA) driving assembly which may deform when the temperature changes, therefore a driving force may be provided to the movable portion 3-412 by the characteristics of the shape memory alloy.

Alternatively, in some embodiments, the driving assembly 3-414 may include piezoelectric driving assembly which may convert electric energy to mechanical energy, so a driving force may be generated to the movable portion 3-412 via the piezoelectric principle. In this embodiment, the driving assembly 3-414 may connect the fixed portion 3-411 and the movable portion 3-412.

Although only the first vibration mechanism 3-410 is illustrated in FIG. 24, but is should be noted that the second vibration mechanism 3-420 and the third vibration mechanism 3-430 may have similar structure to the first vibration mechanism 3-410, and are not repeated here.

In some embodiments, the first vibration mechanism 3-410, the second vibration mechanism 3-420, and the third vibration mechanism 3-430 may further include vibration mechanisms that can vibrate in multiple dimensions. For example, in some embodiments, the first vibration mechanism 3-410, the second vibration mechanism 3-420, or the third vibration mechanism 3-430 may include a first dimension vibration mechanism, a second dimension vibration mechanism, a third dimension vibration mechanism, a fourth dimension vibration mechanism, a fifth dimension vibration mechanism, and a sixth dimension vibration mechanism (not shown).

In some embodiments, the first dimension vibration mechanism may generate vibration in a first dimension, the second dimension vibration mechanism may generate vibration in a second dimension, the third dimension vibration mechanism may generate vibration in a third dimension, the fourth dimension vibration mechanism may generate vibration in a fourth dimension, the fifth dimension vibration mechanism may generate vibration in a fifth dimension, the sixth dimension vibration mechanism may generate vibration in a sixth dimension. The first dimension, the second dimension, the third dimension, the fourth dimension, the fifth dimension, and the sixth dimension may be different to allow different types of vibration of the vibration module 3-400.

In some embodiments, the vibration on the first dimension may be a linear motion along a first direction (e.g. the X direction), the vibration on the second dimension may be a linear motion along a second direction (e.g. the Y direction), the vibration on the third dimension may be a linear motion along a third direction (e.g. the Z direction), the vibration on the fourth dimension may be a rotation with a rotational axis extends in the first direction, the vibration on the fifth dimension may be a rotation with a rotational axis extends in the second direction, the vibration on the sixth dimension may be a rotation with a rotational axis extends in the second direction. Therefore, the variation of the first vibration force, the second vibration force, and the third vibration force may be increased to provide more kinds of feedback to users. For example, a multi-dimension combined vibration may be achieved, or the amplitude of the vibration in a specific mode may be increased.

In some embodiments, the first vibration mechanism, the second vibration mechanism, the third vibration mechanism, the fourth vibration mechanism, the fifth vibration mechanism, and the sixth vibration mechanism may be different vibration mechanisms separated from each other, so it may be easier to control the vibration mechanisms. Alternatively, a single vibration may provide vibrations in multiple dimensions, such as the first dimension vibration mechanism and the second dimension vibration mechanism may be combined as a single vibration mechanism to provide vibration in two or more than two dimensions. Therefore, the number of required elements may be reduced to achieve miniaturization.

Even if the parameter settings have been determined when an electronic device having the feedback system 3-1 is manufactured, the user may change the settings in the electronic product when using an electronic device for various reasons. For example, a change of environment, shock, surge, or ageing may cause the data in the electronic device to be replaced or lost, so the measured value may be inaccurate. Therefore, a calibration process 3-500 may be performed on the feedback system 3-1 to increase the reliability of the electronic device employing the feedback system 3-1.

Figure 25:
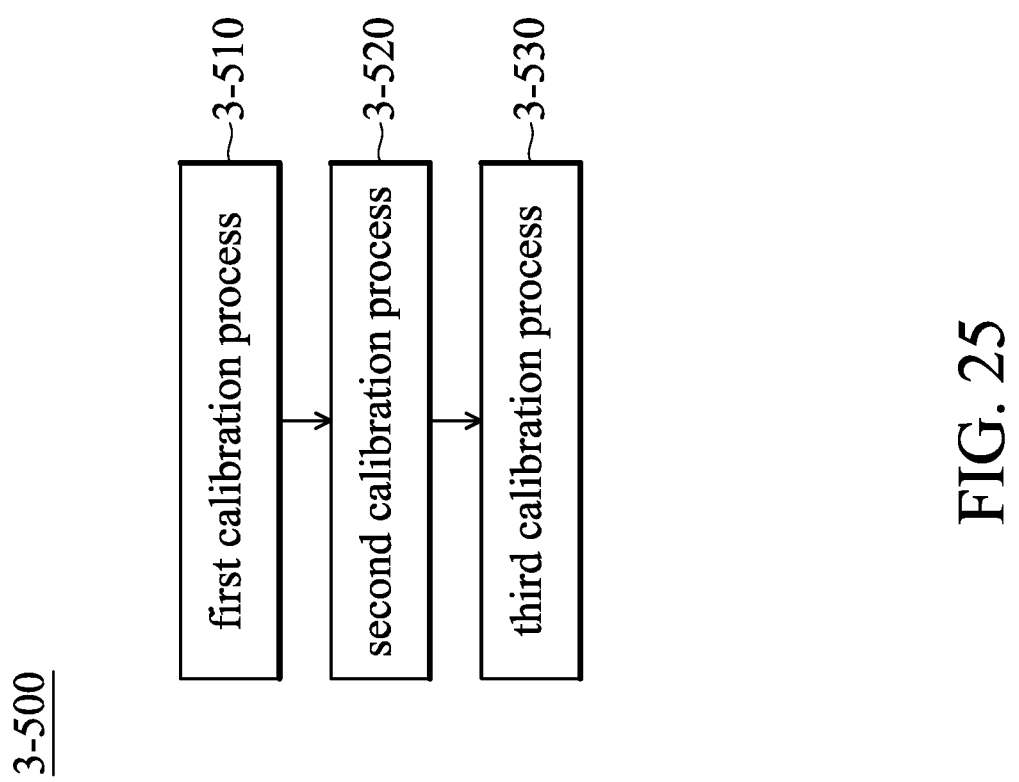
FIG. 25 is a block diagram of a calibration process in some embodiments of the present disclosure.

FIG. 25 is a block diagram of the calibration process 3-500 in some embodiments of the present disclosure. As shown in FIG. 25, the calibration process 3-500 includes a first calibration process 3-510 used for calibrating the inertia sensing calibration data 3-310, a second calibration process 3-520 used for calibrating the depth sensing calibration data 3-320, and further includes a third calibration process 3-530 used for calibrating the light sensing calibration data 3-330.

Although the first calibration process 3-510, the second calibration process 3-520, and the third calibration process 3-530 in FIG. 25 are illustrated as performed in sequence, the present disclosure is not limited thereto. For example, the order of the first calibration process 3-510, the second calibration process 3-520, and the third calibration process 3-530 may be changed according to requirement, or multiple calibration processes may be performed at the same time, depending on design requirements.

The first calibration process 3-510 may include multiple methods to redefine the inertia sensing calibration data 3-310. For example, the main body 3-100 may be at rest to redefine the inertia sensing calibration data 3-310. In some embodiments, the inertia sensing calibration data 3-310 may be redefined according to the position signal 3-S2 measured by the depth sensing assembly 3-220 by comparing with the position variation relative to the environment. In some embodiments, an acceleration sensor and an angular velocity sensor (not shown) in the inertia sensing assembly 3-210 may be used to redefine the inertia sensing calibration data 3-310.

For example, the acceleration of the feedback system 3-1 may be measured by the acceleration sensor, and then the acceleration is compared with the acceleration of gravity. If the acceleration measured by the acceleration sensor is different than the acceleration of gravity, it means that the feedback system 3-1 is moving rather than at rest. For example, in some embodiments, the absolute value of the acceleration A detected by the acceleration sensor should be less than the sum of the acceleration of gravity G and the margin of error of the acceleration E1, i.e. $|A|<G+E1$. After the situation remains over a predetermined time T, the angular velocity sensor may be used to redefine the inertia sensing calibration data 3-310 to achieve more accurate data.

The margin of error of the acceleration E1 may be determined depending on actual requirements, such as the feedback system 3-1 may be measured by an external apparatus (not shown) to determine the margin of error of the acceleration E1, and then the margin of error of the acceleration E1 is recorded in the inertia sensing calibration data 3-310 of the control module 3-300. Alternatively, the main body 3-100 may be at rest for a period of time, and the feedback system 3-1 may be measured by the external apparatus to determine the margin of error of the acceleration E1, and then the margin of error of the acceleration E1 is recorded in the inertia sensing calibration data 3-310 of the control module 3-300 to achieve a more accurate margin of error of the acceleration E1.

If the acceleration A is substantially identical to the acceleration of gravity G, the next step is to determine whether the angular velocity N of the feedback system 3-1 measured by the angular velocity sensor is zero. For example, in some embodiments, the absolute of the angular velocity N measured by the angular velocity sensor is required to be less than a margin of error of the angular velocity E2, in other words, $|N|<E2$. After the situation remains over the predetermined time T, it can be determined that the feedback system 3-1 is in a static state to redefine the inertia sensing calibration data 3-310. In some embodiments, the acceleration sensor and the angular velocity sensor may be used in sequence or the acceleration sensor and the angular velocity sensor may be used at the same time for detecting the status variation of the feedback system 3-1, depending on design requirements.

The second calibration process 3-520 may include multiple methods to redefine the depth sensing calibration data 3-320. For example, in the second calibration process 3-520, the main body 3-100 may be placed in different places to redefine the depth sensing calibration data 3-320. In some embodiments, the depth sensing calibration data 3-320 may be redefined according to the inertia signal 3-S1, which relates to the inertia status of the main body 3-100. In some embodiments, the first calibration process 3-510 and the second calibration process 3-520 may be performed at the same time.

The third calibration process 3-530 may be used to redefine the light sensing calibration data 3-330. For example, an external apparatus (not shown) may emit reference light to the light sensing assembly 3-230 to redefine the light sensing calibration data 3-330.

By performing the calibration process 3-500, the inertia sensing calibration data 3-310, the depth sensing calibration data 3-320, and the light sensing calibration data 3-330 may be redefined to make the data closer to actual situation for increasing the accuracy when using the feedback system 3-1. In some embodiments, it is possible to only perform some operations of the calibration process 3-500 to simplify the calibration process 3-500. Alternatively, all operations in the calibration process 3-500 may be performed to achieve more accurate information. In some embodiments, the calibration process 3-500 may be performed multiple times when the feedback system 3-1 has different positions (e.g. changing location), and these results may be compared with each other to get more accurate calibration data.

When using the feedback system 3-1, the feedback system 3-1 may have different feedback modes to provide the user different feedback forces. For example, the feedback system 3-1 may include a first feedback mode, a second feedback mode, and a third feedback mode. The first feedback mode of the feedback system 3-1 is used for generating a first feedback force to the main body 3-100, the second feedback mode is used for generating a second feedback force to the main body 3-100, and the third feedback mode is used for generating a third feedback force to the main body 3-100, and then the feedback forces are provided to the user.

In some embodiments, the first feedback force, the second feedback force, and the third feedback force are different. For example, the directions and the values of the first feedback force and the second feedback force are different; the directions of the first feedback force and the third feedback force may be identical, and the values of the first feedback force and the third feedback force may be different, depending on design requirements. In other words, the modes of the first feedback force and the third feedback force may be identical, but with different amplitudes. As a result, the first feedback force, the second feedback force, and the third feedback force that are different may be provided to the user to deliver different messages.

For example, by changing the values or the dimensions of the first vibration force, the second vibration force, and the third vibration force that are respectively applied to the main body 3-100 by the first vibration mechanism 3-410, the second vibration mechanism 3-420, and the third vibration mechanism 3-430, the first feedback mode, the second feedback mode, and the third feedback mode that are different may be performed. For instance, the values and the dimensions of the first vibration force, the second vibration force, and the third vibration force may be identical in the first feedback mode. Alternatively, the values and the dimensions of the first vibration force, the second vibration force, and the third vibration force may be different in the second feedback mode. The values of the first vibration force, the second vibration force, and the third vibration force may be different in the third feedback mode, but their dimensions may be identical. As a result, different feedback forces may be provided to the user to deliver different messages. In some embodiments, the control module 3-300 may determine whether the first feedback mode, the second feedback mode, or the third feedback mode is used for performing the feedback based on the received sensing signal 3-S, so different messages may be provided to the used in different environments.

In some embodiments, in order to decrease the size of the feedback system 3-1, the vibration generated by the vibration module 3-400 may be amplified by resonance. When the vibration force is applied with the frequency of the resonance frequency of the feedback system 3-1, resonance will occur at the feedback system 3-1, so the feedback system 3-1 will vibrate with higher amplitude when compared to vibration forces having frequencies other than the resonance frequency. Therefore, higher feedback force may be provided to the user. In general, a system will have multiple resonance frequencies, and resonance may easier occur at these frequencies. For example, predetermined information which includes a first frequency and a second frequency may be recorded in the control module 3-300. The first frequency may be the first resonance frequency of the feedback system 3-1, which may or may not be the first natural resonance frequency (the resonance frequency with the lowest frequency) of the feedback system 3-1. The second frequency may be the second resonance frequency of the feedback system 3-1, and the first frequency and the second frequency are different. In some embodiments, the frequency of the first feedback force may be identical to the first resonance frequency, the frequency of the second feedback force may be identical to the second resonance frequency, and the frequency of the third feedback force may be identical to the first resonance frequency. Therefore, the vibration may be performed by resonance, and the required size of the vibration module 3-400 may be reduced to achieve miniaturization.

In some embodiments, the resonance frequency F1 of the main body 3-100 may be similar to the resonance frequency F2 of the movable portion (e.g. the movable portion 3-412) plus the resilient element (e.g. the resilient element 3-413) of the first vibration mechanism 3-410, the second vibration mechanism 3-420, or the third vibration mechanism 3-430. For example, the difference between the resonance frequency F1 and the resonance frequency F2 may be less than 10% of the resonance frequency F1 (i.e. $|F1-F2|/F1<0.1$) to achieve resonance more easily.

However, it should be noted that when designing the feedback system 3-1, the first vibration position of the main body 3-100 where the first vibration mechanism 3-410 applying the first vibration force to the main body 3-100, the second vibration position of the main body 3-100 where the second vibration mechanism 3-420 applying the second vibration force to the main body 3-100, and the third vibration position of the main body 3-100 where the third vibration mechanism 3-430 applying the third vibration force to the main body 3-100 may be prevented from being designed at the nodes of a first vibration mode or a second vibration mode of the main body 3-100 to prevent different vibration modes being activated. The first vibration mode and the second vibration mode may be, for example, the vibration modes when standing waves occur in the main body 3-100.

Figure 26:
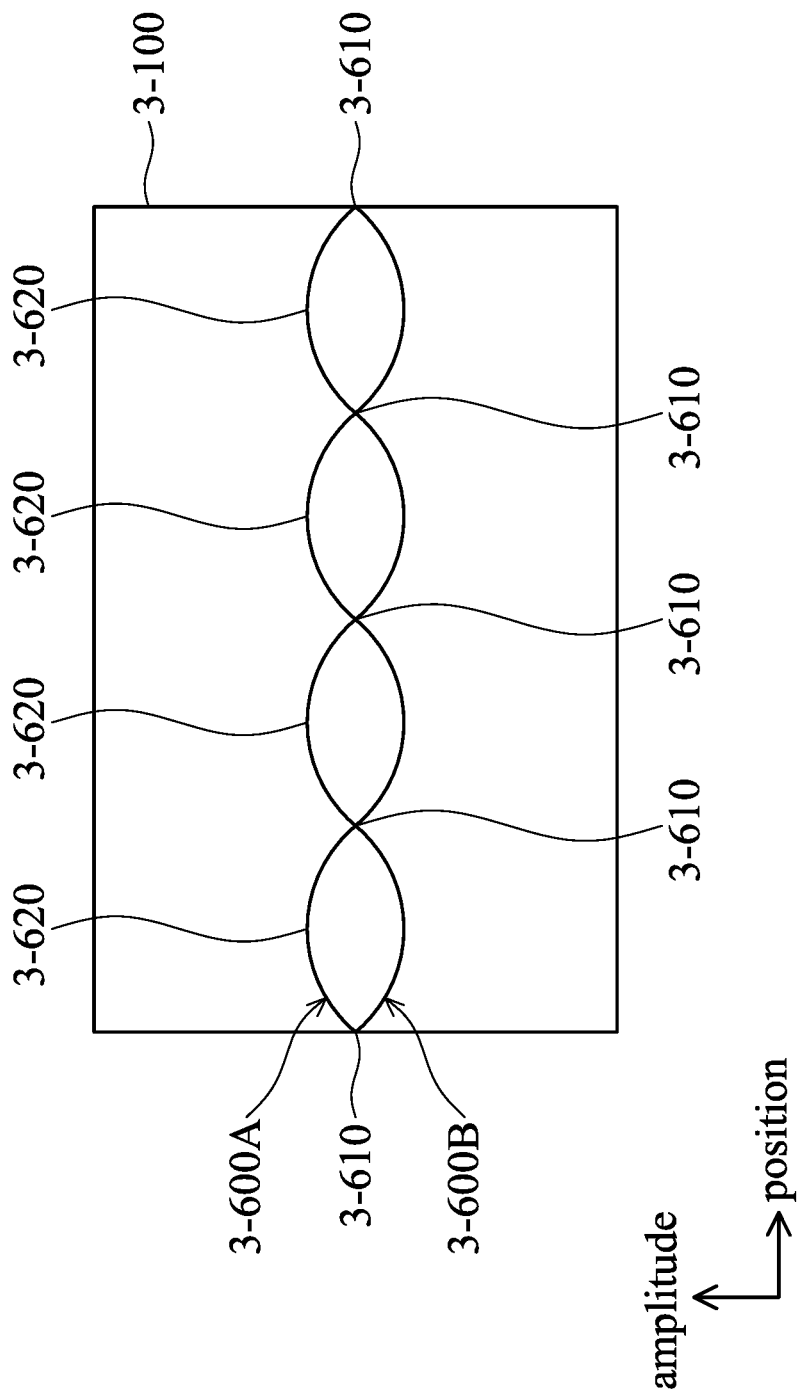
FIG. 26 is a schematic view when standing wave occurs in the main body.

FIG. 26 is a schematic view when standing wave occurs in the main body 3-100. As shown in FIG. 26, when two waves 3-600A, 3-600B with opposite directions and identical amplitudes and frequencies meet in a medium, standing wave will occur (e.g. the first vibration mode or the second vibration mode), and nodes 3-610 (i.e. where the vibration being strengthened) and antinodes 3-620 (i.e. where the vibration being weakened) will be generated at a series of positions of the main body 3-100. At the nodes 3-610, the amplitude is zero. At the antinodes 3-620, maximum amplitude occurs. In some embodiments, the first vibration position may be designed at the antinodes 3-620 of the first vibration mode, the second vibration position may be designed at the antinodes 3-620 of the second vibration mode, and the third vibration position may be designed at the antinodes 3-620 of the first vibration mode to achieve maximum feedback forces.

Figure 28:
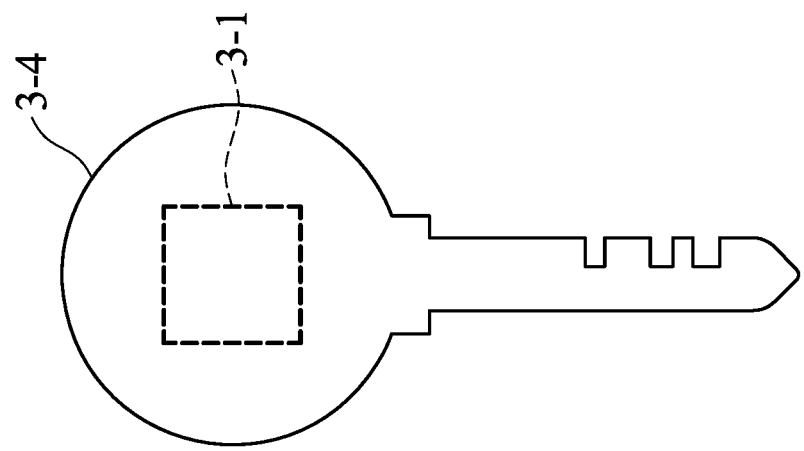
FIG. 27, FIG. 28, FIG. 29A, and FIG. 29B are schematic views of some applications of the feedback system in some embodiments of the present disclosure.
Figure 27:
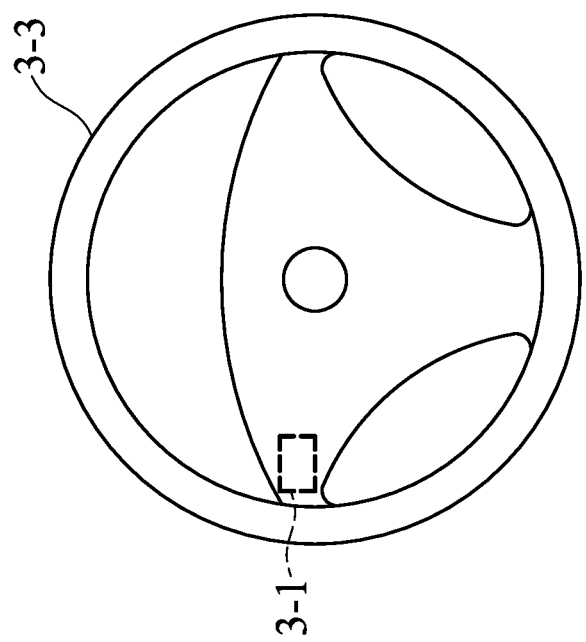

The feedback system 3-1 may be disposed on different devices with vibration function. FIG. 27, FIG. 28, FIG. 29A, and FIG. 29B are schematic views of some applications of the feedback system 3-1 in some embodiments of the present disclosure. For example, the feedback system 3-1 may be utilized in automobile industry, such as being disposed in the steering wheel 3-3 shown in FIG. 27. When the driver cannot read the information showing on the monitor of the car, the feedback system 3-1 may deliver message to the driver by vibration. For example, the feedback system 3-1 may be used with the reversing radar of a car to notify the driver by vibration if the vehicle is about to hit another object when reversing. Alternatively, different feedback vibrations may be provided to the driver when the vehicle and the object are at different distances to facilitate the driver to drive. Furthermore, as shown in FIG. 28, the feedback system 3-1 may be disposed in the car key 3-4 to generate vibrations when the car key 3-4 approaches the vehicle, thereby notifying the driver of the location of the vehicle.

Figure 29B:
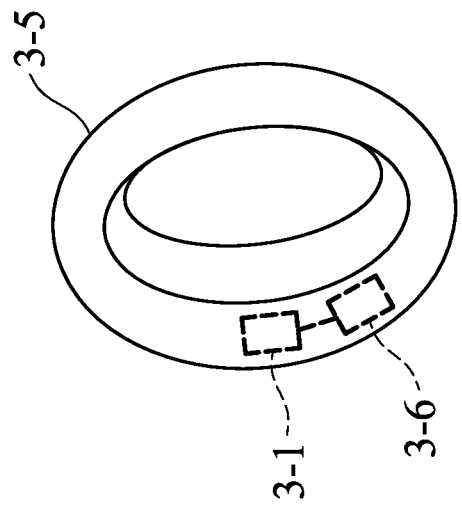
Figure 29A:
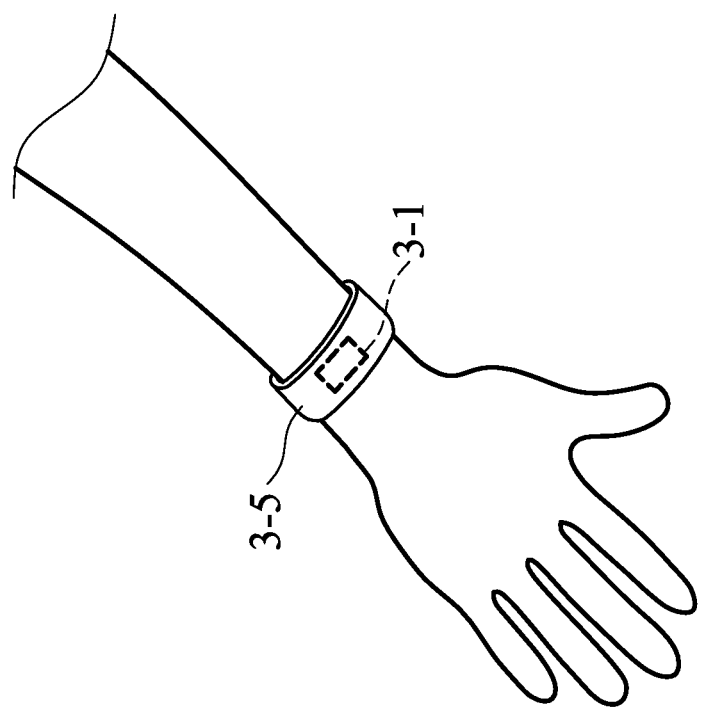

In some embodiments, as shown in FIG. 29A and FIG. 29B, the feedback system 3-1 may be disposed in a smart bracelet 3-5 to provide feedback to the user's physical condition. For example, a communication module 3-6 may be provided in the smart bracelet 3-5. If the user wearing the smart bracelet 3-5 falls down (with excessive acceleration in an instant) and there is no posture change of the user for a specific time afterwards, the user's physical state (such as heartbeat, etc.) is sensed through the feedback system 3-1 ad being processed. If it is determined that the user is in danger, a warning is generated to the user through the feedback system 3-1. If the user does not cancel this warning, other people will be notified (e.g. calling the police) through the communication module 3-6 which is electrically connected to the feedback system 3-1 to ensure the safety of the user.

In summary, a feedback system is provided in the present disclosure. The feedback system includes a main body, a vibration module, a sensing module, and a control module. The vibration module has a first vibration mechanism used for providing a first vibration force to the main body at a first vibration position. The sensing module is used for detecting the status of the main body and providing sensing signal. The control module is used for receiving the sensing signal and providing driving signal to the first vibration module to generate the first vibration force. Therefore, feedback of the environmental information detected by the sensing module may be performed by vibration to inform the user specific information. Furthermore, the feedback system may vibrate by resonance, so the size of the required elements may be reduced. As a result, miniaturization may be achieved.

Although embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope of such processes, machines, manufacture, and compositions of matter, means, methods, or steps. In addition, each claim constitutes a separate embodiment, and the combination of various claims and embodiments are within the scope of the disclosure.

What is claimed is:

1. A feedback system, comprising:
   a main body;
   a vibration module disposed in the main body and comprising a first vibration mechanism, wherein the first vibration mechanism is used for providing a first vibration force to the main body at a first vibration position;
   a sensing module disposed in the main body and used for detecting the status of the main body and providing a sensing signal, wherein the sensing module comprises a light sensing assembly used for detecting the light variation of the main body relative to the environment and providing a light signal of the sensing signal; and
   a control module disposed in the main body and used for receiving the sensing signal and providing a driving signal to the first vibration mechanism to generate the first vibration force,
   wherein the control module comprises light calibration data recording calibration information of the light sensing assembly, and
   wherein the light calibration data is not recalibrated when the feedback system is used for the first time.

2. The feedback system as claimed in claim 1, wherein the sensing module further comprises:
   an inertia sensing assembly used for detecting the inertia of the main body and providing an inertia signal of the sensing signal;
   a depth sensing assembly used for detecting the position variation of the main body relative to the environment and providing a position signal of the sensing signal;
   wherein the control module comprises:
   inertia calibration data recording calibration information of the inertia sensing assembly;
   depth calibration data recording calibration information of the depth sensing assembly;
   wherein the inertia calibration data is not recalibrated when the feedback system is used for the first time;
   wherein the depth calibration data is recalibrated when the feedback system is used for the first time.

3. The feedback system as claimed in claim 2, further comprising performing a first calibration process, a second calibration process, and a third calibration process on the feedback system;
   wherein the first calibration process is used to redefine the inertia sensing calibration data;
   in the first calibration process, the main body is at rest for redefining the inertia sensing calibration data;
   in the first calibration process, the inertia sensing calibration data is redefined according to the position signal.

4. The feedback system as claimed in claim 3, wherein in the first calibration process, the inertia sensing calibration data is redefined according to an acceleration sensor and an angular velocity sensor in the inertia sensing assembly;
   in the first calibration process, the absolute value of the value of acceleration detected by the acceleration sensor is between a sum of the acceleration of gravity and an error of the acceleration and remains for a predetermined time for redefining the inertia sensing calibration data;
   in the first calibration process, the margin of error of the acceleration is measured by an external apparatus, and then the margin of error of the acceleration is recorded in the control module;
   in the first calibration process, the main body is at rest for a period of time to achieve the margin of error of the acceleration, and then the margin of error of the acceleration is recorded in the control module;
   in the first calibration process, the value of the angular velocity detected by the angular velocity sensor is less than a margin of error of the angular velocity for the predetermined time to redefine the inertia sensing calibration data.

5. The feedback system as claimed in claim 4, wherein the second calibration process is used to redefine the depth sensing calibration data;
   in the second calibration process, the main body is positioned at different positions to redefine the depth sensing calibration data;
   in the second calibration process, the depth sensing calibration data is redefined according to the inertia sensing signal;
   wherein the first calibration process and the second calibration process are performed at the same time.

6. The feedback system as claimed in claim 5, wherein the third calibration process is used to redefine the light sensing calibration data;
   in the third calibration process, the light sensing assembly is illuminated by a reference light to redefine the light sensing calibration data.

7. The feedback system as claimed in claim 1, wherein the vibration module further comprises a second vibration mechanism and a third vibration mechanism;
   wherein the second vibration mechanism is used for generating a second vibration force at a second vibration position of the main body;

wherein a shortest distance between the first vibration position and the second vibration position is not equal to zero;

wherein the third vibration mechanism is used for generating a third vibration force at a third vibration position of the main body;

wherein a shortest distance between the first vibration position and the third vibration position and a shortest distance between the second vibration position and the third vibration position are not equal to zero.

8. The feedback system as claimed in claim 7, further comprising a first feedback mode, a second feedback mode, and a third feedback mode;

wherein the first feedback mode is used for generating a first feedback force to the main body;

wherein the second feedback mode is used for generating a second feedback force to the main body;

wherein the third feedback mode is used for generating a third feedback force to the main body;

wherein the first feedback force is different than the second feedback force;

wherein the first feedback force is different than the third feedback force;

in the first feedback mode, the dimensions of the first vibration force and the second vibration force are identical.

9. The feedback system as claimed in claim 8, wherein in the first feedback mode, the dimensions of the second vibration force and the third vibration force are identical;

in the first feedback mode, the values of the first vibration force and the second vibration force are identical;

in the first feedback mode, the values of the first vibration force and the second vibration force are identical.

10. The feedback system as claimed in claim 9, wherein in the second feedback mode, the dimensions of the first vibration force and the second vibration force are different;

in the second feedback mode, the dimensions of the second vibration force and the third vibration force are different;

in the second feedback mode, the dimensions of the first vibration force and the third vibration force are different;

in the second feedback mode, the values of the first vibration force and the second vibration force are different;

in the second feedback mode, the values of the first vibration force and the second vibration force are different;

in the second feedback mode, the values of the first vibration force and the third vibration force are different.

11. The feedback system as claimed in claim 10, wherein in the third feedback mode, the dimensions of the first vibration force and the second vibration force are identical;

in the third feedback mode, the dimensions of the second vibration force and the third vibration force are identical;

in the third feedback mode, the dimensions of the first vibration force and the third vibration force are identical;

in the third feedback mode, the values of the first vibration force and the second vibration force are different;

in the third feedback mode, the values of the first vibration force and the second vibration force are different; and in the third feedback mode, the values of the first vibration force and the third vibration force are different.

12. The feedback system as claimed in claim 11, wherein the first feedback mode, the second feedback mode, and the third feedback mode are selected by the control module according to the sensing signal;

wherein the directions of the first feedback force and the second feedback force are different;

wherein the values of the first feedback force and the second feedback force are different;

wherein the directions of the first feedback force and the third feedback force are identical; and wherein the values of the first feedback force and the third feedback force are different.

13. The feedback system as claimed in claim 12, wherein the control module further comprises predetermined information, comprising a first frequency and a second frequency;

wherein a first resonance frequency of the feedback system is recorded in the first frequency;

wherein a second resonance frequency of the feedback system is recorded in the second frequency;

wherein the values of the first frequency and the second frequency are different;

wherein the vibration frequency of the first feedback force is identical to the first resonance frequency;

wherein the vibration frequency of the second feedback force is identical to the second resonance frequency; and wherein the vibration frequency of the third feedback force is identical to the first resonance frequency.

14. The feedback system as claimed in claim 13, wherein each of the first vibration mechanism, the second vibration mechanism, and the third vibration mechanism further comprises:

a first dimension vibration mechanism used for generating a first dimension vibration, wherein the first dimension vibration is a linear motion along a first direction;

a second dimension vibration mechanism used for generating a second dimension vibration, wherein the second dimension vibration is a linear motion along a second direction;

a third dimension vibration mechanism used for generating a third dimension vibration, wherein the third dimension vibration is a linear motion along a third direction;

a fourth dimension vibration mechanism used for generating a fourth dimension vibration, wherein the fourth dimension vibration is a rotation having a rotational axis extending in the first direction;

a fifth dimension vibration mechanism used for generating a fifth dimension vibration, wherein the fifth dimension vibration is a rotation having a rotational axis extending in the second direction; and a sixth dimension vibration mechanism used for generating a sixth dimension vibration, wherein the sixth dimension vibration is a rotation having a rotational axis extending in the third direction.

15. The feedback system as claimed in claim 14, wherein the first vibration position is not positioned at nodes of a first vibration mode and a second vibration mode of the main body;

wherein the second vibration position is not positioned at the nodes of the first vibration mode and the second vibration mode of the main body;

wherein the third vibration position is not positioned at the nodes of the first vibration mode and the second vibration mode of the main body.

16. The feedback system as claimed in claim 15, wherein the first vibration position is positioned at one of the nodes of the first vibration mode;

wherein the second vibration position is positioned at one of the nodes of the first vibration mode;

wherein the third vibration position is positioned at one of the nodes of the first vibration mode.

17. The feedback system as claimed in claim 16, wherein each of the first vibration mechanism, the second vibration mechanism, and the third vibration mechanism further comprises:

a fixed portion;

a movable portion movably connected to the fixed portion;

a resilient element which is flexible and resilient, wherein the movable portion is movably connected to the fixed portion through the resilient element; and a driving assembly used for driving the movable portion to move relative to the fixed portion;

wherein the difference between a resonance frequency of the main body and a resonance frequency of the movable portion plus the resilient element is less than 10% of the resonance frequency of the main body.

18. The feedback system as claimed in claim 17, wherein the driving assembly comprises a magnetic driving assembly to generate a driving force by electromagnetic principle.

19. The feedback system as claimed in claim 17, wherein the driving assembly comprises a shape memory alloy assembly to generate a driving force by characteristic of shape memory alloy.

20. The feedback system as claimed in claim 17, wherein the driving assembly comprises a piezoelectric driving assembly to generate a driving force by piezoelectric principle.

* * * * *